US012562786B2

(12) United States Patent
Liu et al.

(10) Patent No.: US 12,562,786 B2
(45) Date of Patent: Feb. 24, 2026

(54) SYSTEM AND METHOD FOR INTER-CELL AND INTRA-CELL MULTIPLE TRANSMISSION-RECEPTION POINTS COMMUNICATIONS

(71) Applicant: Huawei Technologies Co., Ltd., Shenzhen (CN)

(72) Inventors: Jialing Liu, Palatine, IL (US); Weimin Xiao, Hoffman Estates, IL (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 18/480,951

(22) Filed: Oct. 4, 2023

(65) Prior Publication Data

US 2024/0039587 A1 Feb. 1, 2024

Related U.S. Application Data

(63) Continuation of application No. PCT/US2022/023349, filed on Apr. 4, 2022.

(60) Provisional application No. 63/229,906, filed on Aug. 5, 2021, provisional application No. 63/171,002, filed on Apr. 5, 2021.

(51) Int. Cl.
H04B 7/0456 (2017.01)
H04B 7/06 (2006.01)
H04L 5/00 (2006.01)
H04W 56/00 (2009.01)

(52) U.S. Cl.
CPC ......... H04B 7/0456 (2013.01); H04B 7/0478 (2013.01); H04L 5/0051 (2013.01); H04W 56/001 (2013.01); H04B 7/06968 (2023.05)

(58) Field of Classification Search
None
See application file for complete search history.

(56) References Cited

U.S. PATENT DOCUMENTS

2021/0337534 A1* 10/2021 Xiong ...................... H04L 1/08

OTHER PUBLICATIONS

Futurewei, "Multi-TRP/panel for non-PDSCH", 3GPP TSG RAN WG1 #103-e, R1-2007540, Oct. 26-Nov. 13, 2020, 19 Pages, e-Meeting.
Huawei et al., "Enhancements on multi-TRP for reliability and robustness in Rel-17", 3GPP TSG RAN WG1 Meeting #104-e, R1-2100209, Jan. 25-Feb. 5, 2021, 14 Pages, E-Meeting.
Moderator (Nokia), "Summary #3 of Multi-TRP for PUCCH and PUSCH", 3GPP TSG RAN WG1 #104-e, R1-2102060, Jan. 25-Feb. 5, 2021, 43 Pages.

(Continued)

*Primary Examiner* — Alpus Hsu
*Assistant Examiner* — Camquyen Thai
(74) *Attorney, Agent, or Firm* — Slater Matsil, LLP

(57) ABSTRACT

A UE may receive information indicating a layer number and a first transmit precoding matrix index (TPMI) to be used for a first physical uplink shared channel (PUSCH). The UE may also receive information indicating a second TPMI to be used for a second PUSCH. The first TPMI and the second TPMI correspond to the layer number. The UE may transmit data on the first PUSCH over a carrier according to the layer number and the first TPMI, transmit the same data on the second PUSCH over the carrier according to the layer number and the second TPMI, for PUSCH repetition transmissions.

28 Claims, 14 Drawing Sheets

1400

1402 — RECEIVE FIRST INFORMATION AND SECOND INFORMATION, WHERE THE FIRST INFORMATION INDICATES A FIRST LAYER NUMBER AND A FIRST TRANSMIT PRECODING MATRIX INDEX (TPMI) TO BE USED FOR A FIRST PHYSICAL UPLINK SHARED CHANNEL (PUSCH), THE SECOND INFORMATION INDICATES A SECOND TPMI TO BE USED FOR A SECOND PUSCH

1404 — TRANSMIT DATA ON THE FIRST PUSCH OVER A CARRIER ACCORDING TO THE FIRST LAYER NUMBER AND THE FIRST TPMI

1406 — TRANSMIT THE DATA ON THE SECOND PUSCH OVER THE CARRIER ACCORDING TO THE FIRST LAYER NUMBER AND THE SECOND TPMI

(56) References Cited

OTHER PUBLICATIONS

Oppo, "Enhancements on multi-TRP for PDCCH, PUCCH and PUSCH", 3GPP TSG RAN WG1 #104-e, R1-2100119, Jan. 25-Feb. 5, 2021, 16 Pages, e-Meeting.

"5G; NR; Radio Resource Control (RRC); Protocol specification (3GPP TS 38.331 version 17.3.0 Release 17)", Technical Specification, ETSI TS 138 331 V17.3.0, Jan. 2023, 1295 Pages.

"5G; NR; Physical channels and modulation (3GPP TS 38.211 version 17.4.0 Release 17)", Technical Specification, ETSI TS 138 211 V17.4.0, Jan. 2023, 141 Pages.

"5G; NR; Multiplexing and channel coding (3GPP TS 38.212 version 17.4.0 Release 17)", Technical Specification, ETSI TS 138 212 V17.4.0, Jan. 2023, 206 Pages.

"5G; NR; Physical layer procedures for data (3GPP TS 38.214 version 17.5.0 Release 17)", Technical Specification, ETSI TS 138 214 V17.5.0, Apr. 2023, 236 Pages.

"5G; NR; Physical layer procedures for control (3GPP TS 38.213 version 17.4.0 Release 17)", Technical Specification, ETSI TS 138 213 V17.4.0, Jan. 2023, 263 Pages.

* cited by examiner

| NUMEROLOGY | SCS (kHz) | NORMAL CP (μs) |
|---|---|---|
| 0 | 15 | 4.69 |
| 1 | 30 | 2.34 |
| 2 | 60 | 1.17 |
| 3 | 130 | 0.59 |
| 4 | 240 | 0.29 |
| 5 | 480 | 0.15 |
| [6] | 960 | 0.08 |

400

420

| FUNCTIONALITY | CSI-RS SEQUENCE GENERATION | PDCCH DMRS SEQUENCE GENERATION | PDCCH SCRAMBLING/ RANDOMIZATION | PDSCH DMRS SEQUENCE GENERATION | PDSCH SCRAMBLING | PUSCH DMRS SEQUENCE GENERATION | PUSCH SCRAMBLING |
|---|---|---|---|---|---|---|---|
| | ID1 | ID2 | ID3 | ID4 | ID5 | ID6 | ID7 |
| FIRST GROUP OF IDs | ID1,1 | ID2,1 | ID3,1 | ID4,1 | ID5,1 | ID6,1 | ID7,1 |
| SECOND GROUP OF IDs | ID1,2 | ID2,2 | ID3,2 | ID4,2 | ID5,2 | ID6,2 | ID7,2 |
| THIRD GROUP OF IDs | ID1,3 | ID2,3 | ID3,3 | ID4,3 | ID5,3 | ID6,3 | ID7,3 |

| | TRP0 | TRP1 | TRPs TIGHTLY-SYNCHED | TRPs WITH FAST BACKHAUL | S-DCI/M-DCI | NUMBER RESOURCE GROUPS |
|---|---|---|---|---|---|---|
| SCENARIO 1 | CELL WITH SSB | TRP WITHOUT SSB | Y | Y | S | 1 (OR 2) |
| SCENARIO 2 | CELL WITH SSB | TRP WITHOUT SSB | Y | Y | M | 1 (OR 2) |
| SCENARIO 3 | CELL WITH SSB | TRP WITHOUT SSB | Y | N | M | 2 (OR 1) |
| SCENARIO 4 | CELL WITH SSB | TRP WITHOUT SSB | N | N | M | 2 |
| SCENARIO 5 | CELL WITH SSB | CELL WITH SSB | Y | Y | S | 2 |
| SCENARIO 6 | CELL WITH SSB | CELL WITH SSB | Y | Y | M | 2 |
| SCENARIO 7 | CELL WITH SSB | CELL WITH SSB | Y | N | M | 2 |
| SCENARIO 8 | CELL WITH SSB | CELL WITH SSB | N | N | M | 2 |

COVERS DUAL CONNECTIVITY

FIG. 6

M-TRP WITH ONE SSB, TRS 728 MAY OR MAY NOT RELY ON SSB 722 OR TRS 720 FOR TIMING, S-DCI FOR BOTH GROUPS OF RESOURCES OR CROSS-GROUP SCHEDULING

M-TRP WITH ONE SSB, TRS 830 MAY OR MAY NOT RELY ON SSB 824
OR TRS 822 FOR TIMING, M-DCI FOR INTRA-GROUPS SCHEDULING

900

NON-CONTENTION
BASED RACH: PL

TRP0
TAG0
RG0
902

904
UE

TRP1
TAG1
RG1
906

INTER-CELL M-TRP, EACH GROUP HAS ITS SEPARATE FFT WINDOW, TRACKING LOOP,
QCL ASSUMPTION SET, TAG. S-DCI FOR JOINT OR CROSS-GROUP SCHEDULING

1000

1024 — SSB 1026     1022

CSI-RS     TRS

1020 — DMRS

1012 — DCI0

1014 — PDSCH0

1032 — SSB 1034     1030

CSI-RS → TRS

DMRS — 1028

DCI1 — 1016

PDSCH1 — 1018

NON-CONTENTION
BASED RACH: PL

TRP0
TAG0
RG0

TRP1
TAG1
RG1

1002

1004
UE

1006

INTER-CELL M-TRP, EACH GROUP HAS ITS SEPARATE FFT WINDOW, TRACKING
LOOP, QCL ASSUMPTION SET, TAG. M-DCI FOR INTRA-GROUP SCHEDULING

1100

1300

1400

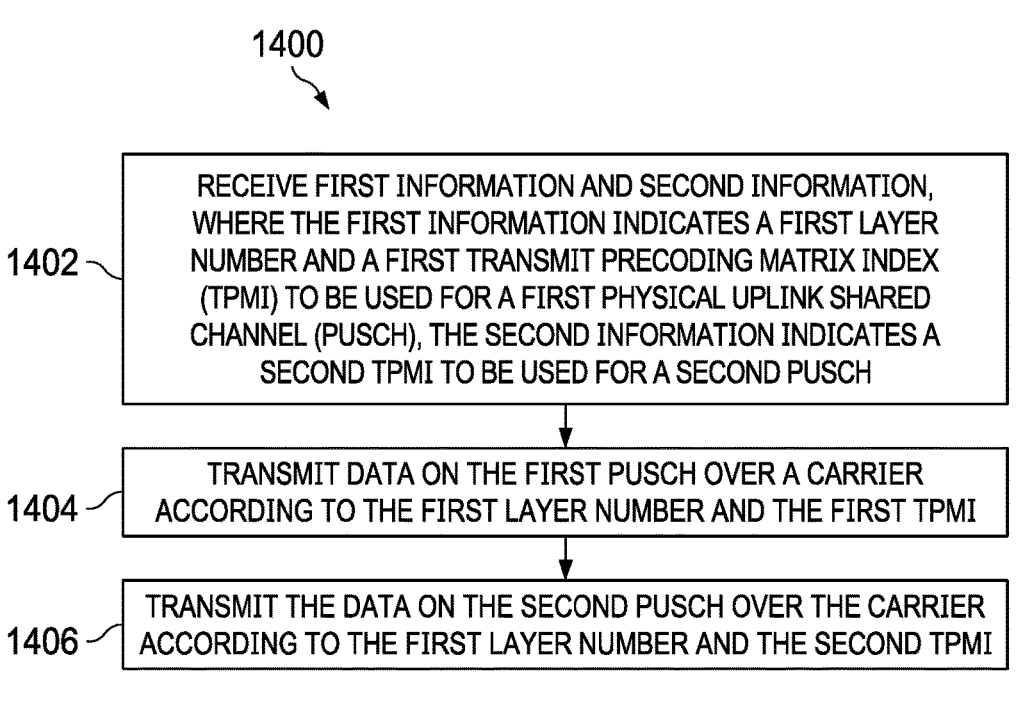

1402 — RECEIVE FIRST INFORMATION AND SECOND INFORMATION, WHERE THE FIRST INFORMATION INDICATES A FIRST LAYER NUMBER AND A FIRST TRANSMIT PRECODING MATRIX INDEX (TPMI) TO BE USED FOR A FIRST PHYSICAL UPLINK SHARED CHANNEL (PUSCH), THE SECOND INFORMATION INDICATES A SECOND TPMI TO BE USED FOR A SECOND PUSCH

1404 — TRANSMIT DATA ON THE FIRST PUSCH OVER A CARRIER ACCORDING TO THE FIRST LAYER NUMBER AND THE FIRST TPMI

1406 — TRANSMIT THE DATA ON THE SECOND PUSCH OVER THE CARRIER ACCORDING TO THE FIRST LAYER NUMBER AND THE SECOND TPMI

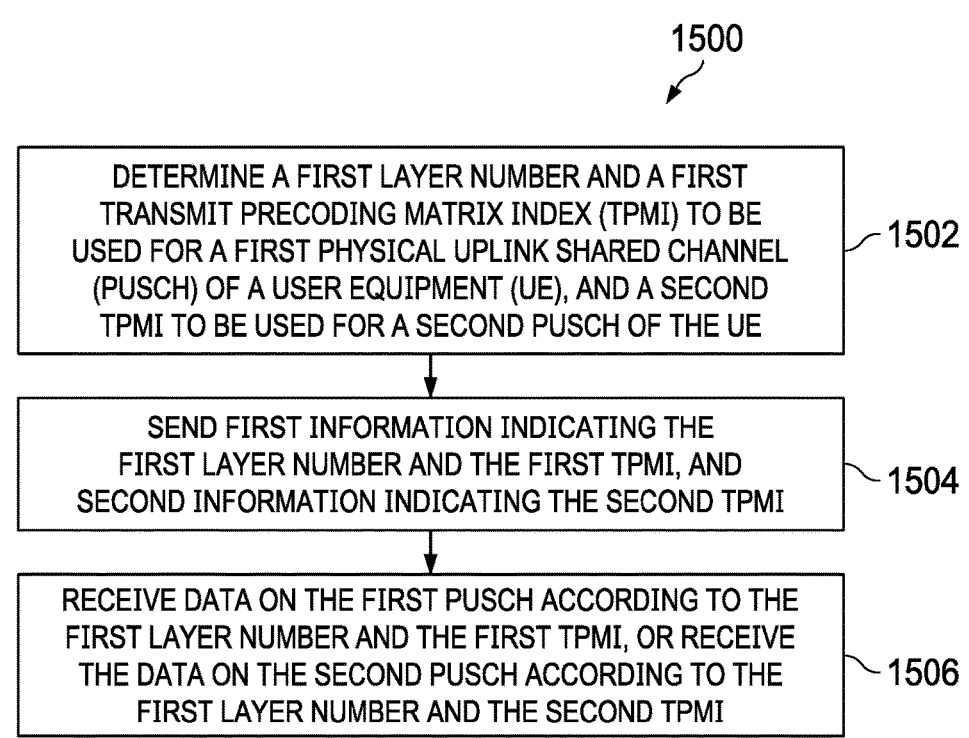

DETERMINE A FIRST LAYER NUMBER AND A FIRST TRANSMIT PRECODING MATRIX INDEX (TPMI) TO BE USED FOR A FIRST PHYSICAL UPLINK SHARED CHANNEL (PUSCH) OF A USER EQUIPMENT (UE), AND A SECOND TPMI TO BE USED FOR A SECOND PUSCH OF THE UE — 1502

SEND FIRST INFORMATION INDICATING THE FIRST LAYER NUMBER AND THE FIRST TPMI, AND SECOND INFORMATION INDICATING THE SECOND TPMI — 1504

RECEIVE DATA ON THE FIRST PUSCH ACCORDING TO THE FIRST LAYER NUMBER AND THE FIRST TPMI, OR RECEIVE THE DATA ON THE SECOND PUSCH ACCORDING TO THE FIRST LAYER NUMBER AND THE SECOND TPMI — 1506

1602 — TRANSMIT A FIRST UPLINK REFERENCE SIGNAL (RS) ASSOCIATED WITH A FIRST SYNCHRONIZATION SIGNAL BLOCK (SSB)

1604 — TRANSMIT A SECOND UPLINK RS ASSOCIATED WITH A SECOND SSB THAT IS DIFFERENT THAN THE FIRST SSB

1700

1714 — INTERFACE

1710 — INTERFACE

1704 — PROCESSOR

1712 — INTERFACE

1706 — MEMORY

1800

1812 — DEVICE-SIDE INTERFACE(S)

1810 — SIGNAL PROCESSOR

1806 — TRANSMITTER

1804 — COUPLER

1802 — NETWORK-SIDE INTERFACE(S)

1808 — RECEIVER

SYSTEM AND METHOD FOR INTER-CELL AND INTRA-CELL MULTIPLE TRANSMISSION-RECEPTION POINTS COMMUNICATIONS

CROSS-REFERENCE TO RELATED APPLICATIONS

This patent application is a continuation application of International Patent Application No. PCT/US2022/023349, filed on Apr. 4, 2022 and entitled "System and Method for Inter-cell and Intra-cell Multiple Transmission-Reception Points Communications," which claims priority to U.S. Provisional Application No. 63/171,002, filed on Apr. 5, 2021 and entitled "System and Method for Multiple Trans-mission-Reception Points," and U.S. Provisional Application No. 63/229,906, filed on Aug. 5, 2021 and entitled "System and Method for Inter-cell and Intra-cell Multiple Transmission-Reception Points," which applications are hereby incorporated by reference herein as if reproduced in their entireties.

TECHNICAL FIELD

The present disclosure relates generally to wireless com-munications, and, in particular embodiments, to a system and method for inter-cell and intra-cell multiple transmis-sion-reception points communications.

BACKGROUND

Wireless communication systems include long term evo-lution (LTE), LTE-A, LTE-A-beyond systems, 5G LTE, 5G New Radio (NR), etc. A modern wireless communication system may include a plurality of NodeBs (NBs), which may also be referred to as base stations, network nodes, commu-nications controllers, cells or enhanced NBs (eNBs), and so on. A NodeB may include one or more network points or network nodes using different radio access technologies (RATs), such as high speed packet access (HSPA) NBs or WiFi access points. A NodeB may be associated with a single network point or multiple network points, which may use the same RAT in typical cases, and may use multiple RATs, e.g., in the most generic cases. A cell may include a single network point or multiple network points, and each network point may have a single antenna or multiple anten-nas. A network point may correspond to multiple cells operating in multiple component carriers. Generally, each component carrier in carrier aggregation is a serving cell, which may either be a primary cell (PCell) or a secondary cell (SCell).

SUMMARY

Technical advantages are generally achieved, by embodi-ments of this disclosure which describe a system and method for inter-cell and intra-cell multiple transmission-reception points communications.

In accordance with one aspect of the present disclosure, a method is provided that includes: receiving, by a user equipment (UE), first information and second information, the first information indicating a first layer number and a first transmit precoding matrix index (TPMI) to be used for a first physical uplink shared channel (PUSCH), the second infor-mation indicating a second TPMI to be used for a second PUSCH, and the first TPMI and the second TPMI corre-sponding to the first layer number; transmitting, by the UE, data on the first PUSCH over a carrier according to the first layer number and the first TPMI; and transmitting, by the UE, the data on the second PUSCH over the carrier accord-ing to the first layer number and the second TPMI.

Optionally, in any of the preceding aspects, the first information and the second information are received in a serving cell of the UE.

Optionally, in any of the preceding aspects, receiving the first information and the second information comprise: receiving, by the UE, the first information and the second information from a first bit field and a second bit field in a message, respectively, a value i comprised in the second bit field indicates a TPMI value i of the second TPMI corre-sponding to the first layer number, the first information associated with a precoding information and number of layers table.

Optionally, in any of preceding aspects, a bit width of the second bit field is based on a maximum number of TPMI entries corresponding to a layer number in the precoding information and number of layers table.

Optionally, in any of preceding aspects, the message is a downlink control information (DCI) message.

Optionally, in any of preceding aspects, the data is a transport block (TB).

Optionally, in any of preceding aspects, the first PUSCH and the second PUSCH are for PUSCH repetition transmis-sion.

Optionally, in any of preceding aspects, transmitting the data in the first PUSCH comprises: transmitting, by the UE, the data in the first PUSCH according to a first timing advance; and transmitting the data in the second PUSCH comprises: transmitting, by the UE, the data in the second PUSCH according to a second timing advance different than the first timing advance.

Optionally, in any of preceding aspects, the first PUSCH is associated with a first cell having a first physical cell ID (PCI), and the second PUSCH is associated with a second cell having a second PCI different from the first PCI.

Optionally, in any of preceding aspects, the first PUSCH is associated with a first synchronization signal block (SSB), and the second PUSCH is associated with a second SSB different than the first SSB, the first SSB associated with a first PCI and the second SSB associated with a second PCI.

Optionally, in any of preceding aspects, the method further comprises: transmitting, by the UE, a first sounding reference signal (SRS) associated with the first SSB; and transmitting, by the UE, a second SRS associated with the second SSB.

Optionally, in any of preceding aspects, the method further comprises: transmitting, by the UE, a first SRS having a first spatial relation with a first channel state information-reference signal (CSI-RS) or the first SSB, the first CSI-RS having a quasi co-location (QCL) relationship with the first SSB; and transmitting, by the UE, a second SRS having a second spatial relation with a second CSI-RS or the second SSB, the second CSI-RS having a QCL relationship with the second SSB.

Optionally, in any of preceding aspects, the method further comprises: determining, by the UE, the first layer number and the first TPMI in a first table according to the first information; and determining, by the UE, the second TPMI in a second table according to the second information and the layer number.

In accordance with another aspect of the present disclo-sure, a method is provided that includes: determining, by a network controller, a first layer number and a first transmit precoding matrix index (TPMI) to be used for a first physical uplink shared channel (PUSCH) of a user equipment (UE), and a second TPMI to be used for a second PUSCH of the UE, the first TPMI and the second TPMI corresponding to the first layer number; sending, by the network controller to the UE, first information indicating the first layer number and the first TPMI, and second information indicating the second TPMI; and receiving, by the network controller, data on the first PUSCH according to the first layer number and the first TPMI, or receiving, by the network controller, the data on the second PUSCH according to the first layer number and the second TPMI.

Optionally, in any of preceding aspects, the first information and the second information are sent to the UE in a serving cell of the UE.

Optionally, in any of preceding aspects, sending the first information and the second information comprise: sending, by the network controller, the first information and the second information in a first bit field and a second bit field of a message, respectively, a value i comprised in the second bit field indicates a TPMI value i of the second TPMI corresponding to the first layer number, the first information associated with a precoding information and number of layers table.

Optionally, in any of preceding aspects, the method further comprises: determining, by the network controller, a bit width of the second bit field based on a maximum number of TPMI entries corresponding to a layer number in a precoding information and number of layers table.

Optionally, in any of preceding aspects, the message is a DCI message.

Optionally, in any of preceding aspects, the data is a transport block (TB).

Optionally, in any of preceding aspects, the first PUSCH and the second PUSCH are configured for PUSCH repetition transmission.

Optionally, in any of preceding aspects, the first PUSCH is associated with a first timing advance, and the second PUSCH is associated with a second timing advance different than the first timing advance.

Optionally, in any of preceding aspects, the first PUSCH is associated with a first cell and the second PUSCH is associated with a second cell different than the first cell.

Optionally, in any of preceding aspects, the first PUSCH is associated with a first synchronization signal block (SSB) and the second PUSCH is associated with a second SSB different than the first SSB.

Optionally, in any of preceding aspects, the method further comprises: receiving, by the network controller from the UE, a first sounding reference signal (SRS) associated with the first SSB; or receiving, by the network controller from the UE, a second sounding reference signal (SRS) associated with the second SSB.

Optionally, in any of preceding aspects, the method further comprises: receiving, by the network controller from the UE, a first sounding reference signal (SRS) having a first spatial relation with a first channel state information-reference signal (CSI-RS) or the first SSB, the first CSI-RS having a quasi co-location (QCL) relationship with the first SSB; or receiving, by the network controller from the UE, a second sounding reference signal (SRS) having a second spatial relation with a second CSI-RS or the second SSB, the second CSI-RS having a QCL relationship with the second SSB.

Optionally, in any of preceding aspects, the method further comprises: determining, by the UE, the first information in a first table according to the first layer number and the first TPMI; and determining, by the UE, the second information in a second table according to the second TPMI and the first layer number.

In accordance with another aspect of the present disclosure, a method is provided that includes: transmitting, by a user equipment (UE), a first uplink reference signal (RS) associated with a first synchronization signal block (SSB), the first SSB associated with a first physical cell ID (PCI); and transmitting, by the UE, a second uplink RS associated with a second SSB that is different than the first SSB, the second SSB associated with a second PCI different than the first PCI.

Optionally, in any of preceding aspects, the first uplink RS has a first spatial relation with a first channel state information-reference signal (CSI-RS) or the first SSB, the first CSI-RS having a quasi co-location (QCL) relationship with the first SSB; and the second uplink RS has a second spatial relation with a second CSI-RS or the second SSB, the second CSI-RS having a QCL relationship with the second SSB.

Optionally, in any of preceding aspects, a first pathloss RS for the first uplink RS is a first channel state information-reference signal (CSI-RS) or the first SSB, the first CSI-RS having a quasi co-location (QCL) relationship with the first SSB; and a second pathloss RS for the second uplink RS is a second CSI-RS or the second SSB, the second CSI-RS having a QCL relationship with the second SSB.

Optionally, in any of preceding aspects, the first uplink RS is a sounding RS (SRS), a physical uplink shared channel (PUSCH) demodulation RS (DMRS), or a physical uplink control channel (PUCCH) DMRS, and the second uplink RS is a SRS, a PUSCH DMRS, or a PUCCH DMRS.

Optionally, in any of preceding aspects, the first SSB is associated with a first cell, and the second SSB is associated with a second cell different than the first cell.

Optionally, in any of preceding aspects, the first uplink RS is a first SRS resource in a first SRS resource set associated with a first SRS resource indicator (SRI) field in a DCI, and the second uplink RS is a second SRS resource in a second SRS resource set associated with a second SRI field in the DCI.

Optionally, in any of preceding aspects, the first SRI field in the DCI is associated with a first precoder and a first transmission rank for a first PUSCH, and the second SRI field in the DCI is associated with a second precoder and a second transmission rank for a second PUSCH.

Optionally, in any of preceding aspects, the first SRI field in the DCI is associated with a first power control for a first PUSCH, and the second SRI field in the DCI is associated with a second power control for a second PUSCH.

Optionally, in any of preceding aspects, the first uplink RS is associated with a first timing advance, and the second uplink RS is associated with a second timing advance different than the first timing advance.

In accordance with another aspect of the present disclosure, a method is provided that includes: receiving, by a user equipment (UE), first information and second information, the first information indicating a first layer number k and a first SRS resource indicator (SRI) to be used for a first physical uplink shared channel (PUSCH), the second information indicating a second SRI to be used for a second PUSCH, and the first SRI and the second SRI corresponding to the first layer number k; transmitting, by the UE, data on the first PUSCH over a carrier according to the first layer number k and the first SRI; and transmitting, by the UE, the data on the second PUSCH over the carrier according to the first layer number k and the second SRI.

Optionally, in any of preceding aspects, the first information and the second information are received in a serving cell of the UE.

Optionally, in any of preceding aspects, receiving the first information and the second information comprise: receiving, by the UE, the first information and the second information from a first bit field and a second bit field in a message, respectively, the first information associated with a SRI table, and the SRI table mapping the first information in the first bit field to a first list of SRI values, wherein k is determined as a length of the first list of SRI values, and the first SRI is determined as the first list of SRI values, the second SRI is determined as a second list of k SRI values based on k and the second bit field.

Optionally, in any of preceding aspects, a bit width of the second bit field is based on a maximum number of SRI entries corresponding to a layer number in the SRI table.

Optionally, in any of preceding aspects, the message is a downlink control information (DCI) message.

Optionally, in any of preceding aspects, the data is a transport block (TB).

Optionally, in any of preceding aspects, the first PUSCH and the second PUSCH are for PUSCH repetition transmission.

Optionally, in any of preceding aspects, wherein transmitting the data in the first PUSCH comprises: transmitting, by the UE, the data in the first PUSCH according to a first timing advance; and transmitting the data in the second PUSCH comprises: transmitting, by the UE, the data in the second PUSCH according to a second timing advance different than the first timing advance.

Optionally, in any of preceding aspects, the first PUSCH is associated with a first cell having a first physical cell ID (PCI), and the second PUSCH is associated with a second cell having a second PCI different from the first PCI.

Optionally, in any of preceding aspects, the first PUSCH is associated with a first synchronization signal block (SSB), and the second PUSCH is associated with a second SSB different than the first SSB, the first SSB associated with a first PCI and the second SSB associated with a second PCI.

Optionally, in any of preceding aspects, the method further comprises: transmitting, by the UE, a first sounding reference signal (SRS) associated with the first SSB; and transmitting, by the UE, a second SRS associated with the second SSB.

Optionally, in any of preceding aspects, the method further comprises: transmitting, by the UE, a first SRS configured having a first spatial relation with a first channel state information-reference signal (CSI-RS) or the first SSB, the first CSI-RS having a quasi co-location (QCL) relationship with the first SSB; and transmitting, by the UE, a second SRS configured having a second spatial relation with a second CSI-RS or the second SSB, the second CSI-RS having a QCL relationship with the second SSB.

In accordance with another aspect of the present disclosure, an apparatus is provided that includes a non-transitory memory storage comprising instructions; and one or more processors in communication with the memory storage, wherein the instructions, when executed by the one or more processors, cause the device to perform a method in any of the preceding aspects.

In accordance with another aspect of the present disclosure, a non-transitory computer-readable media is provided. The non-transitory computer-readable media stores computer instructions, that when executed by one or more processors, cause the one or more processors to perform a method in any of the preceding aspects.

In accordance with another aspect of the present disclosure, a system is provided that includes a base station (BS); and a user equipment (UE) in communication with the BS. The BS is configured to perform: determining a layer number and a first transmit precoding matrix index (TPMI) to be used for a first physical uplink shared channel (PUSCH) of the UE, and a second TPMI to be used for a second PUSCH of the UE, the second TPMI corresponding to the layer number; and sending, to the UE, first information indicating the layer number and the first TPMI, and the second information indicating the second TPMI. The UE is configured to perform: receiving the first information and second information from the BS; transmitting data in the first PUSCH over a carrier according to the layer number and the first TPMI; and transmitting the data in the second PUSCH over the carrier according to the layer number and the second TPMI.

The above aspects have advantages of facilitating communications between a UE and multiple TRPs, and improving UL/DL transmission/reception reliability, qualities, throughputs, and user experience of UEs in M-TRP communications.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4 illustrates embodiment groups of IDs configured for different TRPs;

FIG. 6 illustrates embodiment M-TRP scenarios for resource groups (RGs);

FIG. 14 illustrates a flow diagram of an embodiment method for wireless communication;

FIG. 15 illustrates a flow diagram of another embodiment method for wireless communication;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
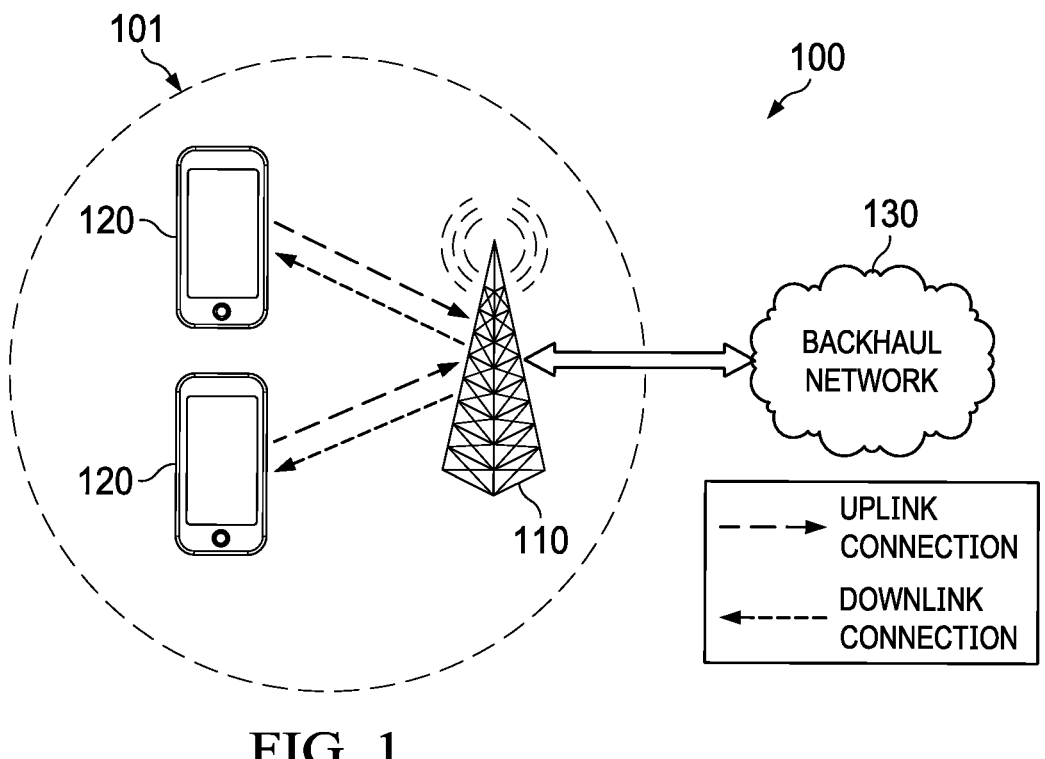
FIG. 1 illustrates a diagram of an embodiment wireless communication system.

A network may serve a number of users (also commonly referred to as user equipment (UE), mobile stations, terminals, devices, and so forth) over a period of time. A communication channel from a base station (or a cell, or a NodeB) to a UE is generally referred to as a downlink (DL) channel, and a transmission from the base station to the UE is a downlink transmission. A communication channel from a UE to a base station is generally referred to an uplink (UL) channel, and a transmission from the UE to the base station is an uplink transmission. The UE receives timing advance (TA) commands associated with a configured TA group (TAG) to adjust its uplink transmission timing to synchronize with the network for uplink transmission, so that uplink transmissions from multiple UEs arrive at the base station at about the same time in a transmission time interval (TTI). Likewise, the UE receives DL reference signals (RS) or synchronization signal (SS) blocks, also called SS/physical broadcast channel (PBCH) blocks (SS/PBCH blocks or SSB blocks), to acquire and maintain the DL synchronization, e.g., via maintaining a DL timing tracking loop, based on which the UE places its Fourier frequency transform (FFT) window inside the cyclic prefix (CP) for its DL reception. In addition, both UL and DL signals/channels need to be associated with some other signals for deriving the signal/channel properties, such as delay spread, Doppler shift, and so on.

In multiple-transmission reception point (M-TRP) communications, a UE may communication with multiple TRPs. When performing a transmission or a reception in a serving cell of a carrier or a bandwidth part (BWP, which may be seen as a portion of the carrier that the UE is currently operating on for the carrier), the UE may need to adjust transmission/reception timing and properties based on a TRP with which the transmission/reception is performed. If the UE uses the same TA of a TAG associated with the serving cell of the UE to communicate with multiple TRPs over the carrier or BWP, it may cause inaccurate uplink timing of the UE in communication with a TRP of the multiple TRPs that is not co-located (NCLed) with the serving cell of the UE, e.g., when the TRP is not synchronized with the serving cell, when the TRP and the serving cell have a non-ideal backhaul, and/or when the TRP is located far away from the serving cell, and a difference of propagation delays of the UE with the TRP and with the serving cell cannot be neglected in adjusting uplink timing of the UE.

The inaccurate uplink timing may negatively affect the UE's physical uplink control channel (PUCCH)/physical uplink shared channel (PUSCH) reliability, spectrum efficiency, and sounding accuracy for uplink/downlink multi-input multi-output (MIMO) channel state information (CSI) acquisition. Thus, it would be desirable that the UE is configured with separate TAGs for the serving cell and the NCLed TRP, and applies different TAs when transmitting to different TRPs. Similarly, it is also desirable that the UE's DL timing maintained via DL tracking loop is adjusted based on which of the multiple TRPs is transmitting to the UE. M-TRP communication allows the UE to receive, from multiple TRPs, on possibly overlapping time-frequency resources. Therefore, the UE may need to maintain multiple DL tracking loops, one for each NCLed TRP, and apply the associated FFT windows to receive DL transmissions from the TRPs, respectively. It is thus desirable that, the UL/DL signals/channels, or generally, radio resources (e.g., the UL/DL signals/channels, time and/or frequency resources, antenna ports, or any combination thereof), may be separated into groups, called resource groups (RGs), according to the NCLed TRPs. Different TRPs may be associated with different RGs. The RGs may be associated with different TAs or DL tracking loop and used for communication of the UE with respective TRPs in the M-TRP communications. Within each RG, the resources are generally directly or indirectly QCLed, and may share some common properties and parameters, such as timing advance (TA) or DL timing; and across different RGs, the resources are generally NCLed and may have different properties and parameters such as TA or DL timing. Each collocated TRP (or nearly-collocated TRP) may form a RG, and non-collocated TRPs are considered as different RGs.

Embodiments of the present disclosure provide methods for M-TRP communications. The embodiments improve UL/DL transmission/reception reliability, qualities, throughputs, and user experience of UEs in the M-TRP communications, enable new M-TRP transmission/reception schemes to exploit diversity in space, time and frequency, and facilitate communications between a UE and multiple TRPs. In some embodiments, a method is provided for M-TRP communications of a UE in a serving cell over a carrier/BWP of the serving cell, where separate RGs are configured for different TRPs. In some embodiments, methods are provided for configuring the TRPs with separate RGs, and acquiring/obtaining/maintaining timings and association relationships of the separate TAGs by the UE.

In some embodiments, methods are provided for PUSCH repetition transmissions in M-TRP communications of a UE. In an embodiment, the UE may receive first information indicating a layer number and a first transmit precoding matrix index (TPMI) to be used for a first physical uplink shared channel (PUSCH). The UE may receive second information indicating a second TPMI to be used for a second PUSCH. The first TPMI and the second TPMI correspond to the (same) layer number. The UE may transmit data on the first PUSCH over a carrier according to the layer number and the first TPMI, transmit the same data on the second PUSCH over the carrier according to the layer number and the second TPMI, for PUSCH repetition transmissions. The formats (e.g., the bit widths) of the first information and the second information may be pre-determined by the network and configured for the UE, and the first information and the second information may then be determined by the network on the fly and indicated for the UE for the PUSCH repetition transmissions.

In some embodiments for M-TRP communications of a UE, the UE may transmit a first uplink reference signal (RS) associated with a first synchronization signal block (SSB), and transmit a second uplink RS associated with a second SSB that is different than the first SSB. The first SSB is associated with a first physical cell ID (PCI), and the second SSB is associated with a second PCI different than the first PCI. The first SSB and the second SSB may be associated with a first TRP and a second TRP, respectively, in the M-TRP communications. With these embodiments, the UE can better utilize the radio resources with a neighboring cell, that is, the neighboring cell may be incorporated for the UE as an inter-cell M-TRP to communicate with the UE, thus expanding the scope of M-TRP communication from supporting only intra-cell M-TRPs (collocated TRP(s) or nearly-collocated TRP(s) with the serving gNB) to also supporting inter-cell M-TRPs (which may be far away from the serving gNB).

FIG. 1 illustrates an example wireless communication system loft Communication system 100 includes a base station no with coverage area 101. The base station no serves a plurality of user equipments (UEs), including UEs 120. Transmissions from the base station no to a UE is referred to as a downlink (DL) transmission and occurs over a downlink channel (or connection, shown in FIG. 1 as a dotted arrowed line), while transmissions from a UE to the base station no is referred to as an uplink (UL) transmission and occurs over an uplink channel (or connection shown in FIG. 1 as a dashed arrowed line). Data carried over the uplink/downlink connections may include data communicated between the UEs 120, as well as data communicated to/from a remote-end (not shown) by way of a backhaul network 130. Example uplink channels and signals include physical uplink shared channel (PUSCH), physical uplink control channel (PUCCH), uplink sounding reference signal (SRS), or physical random access channel (PRACH). Services may be provided to a plurality of UEs by service providers connected to the base station no through the backhaul network 130, such as the Internet. The wireless communication system 100 may include multiple distributed base stations no.

In a typical communication system, there are several operating modes. In a cellular operating mode, communications to and from the plurality of UEs go through the base station no, while in device to device communications mode, such as proximity services (ProSe) operating mode, direct communication between UEs is possible. As used herein, the term "base station" refers to any component (or collection of components) configured to provide wireless access to a network. Base stations may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, access nodes, access points, transmission points (TPs), transmission-reception points (TRPs), cells, carriers, macro cells, femtocells, pico cells, relays, the network side, the network, and so on. In the present disclosure, the terms "base station" and "TRP" are used interchangeably unless otherwise specified. As used herein, the term "UE" refers to any component (or collection of components) capable of establishing a wireless connection with a base station. UEs may also be commonly referred to as mobile stations, mobile devices, mobiles, terminals, user terminals, users, subscribers, stations, communication devices, customer premises equipment (CPE), relays, Integrated Access and Backhaul (JAB) relays, and the like. It is noted that when relaying is used (based on relays, picos, CPEs, and so on), especially multi-hop relaying, the boundary between a controller and a node controlled by the controller may become blurry, and a dual node (e.g., either the controller or the node controlled by the controller) deployment may exist where a first node that provides configuration or control information to a second node is considered to be the controller. Likewise, the concept of UL and DL transmissions can be extended as well.

A cell may include one or more bandwidth pails (BWPs) for UL or DL allocated for a UE. Each BWP may have its own BWP-specific numerology and configuration, such as the BWP's bandwidth. It is noted that not all BWPs need to be active at the same time for the UE. A cell may correspond to one carrier, and in some cases, multiple carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL, or simply UL) carrier, which has an associated DL carrier, and other carriers are called supplementary UL (SUL) carriers which do not have an associated DL carrier. A cell, or a carrier, may be configured with slot or subframe formats comprised of DL and UL symbols, and that cell or carrier is seen as operating in a time division duplexed (TDD) mode. In general, for unpaired spectrum, the cells or carriers are in the TDD mode, and for paired spectrum, the cells or carrier are in a frequency division duplexed (FDD) mode. A transmission time interval (TTI) generally corresponds to a subframe (in LTE) or a slot (in NR). Access nodes may provide wireless access in accordance with one or more wireless communication protocols, e.g., long term evolution (LTE), LTE advanced (LTE-A), 5G, 5G LTE, 5G NR, future 5G NR releases, 6G, High Speed Packet Access (HSPA), Wi-Fi 802.11a/b/g/n/ac, etc. While it is understood that communication systems may employ multiple access nodes (or base stations) capable of communicating with a number of UEs, only one access node, and two UEs are illustrated in FIG. 1 for simplicity.

Uplink timing may be controlled through timing advance (TA). TA is generally used to compensate for the propagation delay as signal travels between UEs and their serving network nodes, e.g., TRPs. Uplink timing of a UE may be measured by a TRP using an uplink signal or channel, e.g., PUSCH, PUCCH, PRACH or SRS, transmitted by the UE. A TA value may be determined and assigned to the UE based on the measurement. Timing advance commands may be transmitted, e.g., periodically, by the TRP, generally in a medium access control (MAC) command entity (CE). A timing advance command may include a TA value, based on which the UE adjusts its uplink transmission timing to align with the timing at the network side. With proper TA values applied to UL transmissions from UEs in a cell, the UL transmissions of the UEs arrive at the base station at about the same time to facilitate detection and/or decoding of the UL transmissions from the multiple UEs, Cells are grouped into different timing advance groups (TAGs). Cells having an uplink to which the same TA applies (e.g., cells hosted by the same transceiver) and using the same timing reference cell may be grouped in one TAG. Thus, cells grouped in the same TAG have the same TA. Each cell may be associated with a TAG. A cell may be assigned to a TAG via radio resource control (RRC) signaling. Each TAG may update its corresponding TA periodically. When receiving a TA command of a cell associate with a TAG, a UE adjusts its uplink transmission timing, e.g., for transmission of PUCCH, PUSCH, and/or SRS of the cell, based on the received TA command of the associated TAG.

In 3GPP 5G NR Release 15 and 16 (R15/16), TAGs are cell based. In one carrier, there is only one serving cell, which is assigned with one TAG. In 3GPP Rib, for M-TRP communications, a TRP not configured as a serving cell (e.g., TRP1 214 in FIG. 2) of a UE is configured with the same TAG of its co-channel cell (e.g., TRP0 212 in FIG. 2). A serving cell (PCell and/or SCell) of a UE is configured, in its information element (IE) ServingCellConfig, with a field tag-Id, which uniquely identifies a TAG. For all serving cells configured with the same tag-Id, they belong to the same TAG. The current framework of TA/TAG allows only a serving cell to be configured with a TA/TAG. In one carrier, there can be only one serving cell, and that cell is assigned with one TAG. With Rel-16 M-TRP design, for a TRP not co-located with a serving cell, Rel-16 does not have a separate TA for it and the UE applies the TA of the co-channel serving cell for this TRP. This works fine even for M-TRP scenarios provided that the multiple TRPs are not located far away from one another, are connected by fast backhaul, and are tightly synchronized. However, this has limited applications/deployment scenarios and needs to be enhanced.

When a UE is served by multiple TRPs in a serving cell associated with a TAG in a BWP over a carrier, the UE's uplink transmission timing for all the multiple TRPs in the BWP over the carrier is adjusted using the same TA of the TAG associated with the serving cell. Note that the multiple TRPs over the same carrier operate on the same BWP as specified in Rel-16. Using the same TA of a serving cell for communication with different TRPs may, in some cases, cause inaccurate uplink timing. This may negatively affect the UE's PUCCH/PUSCH reliability, spectrum efficiency, and sounding accuracy for uplink/downlink full multi-input multi-output (MIMO) channel state information (CSI) acquisition. Cyclic prefix (CP) may not be sufficient to cover the propagation delay differences, delay spread, and M-TRP sync inaccuracy.

Likewise, DL timing difference between the M-TRPs (especially inter-cell TRPs) may cause the CP or one FFT insufficient. How well the time/frequency synchronization between the M-TRPs is may depend on the backhaul assumption. If ideal backhaul can be assumed, then the timing/frequency differences between the TRPs are likely negligible; otherwise, non-negligible synchronization errors should be considered in the design. Regarding backhaul latency and coordination, generally, at least for inter-cell TRPs, ideal/fast backhaul cannot be assumed. Backhaul latency of a few milliseconds to a couple of tens of milliseconds and semi-static coordination should be considered in the design. Inter-TRP signal delay spread relative to the CP length should also be considered. Depending on the synchronization among the inter-cell TRPs and the relative distances of the TRPs to the UE, possible assumptions may be: the inter-cell signal delay spread is within the CP length but close to the CP length, i.e., even though the inter-TRP signal delay spread is within the CP length, the arrival time difference from the TRPs may still be large.

In a wireless network providing M-TRP communications, an M-TRP setting may include non-co-located TRPs, e.g., TRP0, TRP1, and TRP n may serve a UE on the same carrier. A problem may arise in that one DL tracking loop/FFT window and/or one UL TAG may be insufficient, especially for scenarios with >15 kHz subcarrier spacing (SCS). In one approach, the UE may need to maintain multiple FFT windows and multiple TAGs on the same carrier.

To support inter-cell M-TRP communications, the following configuration may be used:
  a SSB may be configured to a UE but not as a SCell of the UE
  TRS is QCLed to the SSB
  The SSB/TRS forms a R17 TAG, even when there is already a co-channel TAG—In one carrier, there may be one serving cell, but multiple TAGs, SSBs, PCIDs (different from carrier aggregation/dual connectivity (CA/DC))

A R17 random access procedure is needed: PUSCH/DMRS need TRP-specific scrambling ID(s)
For M-TRP without an additional SSB configured (e.g., intra-cell), the following configuration may be used:
  TRS forms a R17 TAG, even when there is already a co-channel TAG—Signals QCLed to the TRS form a separate TAG
  R17 random access procedure is needed in some cases: PUSCH/DMRS need TRP/TRS-specific scrambling ID(s)
  A PDCCH order may be used to indicate that a UE need to perform the random access procedure (e.g., sending a RACH) to which TRP, via a ID or QCL relation/default relation (cross-TRP PDCCH order)

Figure 2:
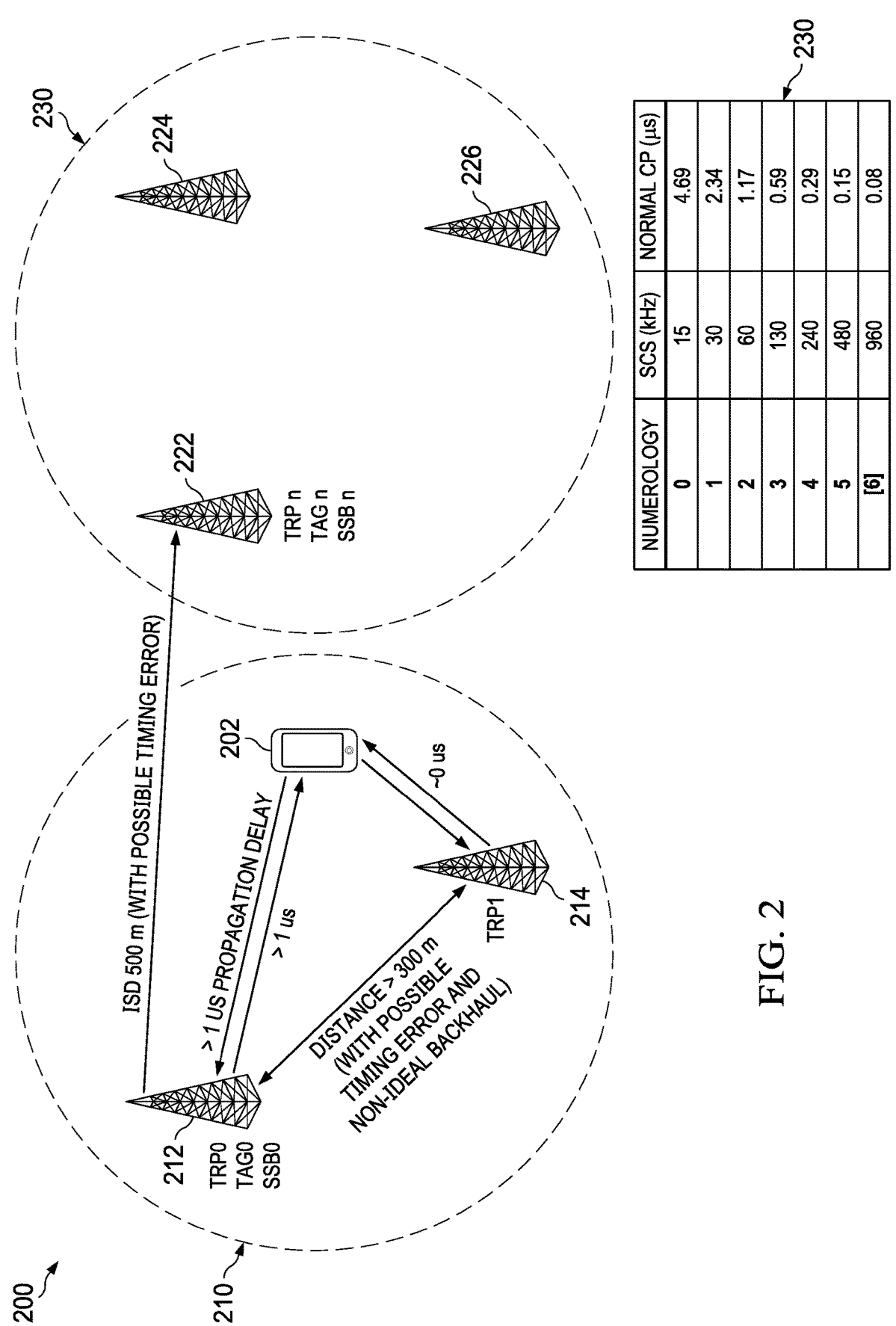
FIG. 2 illustrates a diagram of an embodiment wireless network.

FIG. 2 illustrates a diagram of an embodiment wireless network 200, highlighting a scenario causing inaccurate uplink TA and downlink timing. As shown, the wireless network 200 includes a serving cell 210 (or base station) of a UE 202 serving the UE 202 over a carrier. A TRP0 212 operating on a BWP over the carrier is co-located with the base station or cell 210, and broadcasts a PCID/SSB for the cell 210. The TRP0 212 transmits the SSB generated based on the physical cell ID (PCID) of the cell 210, and thus the PCID is transmitted/broadcast via transmission of the SSB. This is simplified as a TRP transmitting (or broadcasting) PCID/SSB in the following descriptions of the present disclosure for illustrative convenience. The SSB generated based on the PCID of the cell 210 is thus associated with the cell 210 (or the PCID) or of the cell 210. A signal unassociated with the cell 210 indicates that the signal is not associated with the PCID of the cell, or not associated with a signal of the cell 210, directly or indirectly (see more detailed description based on quasi co-location below). The TRP0 212 may be configured to operate over one or more carriers/BWPs. The TRP0 212 212 may be referred to as a co-located TRP of the cell 210. A TRP1 214 is located in the coverage area of the serving cell 210 (with a certain distance from the TRP0 212) and configured to cooperate with the TRP0 212 to serve UEs in the serving cell 210 over the carrier, i.e., providing multi-TRP (m-TRP, or M-TRP) communications over the carrier. The TRP1 214 is within the coverage range of the serving cell 210, assisting the serving cell 210, and not broadcasting the PCID/SSB for the cell 210, and may rely on the serving cell 210 for some functionalities (e.g., control plane functionalities), and thus it is considered as an intra-cell TRP of the cell 210. The TRP1 214 may be referred to as an intra-cell TRP of the cell 210, and co-channeled (i.e., serving over the same carrier) with the TRP0 212. The TRP1 214 may not be co-located with the cell 210 and does not broadcast any PCID or SSB. The TRP1 214 may not be co-located with the TRP0 212. However, in some deployment, e.g., at frequency range 2 (FR2), the TRP1 214 may also broadcast the same PCID as the TRP0 212 does, and transmit a SSB as a reference for timing/beam (e.g., the SSB can be used by a UE for timing synchronization and initial beam acquisition for communication with the TRP1 214) but on a different SSB resource than the SSB transmitted by the TRP0 212. The wireless network 200 also includes a TRPn 222 associated with a cell 220, which may be a neighbor cell of the serving cell 210. As a neighbor cell instead of a serving cell, the TRPn 222 generally does not serve UEs that are served by the cell 210, but may cause interference to the UEs served by the cell 210, and it is not configured as a serving cell for the UEs served by the cell 210. This is different from a serving cell transmitting RRC/MAC/PHY layer signals to a UE and maintaining a connection to the UE. TRPs 224, 226 are located in the coverage area of the cell 220 and configured to cooperate with the TRPn 222 to serve UEs of the cell 220 over one or more carriers supported by the TRPn 222. The UE 202 may be served by both the TRP0 212 and TRP1 214 over the same carrier, or over different carriers. Each of the cells 210 and 220 has an associated physical cell identifier (PCID, or PCI, used interchangeably) and a synchronization signal block (SSB), based on which UEs synchronize with the respective cell.

As used herein, a TRP being co-located with another TRP (or base station, or cell) indicates that the two TRPs are at the same location and share the same set of antennas, and may, in some cases, even share the same antenna configuration (e.g., the same analog antenna beamforming). A co-located relation between two TRPs may be known to the network side but not be revealed to a UE, i.e., transparent to the UE. In some cases, it may be useful for the UE to know whether two received signals are from the same transmitter (or TRP, or antenna) or not, and QCL assumptions between RS ports of the transmitters may be introduced and signaled to the UE. A TRP being co-channeled with another TRP (or base station, or cell) indicates that they operate on the same carrier in frequency. A standalone TRP transmits a SSB/PCID of a cell (the signal on the SSB is generated based on the PCID), and thus a UE can find it during a cell search/initial access procedure. The UE connects to the standalone TRP/cell after that. A non-standalone TRP does not transmit a SSB/PCID, and thus a UE cannot find it during a cell search/initial access procedure. The UE cannot connect to the non-standalone TRP directly. The UE first connects to a standalone TRP/cell, and then the standalone TRP/cell signals the UE with information about the non-standalone TRP, so that the UE may communicate with the non-standalone TRP.

In this example, the cell 210 is assigned to TAG1 associated with the carrier. The UE 20 may have established a connection with the cell 210 through a random access procedure, and receives a TA command of the TAG1 from the TRP0 212. The TA value in the TA command is generally related to the distance between the TRP0 212 and the UE 202. The UE 202 then transmits uplink signals/channels over the carrier to both the TRP0 212 and TRP1 214 according the TA command, i.e., the same TA value, if they are in the same TAG as in Rel-16 (i.e., if they are configured with the same TAG according to Rel-16). However, in a case where the TRP0 212 and TRP1 214 are located far away from each other, e.g., with a distance greater than 300 m, with non-ideal backhaul (e.g., with a backhaul latency of 10-20 ms or even longer, which may cause them not tightly synchronized with each other) between the TRPs 312, 314, and the UE 202 is closer to the TRP1 214 (e.g., with nearly no propagation delay) than to the TRP0 212 (e.g., with a greater than 1 us propagation delay), uplink timing error may occur when the UE 202 communicates with the TRP1 214 using the TA value of the TAG1, which is assigned based on the TRP0 212. This is because that the TA of the TAG1 is not well suited for TRP1 214 in view of the distance between the TRP1 214 and the TRP0 212, between the TRP1 214 and the UE 202, and between the TRP0 212 and the UE 202. In this case, there is a large propagation delay difference between the TRP1 214 and the UE 202, and between the TRP0 212 and the UE 202. Cyclic prefix (CP) may help mitigate the propagation delay difference to some extent, however, for higher subcarrier spacing (SCS), e.g., greater than 15 kHz, CP is short as shown in the table 230 in FIG. 2 and may not be sufficient to absorb such a large propagation delay difference, resulting in poor uplink timing alignment of the UE 202 with respect to the TRP1 214. Thus, it would be desirous to configure a separate TA value and hence a separate TAG for the UE 202 to communicate with the TRP1 214, although TRP0 212 and TRP1 214 are co-channeled in the same carrier of the serving cell 210 of the UE 202. That is, the TRP0 212 and the TRP1 214 may be associated with different TAGs, so that the UE 202 adjusts its uplink transmission timing differently for communications with the TRP0 212 and the TRP1 214, respectively. The UE 202 may need to perform a random access procedure to acquire the TA of a TAG associated with the TRP1 214 and synchronize with the TRP1 214 that does not have a standalone PCID, especially for SCS greater than 15 kHz. By doing so, more TRPs, especially TRPs far from the each other, can be added to the serving TRP pool for the UE 202 and well utilized by the UE 202.

Likewise, in the DL, a first transmission from the TRP0 212 and a second transmission from the TRP1 214 may generally arrive at the UE at different timings, and the timing differences may be more pronounced relative to the CP length when the two TRP0 212 and TRP1 214 are located far away from each other, with non-ideal backhaul (e.g., with a backhaul latency of 10~20 ms or even longer, which may cause them not tightly synchronized with each other) between the TRPs 212 and 214, not tightly synchronized between the TRPs 212 and 214, with long delay spread, with short OFDM symbol duration due to large SCS, and so on. One DL tracking loop/FFT window may be insufficient. The UE may need to maintain multiple FFT windows on the same carrier for NCLed TRPs. In addition, since the TRPs are not close to each other, the channel properties (e.g., Doppler shift, Doppler spread, average delay, delay spread, Spatial Rx parameter) between the UE 202 and the TRP0 212 may be quite different from the channel properties between the UE 202 and the TRP1 214, and hence to improve transmission/reception quality, the UE needs to apply different parameters accordingly. For this reason, the UE 202 needs to be signaled with information about which TRP a transmission/reception corresponds to and then adapts communication parameters accordingly.

In some cases, the network may also configure the TRPn 222 to serve the UE 202202 over the same carrier, without configuring it as a secondary cell (SCell) of the UE 202, e.g., in order to provide increased network capacity. The TRPn 222 is an inter-cell TRP, as opposed to an intra-cell TRP; however, it may be transparent to the UE 202. In this case, with Rel-16 design, the UE 202 may still use the TA of the TAG1 for uplink transmission to the TRPn 222, and the FFT window acquired from TRP0 212 212's RS/SSB for DL reception with the TRPn 222. However, if the TRPn 222 is located far away from the TRP0 212, e.g., greater than 500 meters, and/or if the timing of the TRPn 222 is not tightly synchronized to the TRP0 212, timing error occurs because the timing based on the TRP0 212 is not well suited for TRPn 222 in view of the distance/timing differences between the TRPn 222 and the TRP0 212, and between the TRPn 222 and the UE 202. It would also be desirous to configure a separate TAG, DL timing, and RG for the UE 202 to communicate with the TRPn 222 over the carrier. By doing so, more TRPs, including inter-cell TRPs, can be added to the serving TRP pool for the UE 202 and well utilized by the UE 202.

To compare the intra-cell M-TRP and inter-cell M-TRP, it is important to understand why a "cell" is needed for inter-cell M-TRP, from a UE perspective and also from the standards perspective. This is related to this disclosure's discussion in other parts of the disclosure, where a term "additional cell" is used. This is also related to a consideration that a deployment scenario for an inter-cell is different from that of an intra-cell in M-TRP communications. An additional cell is a cell configured for a UE on a carrier with a serving cell, and the additional cell's PCI is different from the serving cell's PCI. The UE may communication data with the additional cell. The additional cell is not considered as a neighbor cell or interfering cell as it may communicate data with the UE, and is not considered as a serving cell since there is already a serving cell on that carrier. An additional cell is not a fully-functioning standalone cell from the UE's perspective. The PCI of the additional cell may be referred to as an additional PCI, and the SSB of the additional cell may be referred to as an additional SSB. For the purpose of description simplicity, the additional cell may be generally referred to as a "non-serving cell" or an "inter-cell", and its PCI/SSB may be referred to as "non-serving PCI/SSB". However, it is noted that the use of the term "non-serving cell" to refer to an additional cell herein should not be interpreted as the additional cell does not serve the UE. Instead, the additional cell can serve the UE.

For intra-cell M-TRP:

Generally, fast/ideal backhaul and coordination can be assumed, tight/ideal time/frequency/phase synchronization can be assumed, and the distance between the TRPs is not large. Therefore, from the UE perspective, the TRPs share many common properties, such as the same time/frequency/ phase synchronization, and thus one source, i.e., one PCI/ SSB, is sufficient for a UE to communicate with the TRPs. An intra-cell TRP's rough synchronization can be derived from the serving cell TRP, and a signal/antenna port of the intra-cell TRP may be directly or indirectly quasi collated (QCLed) to that of the serving cell TRP. Whether the intra-cell TRP has a PCI or not can be transparent to the UE.

For inter-cell M-TRP:

Generally, fast/ideal backhaul and coordination cannot be assumed, tight/ideal time/frequency/phase synchronization cannot be assumed, and the distance between the TRPs can be large. Therefore, from the UE perspective, most of the properties can be different for the TRPs, such as the time/ frequency/phase synchronization and other large/small-scale channel properties. As a result, one source, i.e., one PCI/SSB is not sufficient, and TRP-specific sources, i.e., separate PCIs/SSBs, are required for the UE to communicate with the TRPs, if the TRPs are allowed to be potentially non-co-located, potentially non-ideal backhaul connected, and/or potentially standalone, with very different channel properties. Due to these different channel properties, they cannot operate as completely transparent to UEs as co-located or nearly co-located, ideal backhaul connected TRPs, and they cannot operate in a non-standalone fashion. That is, they cannot operate as intra-cell TRPs.

Although RAN1 has concluded that a UE may assume received DL transmission from multiple inter-cell TRPs, it should be appreciated that the properties for inter-cell M-TRPs are more different than those for intra-cell M-TRPs. A signal/antenna port of an inter-cell TRP shall not be directly or indirectly QCLed to that of a serving cell TRP.

The QCL relationship widely used in intra-cell M-TRPs may no longer be suitable for inter-cell M-TRPs. In contrast to the term QCL, this disclosure uses a term non-co-location (NCL) for the convenience of description. This term may or may not need to be introduced in 3GPP standards, but it can be useful/convenient in discussions to emphasize the fundamental difference between intra-cell M-TRPs and inter-cell M-TRPs. This term will be discussed in the following with more details.

For an intra-cell TRP in an intra-cell M-TRP communication scenario, a signal/antenna port may be directly or indirectly quasi-co-located (QCLed) to the serving cell (i.e., the serving cell's SSB).

For an inter-cell TRP in an inter-cell M-TRP communication scenario, a signal/antenna port is non-co-located (NCLed) to the serving cell (i.e., the serving cell's SSB), and is directly or indirectly QCLed to a non-serving cell's SSB. For an inter-cell TRP, an additional PCI different from the serving cell PCI may be supported per carrier, and the additional PCI is associated with one or more transmission configuration indicator (TCI) states that are activated for channel state information-reference signal (CSI-RS) for CSI, PDSCH/PDCCH, etc., per carrier.

Embodiments of the present disclosure provide methods for M-TRP communications of a UE in a serving cell of the UE over the same carrier/BWP of the serving cell, with separate RGs configured for multiple TRPs in the M-TRP communications. The embodiment methods provide a solution to the problem discussed above with respect to FIG. 2, which improves timing accuracy of the UE in the M-TRP communications. The embodiment methods may be applied to intra-cell M-TRP communications, inter-cell M-TRP communications, or a mix of intra-cell and inter-cell M-TRP communications. In the intra-cell M-TRP communications, all of the multiple TRPs are located within the coverage area of the current serving cell of the UE. Such a TRP of the multiple TRPs may be referred to as a co-cell (or intra-cell) TRP of the serving cell in the disclosure for illustrative convenience, e.g., TRP1 214 is a co-cell TRP of TRP0 212 or cell 210, and if it also serves the UE by transmitting/ receiving data with the UE, it may be referred to as an intra-cell serving TRP or simply intra-cell TRP of the UE. In the inter-cell M-TRP communications, one or more TRPs serving the UE may be from another cell different from the serving cell of the UE, and are referred to as inter-cell serving TRPs (or simply inter-cell TRPs) in the disclosure for illustrative convenience. A TRP acting as the serving cell of the UE and broadcasting a PCID/SSB of the serving cell may be referred to as the serving cell of the UE in the disclosure for illustrative convenience. The UE is in the coverage area of the serving cell. The TRP is thus associated with the serving cell of the UE. Using FIG. 2 as an example, the UE 202 is in the coverage area of the cell 210, the TRP0 212 broadcasting SSB0 of the cell 210 may be referred to as the "cell", "serving cell", or "base station" for the UE 202, and other TRPs that serve the UE 202 may be referred to as serving TRPs of the UE 202. TRPs serving the UE 202 may be intra-cell (e.g., TRP1 214) and/or inter-cell (e.g., TRPn 222), co-located with the (serving) cell (e.g., TRP0 212), or non-co-located with the (serving) cell (e.g., TRP1 214, and TRPn 222). The intra-cell TRP1 214 may or may not broadcast the PCID/SSB of the serving cell 210 of the UE, but in some deployment, e.g., at FR2, the TRP1 214 may also broadcast the same PCID as the TRP0 212 does, and transmit SSB as a reference for timing/beam but on a different SSB resource than the TRP0 212. The inter-cell TRPn 222, located in a coverage area of another cell, may or may not broadcast a PCID/SSB of that cell. Each TRP may have one or more carriers. For M-TRP scenarios, a UE 202 may also operate with carrier aggregation, i.e., it communicates over multiple carriers with the TRP0 212, and on each of these carriers, the UE 202 may also be served by one or more intra-cell TRPs, such as the TRP1 214 and/or inter-cell TRPs, such as the TRPn 222. That is, the UE may communicate with those TRPs on multiple carriers.

In some embodiments, in one carrier, there is one serving cell, but there are multiple TAGs, RGs, SSBs, and/or PCIDs configured for a UE. A serving TRP of the UE, e.g., TRP0 212, may be associated with a TAG (or a co-channel TAG, TAG0 as shown in FIG. 2) and a RG (or a co-channel RG, RG0 as shown in FIG. 2), e.g., using RRC signaling as conventionally configured, if it is associated with the serving cell 210 of the UE, as discussed above. A TA may be seen as a (an optional) parameter associated with a RG, and RGs are described as an example, which also apply to TAG (unless otherwise specified), in the following. A resource group (RG) may include one or more signals and/or channels, one or more time and/or frequency resources, one or more antenna ports, a TAG or TA, or any combination thereof. An RG may be configured for uplink communications, downlink communication, and/or one or more TRPs in an M-TRP communication. In general, each TRP in a location forms an RG, and different TRPs in different locations form different RGs, though TRPs close to each other may still belong to one RG. In a standard specification, the term "TRP" is generally avoided, and hence a term such as "RG" (for explicit grouping) or terms such as QCL relation/TCI states that define relations/linkages/associations between resources, signals, and/or channels (for implicit grouping) may be used instead of explicitly referring to RGs. In some places of this disclosure, the descriptions of the grouping/relation may be based on either the explicit grouping method or the implicit grouping method, but not both, for simplicity; however, either method is generally equivalent to the other and may be interpreted as both methods are provided.

In an embodiment, a group of UL signals/channels form a UL RG and a group of DL signals/channels form a DL RG, i.e., the RGs are separate for UL and DL. In an embodiment, a group of UL/DL signals/channels form an RG, i.e., no separate RGs for UL and DL. In an embodiment, one UL RG is associated with one DL RG and vice versa. In an embodiment, one UL RG is associated with multiple DL RGs. In an embodiment, one DL RG is associated with multiple UL RGs. In an embodiment, a separate TAG is not configured but a separate RG is configured, and each RG is associated with a TA, which is an alternative approach to configure a separate TAG. In an embodiment, a separate TAG is not configured but a separate UL RG is configured, and each UL RG is associated with a TA. In an embodiment, a separate TAG is configured in parallel to a separate RG, and each TAG is associated with a RG. An intra-cell or inter-cell serving TRP not configured as a serving cell or not co-located with a serving cell of the UE, e.g., TRP1 214, or TRPn 222, may be associated with a RG separate from a RG of the serving cell (TRP0 222).

For a serving TRP not transmitting a SSB, e.g., the TRP1 214, a tracking reference signal (TRS), also referred to as a channel state information-reference signal (CSI-RS) for tracking, of such a serving TRP may be used to form a separate RG, even when there is already a co-channel RG associated with the serving cell, e.g., the cell 210. UL/DL signals of the UE that is quasi-co-located (QCLed) to the TRS are associated with the separate RG. Thus, the TRS may be used to form the separate RG. For example, the UE 202 communicates with the TRP0 and TRP1 on the same carrier. TRP0 is configured with RG0. TRS of the TRP1 may be used to form a separate RG for TRP1. UL/DL signals of the UE QCLed to the TRS are communicated according to this separate RG with the TRP1. The TRP0 212 may operate on more than one carrier, and the carriers not far away from each other in the frequency domain may belong to the same RG, i.e., RG0. TRP1 214 may also operate on more than one carrier, each of which is co-channeled with one carrier on the TRP0 212, and each of which has a TRS transmitted; all UL/DL signals of the UE that is quasi co-located (QCLed) to these TRSs of the TRP1 214 are associated with the separate RG. In general, TRSs transmitted from the same/co-located TRP on a same frequency band can be used to define a RG, and TRSs transmitted from non-co-located TRPs may be associated with different RGs. TRP/TRS-specific scrambling ID(s) may be needed for PUSCH and for demodulation reference signal (DMRS) of PUSCH communicated during the random access procedure, as well as TRP/TRS-specific scrambling ID(s) for DMRS of PDSCH, TRP/TRS-specific scrambling ID(s) for physical downlink shared channel (PDSCH), TRP/TRS-specific scrambling ID(s) for DMRS of physical downlink control channel (PDCCH), and TRP/TRS-specific scrambling ID(s) for PDCCH.

The quasi co-location (QCL) types corresponding to each DL RS (more specifically, the port(s) or antenna port(s) of the DL RS) are given by the higher layer parameter qcl-Type in QCL-Info and may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. The QCL types may be configured/indicated in transmission configuration indication (TCI) states for a RS. The QCL assumptions are mainly used for DL RS, but can be generalized for UL RS if the association via pathloss RS and spatial relation are specified. The QCL assumption for RS1 may be specified as: {RS1: QCL Type C to RS2}, {RS1: QCL Type C to RS2 and QCL Type D to RS3}. Then properties of RS1 (destination RS or target RS) may be derived according to the QCL types from the associated RSs (i.e., source RS or reference RS, e.g., RS2). Note that the source RS may be a SSB. Note also that the source RS and destination RS may be on the same carrier or different carriers (i.e., cross-carrier QCL).

For an inter-cell serving TRP, e.g., TRPn 222, a SSB of the inter-cell serving TRP 222 may be configured to the UE but not as a serving cell (Scell) of the UE (i.e., the cell associated with the SSB of the inter-cell serving TRP is not one of the serving cells of the UE). A TRS of the inter-cell serving TRP may be used to form a separate RG, even when there is already a co-channel RG associated with the serving cell, e.g., the cell 210. For communications with the inter-cell serving TRP 222, TRP-specific scrambling ID(s) may be needed for PUSCH and for DMRS of PUSCH communicated during a random access procedure, as well as TRP/TRS-specific scrambling ID(s) for DMRS of PDSCH, TRP/TRS-specific scrambling ID(s) for PDSCH, TRP/TRS-specific scrambling ID(s) for DMRS of PDCCH, and TRP/TRS-specific scrambling ID(s) for PDCCH. The RGs in the inter-cell M-TRP case are also different from the cell groups in Dual Connectivity (DC), since in DC, different frequency resources (i.e., different carriers or cells) on different TRPs are aggregated, i.e., on a same carrier, and the UE is connected with only one TRP, whereas in inter-cell M-TRP, the UE is connected to more than one TRP on a carrier.

A PDCCH may be used to indicate, via an ID or quasi co-location (QCL) relation and/or a default relation, which serving TRP, e.g., the TRP1 214 or the TRPn 222, that a UE is receive a PDSCH from or transmit a PUSCH to. Each TRP may be associated with an ID, such as a control resource set (CORESET) pool ID, so that, for example, a PDCCH received on a CORESET with a CORESET pool ID 0 indicates a PUSCH transmission to a TRP associated with the ID 0. In another example, a PDCCH received with a QCL relation/TCI state linking to a SSB or a TRS indicates a PUSCH transmission to a TRP associated with that SSB or TRS.

Taking FIG. 2 as an example, the UE 202 may be synchronized with the TRP0 212 that is the serving cell 210 of the UE 202 over a carrier, and receives a TA command for a first TAG or a first RG, i.e., TAG1 or RG1, that includes the serving cell 210. Thus, the UE 202 is configured with TAG 1 or RG1 for communication with the TRP0 212. A PDCCH order may be transmitted, by the TRP0 212 or the TRP1 214, to the UE 202, including information about random access parameters and triggering/instructing the UE 202 to perform a random access procedure with the TRP1 214, when the TRP0 212 for the serving cell 210 decides to connect the UE 202 with TRP1 214, or when the base station for the serving cell 210 finds that the TA to the TRP1 214 is lost or inaccurate. The UE 202 may then transmit a RACH preamble to the TRP1 214, and receive, e.g., in a random access response (RAR), a TA command of a second TAG or RG, e.g., TAG2 or RG2, which is associated with the carrier and includes the TRP1 214. Thus, the UE 202 is configured with TAG 2 or RG2 for communication with the TRP1 214. A PDCCH order may also be transmitted, by the TRP0 212 or the TRPn 222, to the UE 202, triggering the UE 202 to perform a random access procedure with the TRPn 222. The UE 202 may transmit a RACH preamble to the TRPn 222, and receive a TA command of a third TAG or RG, e.g., TAGS or RG3, which is associated with the carrier and includes the TRPn 222. Thus, the UE 202 is configured with TAG 3 or RG3 for communication with the TRPn 222. In an embodiment, each of the TAGs or RGs may be associated with a TAG ID or RG ID uniquely identifying a respective TAG or RG. In an embodiment, each of the TAGs may be associated with a TAG ID uniquely identifying a respective TAG, and the RGs do not have RG IDs but are one-to-one associated with the TAGs. After receipt of the TAs of the different TAGs or RGs, i.e., TAG1, TAG2 and TAGS, or RG1, RG2 and RG3, the UE 202 may perform uplink transmission over the carrier with the TRP0 212, TRP1 214 and TRPn 222 according to uplink transmission timing adjusted based on their respective TAs. A TA of an associated TAG or RG may be updated periodically, e.g., about every 20 to 50 ms, for each TAG or RG, and the updated TA may then be sent to the UE 202 in a TA command. The TA command may be carried in an MAC CE. The TA may be updated by the network by measuring an uplink transmission from the UE 202, e.g., a SRS. The UE 202 may adjust its uplink transmission timing for a TAG or RG according to the updated TA of the TAG or RG. The UE 202 may thus be served by two or more of the TRP0 212, TRP1 214 and TRPn 222 over the carrier, with each of the TRP0 212, TRP1 214 and TRPn 2222 associated with a separate TAG or RG. The separate TAG or RG enables the UE 202 to more accurately adjust its uplink transmission timing with a TRP of the separate TAG or RG.

The UE 202 may receive scheduling information scheduling uplink transmission of the UE 202 with a TRP on a carrier according to a RG associated with the TRP. In some embodiments, the UE 202 may receive first configuration information of the carrier of the serving cell 210 via a RRC configuration signaling. The first configuration information may include/indicate an association between a first group of uplink signals and channels to be transmitted on the carrier by the UE in the serving cell 210 and the RG1, and the RG1 is associated with a first TA value. That is, the first configuration information of the carrier indicates that transmission of the first group of uplink signals and channels by the UE is according to the first TA value of the RG1. The first configuration information may be transmitted by the TRP0 212 to the UE 202. The UE 202 may also receive second configuration information of the carrier, which includes/indicates an association between a second group of uplink signals and channels to be transmitted on the carrier by the UE and the uplink RG2, and the RG2 is associated with a second TA value. That is, the second configuration information of the carrier indicates that transmission of the second group of uplink signals and channels by the UE is according to the second TA value of the RG2. The second configuration information may be transmitted by the TRP0 212 or the TRP1 214 to the UE 202. Similarly, the UE 202 may also receive third configuration information of the carrier, which includes/indicates an association of a third group of uplink signals and channels on the carrier with the uplink RG3, and the RG3 is associated with a third TA value. That is, the third configuration information of the carrier indicates that transmission of the third group of uplink signals and channels by the UE is according to the third TA value of the RG3. The third configuration information may be transmitted by the TRP0 212 or the TRPn 222 to the UE 202. The first, second, and third configuration information of the carrier may be transmitted by the TRP0 212 in one message or separate messages. The UE 202 may then transmit, to the TRP0 212, a UL signal or a UL channel in the first group of UL signals and channels according to the first TA value. The UE 202 may transmit, to the TRP1 214, a UL signal or a UL channel in the second group of UL signals and channels according to the second TA value. The UE 202 may transmit, to the TRPn 222, a UL signal or a UL channel in the third group of UL signals and channels according to the third TA value. The first, second and third groups of UL signals and channels may be configured with a same subcarrier spacing (SCS) within a same BWP. Both the second and the third groups may be configured, or only one of the groups may be configured.

The serving cell 210 is associated with a first PCID and a first SSB. A UL signal or channel in the first group of UL signals and channels may be quasi-co-located (QCLed) to the first SSB, or QCLed to a downlink/uplink reference signal that is QCLed to the first SSB, or is configured with a pathloss RS that is the first SSB or is QCLed to the first SSB, or is configured with a spatial relation RS that is the first SSB or is QCLed to the first SSB. In an embodiment, all UL signal or channel in the first group of UL signals and channels are associated with the first RG.

A UL signal or channel in the second group of UL signals and channels may be QCLed to a TRS of the TRP1 214, or to a downlink/uplink reference signal that is QCLed to the TRS of the TRP1 214, or is configured with a pathloss RS that is the TRS or is QCLed to the TRS of the TRP1 214. In an embodiment, all UL signal or channel in the second group of UL signals and channels are associated with the second TAG. In an embodiment of network deployment, a TRS of the TRP1 214 may be "approximately" QCLed to the first SSB of the serving cell or a TRS of the first SSB, even though the TRP1 214 is not co-located with the TRP0 212 broadcasting the first SSB/PCID, which generally requires that the TRPs are not far away from each other, operate in frequency range 1 (FR1), and serve UEs that do not have high mobility. Still a separate TAG from the TAG for the first SSB/PCID may be beneficial. In an embodiment of network deployment, the TRP1 214 may broadcast the first PCID on a SSB resource different from the first SSB transmitted by TRP0 212, even though the TRP1 214 is not co-located with the TRP broadcasting the first SSB/PCID. A separate RG from the RG for the first SSB/PCID may be configured for the TRP1 214. The SSBs associated with the same PCID but occupy different SSB resources within one SSB burst in FR2 are distinguished via SSB indexes, and hence each SSB index may be used to define a separate RG if the SSBs with different SSB indexes are transmitted from non-co-located TRPs.

A UL signal or channel in the third group of UL signals and channels may be QCLed to a TRS of the TRPn 222, QCLed to a second SSB associated with a neighbor cell that has a second PCID different than the first PCID, e.g., the cell 320, or QCLed to a PCID of a cell other than serving cells of the UE 202, or QCLed to a downlink/uplink reference signal that is QCLed to the TRS of the TRPn1 322 or the second SSB, or configured with a pathloss RS that is the TRS of the TRPn1 322 or the second SSB, or that is QCLed to the TRS of the TRPn1 322 or the second SSB. In an embodiment, all UL signal or channel in the third group of UL signals and channels are associated with the third RG.

As discussed above, the embodiment methods associate serving TRPs, which are QCLed to a non-serving cell's SSB directly/indirectly, or which are not QCLed to a serving cell's SSB, or not co-located with a serving cell's TRP(s) transmitting the serving cell's SSB, with RGs/TAGs separate from the serving cell's RG/TAG, and a UE needs to perform random access with the serving TRPs to obtain separate TAs. As used herein, a first RS may be QCLed to a second RS/SSB directly. For example, the UE is signaled with a QCL assumption for the first RS that refers to the second RS/SSB for a QCL type, e.g., the UE receives a QCL assumption indicating {the first RS: QCL Type C to the second RS}. A first RS may be QCLed to a second RS/SSB indirectly, for example, the UE is signaled with a QCL assumption for the first RS that refers to one or more RS/SSB, which are further referred to the second RS/SSB for QCL, via one or more QCL assumptions in a concatenated manner, e.g., the UE receives a QCL assumption indicating {the first RS: QCL Type C to a third RS}, {the third RS: QCL Type A to a fourth RS}, and {the fourth RS: QCL Type C to the second RS}. In other words, one QCL assumption defines a relationship (or link) between a source RS and a destination RS, and multiple QCL assumptions may define a chain of relationships/links that associate a RS, directly using one link or indirectly using multiple links, to another RS/SSB.

For example, a PDCCH DMRS may be configured/indicated as QCLed to the first SSB of the serving cell or a TRS of the non-serving cell, and an ID is configured for the PDCCH DMRS. Then the UE may receive the PDCCH DMRS with the configured ID, and the DMRS and ID are associated with the TRS of the non-serving cell. The QCL assumptions/relations associate or link all the involved RSs, the channels associated with the RSs, and IDs associated with the RSs/channels, to the QCLed SSB (directly or indirectly via other UL/DL RS(s)), and serve as an implicit way to group the signals/channels/IDs according to respective TRPs into separate RGs.

Figure 3:
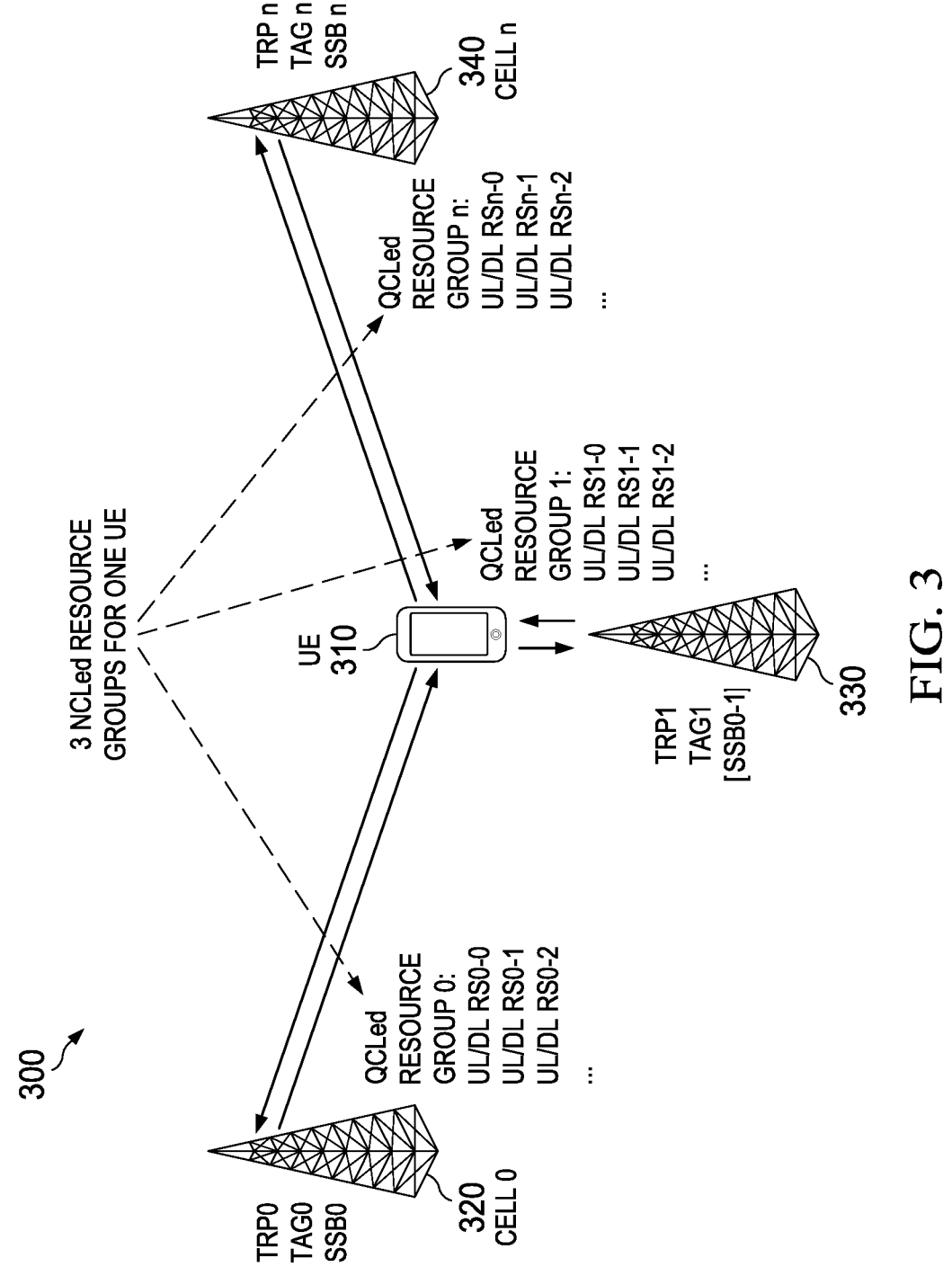
FIG. 3 illustrates a diagram of another embodiment of a wireless network.

FIG. 3 illustrates a diagram of an embodiment wireless network 300, highlighting multiple RGs configured for multiple TRPs in M-TRP communications. As shown, the network 300 includes a TRP0 320, a TRP1 330 and a TRPn 340 serving a UE 310 over a carrier. The TRP0 320 is a serving cell TRP associated with a serving cell (cell0) of the UE 310, and the TRP1 330 is an intra-cell TRP of the cell0. The TRPn 340 is an inter-cell TRP associated with a non-serving cell n. The TRP0 320 is associated with TAG0 and may send a SSB0 of the serving cell0. The TRP1 330 is associated with TAG1, and may also send the SSB but on a different resource (this SSB is referred to as SSB0-1). The TRP n 340 is associated with TAG n and may send a SSB n of the cell n. These TRPs are NCLed. The TRP0 320, TRP1 330 and TRPn 340 are configured with QCLed resource group 0, QCLed resource group 1 and QCLed resource group n, respectively. The term "QCLed" is used herein with the resource group, as resources within an RG are generally directly or indirectly QCLed with one another, and a resource group may be defined based on QCL relation, and different resource groups may be generally separated by NCL relation. In each RG, there are a group of signals comprising RSs (e.g., UL/DL RS0-0, UL/DL RS0-1, UL/DL RS0-2, and so on) and possibly SSB. The RGs are for the respective NCLed TRPs, but this is transparent to the UE 310. The UE 310 is configured with these RGs, and within each RG, the signals are QCLed directly or indirectly with each other. The UE 310 may not assume QCL relationship across the RGs. In general, each RG may include at least one of a SSB or a TRS. The QCL relationship may be generalized to also include pathloss (PL) RS relationship and spatial relationship. Any and all QCL types may be adopted to define a RG.

For inter-cell M-TRP communications, the signals, channels, and resources from/used for/to different cells correspond to different channels and may not be mixed, i.e., may not be QCLed, or may be NCLed. It is critical to ensure that the signals, channels, and resources from/used for/to different cells are NCLed, otherwise the inter-cell M-TRP operations may lead to errors. The NCL relationship may also be expanded to cover DL-UL spatial relation information, PL RS relation, linkage via an SRS resource indicator (SRI, which links a SRS resource to a signal/channel/resource/transmission), associated CSI-RS for SRS, DMRS and its associated channel, etc. That is, a signal, channel, or resource "QCLed" to a SSB directly or indirectly may be "NCLed" to any signal, channel, or resource that is "QCLed" to another SSB directly or indirectly, where the "QCL" and "NCL" are generalized to cover all abovementioned relationship.

In some embodiments, via the QCL/TCI and NCL relationship, all signals, channels, and resources of two respective cells may form two separate groups, with no QCL/TCI relationship across the groups. This implies that implicit grouping in inter-cell M-TRP is feasible. Thus, any explicit grouping, such as via an explicit group ID, may not be necessary.

With a non-serving SSB configured to the UE and based on the above analysis, it may be questionable whether the CORESET pool indexes are still needed. The UE can link PDCCH (via PDCCH's CORESET configuration and/or SS set configuration) as well as other transmissions/receptions to the inter-cell TRP via a QCL relation to the non-serving SSB, and hence the CORESET pool indexes do not need to be explicitly configured in this case. In fact, the CORESET pool indexes are explicit IDs used in Rel-16 to differentiate intra-cell TRPs, i.e., an alternative TRP ID. This was necessary for Rel-16 as an intra-cell TRP does not have any ID. However, for Rel-17 inter-cell M-TRP, the inter-cell TRP already has an ID-PCI, and there is no reason to introduce any other ID.

Hence, all explicit indexing/grouping options may not be needed. What is necessary may be, for inter-cell M-TRP, to indicate/associate a non-serving cell PCI via a QCL/TCI state, which implicitly groups all RSs, channels, resources and TCI states to the serving cell and the non-serving cell respectively.

In an embodiment, backward compatibility may be considered to reuse the Rel-16 mechanism, and CORESET pool indexes may be one-to-one mapped to the M-TRP standalone cells. For example, the serving cell may be 0 (which may be left as not configured), the first non-serving cell may be 1, the second non-serving cell may be 2, and so on. For each PCI, there is a unique CORESET pool index assigned to it.

In an embodiment, a deployment scenario may include both intra-cell M-TRP and inter-cell M-TRP. For example, cell 0 (represented by TRP0) is the serving cell, TRP 1 is an intra-cell with cell 0, cell 2 (represented by TRP 2) is a non-serving inter-cell, and TRP 3 is an intra-cell with cell 2. Each standalone cell (cell 0 or cell 2) can be used to form a RG which comprises all the TRPs associated with that cell. In an example, 2 RGs may be formed based on cell 0's PCI and cell 2'S PCI. Within each RG, the TRPs are intra-cell M-TRPs as defined in Rel-16, and the resources can be differentiated by CORESET pool indexes. Across the RGs, the TRPs are inter-cell M-TRPs not covered in Rel-16, and their resources can be differentiated based on association/ grouping via QCL/TCI association to corresponding PCIs. The CORESET pool indexes may be the same across different RGs, but since they are in different RGs, there should be no ambiguity. As an example, cell 0 has a CORESET pool index 0 (or not configured), TRP 1 has a CORESET pool index 1, cell 2 has a CORESET pool index 0 (or not configured), and TRP 3 has a CORESET pool index 1. Alternatively, each cell and TRP may have a unique CORESET pool index. As an example, cell 0 has a CORESET pool index 0 (or not configured), TRP 1 has a CORESET pool index 1, cell 2 has a CORESET pool index 2, and TRP 3 has a CORESET pool index 3.

In an embodiment, the CORESET pool index may not be used for inter-cell M-TRP if no intra-cell M-TRP is present. In an embodiment, the CORESET pool index may be used for inter-cell M-TRP if intra-cell M-TRP is also present.

In an embodiment, multiple additional PCIs may also be supported, each additional PCI and associated intra-cell resources may form a resource group, and across different additional PCIs, the resources/resource groups may be considered as NCLed. When an activated additional PCI is deactivated, all the resources in the associated resource group are deactivated, including the intra-cell M-TRP identified by a CORESET pool index for that additional cell.

In an embodiment, for intra-cell M-TRP scenarios, or for the mixed scenario of intra-cell M-TRP and inter-cell M-TRP, CORESET pool indexes may still be used within each cell (i.e., in intra-cell M-TRP communications), as this is fully covered by Rel-16 design. Within each cell, the resources can be differentiated by the CORESET pool indexes. The CORESET pool indexes may be the same across the serving cell and an additional cell. Since the CORESET pool indexes are for different cells (associated with different PCIs, also including cases of multiple additional PCIs on a carrier if supported), there should be no ambiguity. In the above example, cell 0 has a CORESET pool index 0 (or absent), TRP 1 has a CORESET pool index 1, cell 2 has a CORESET pool index 0 (or absent), and TRP 3 has a CORESET pool index 1. The CORESET pool indexes 0 and 1 are used in both cell 0 and cell 2, but do not cause ambiguity.

Therefore, the CORESET pool index may be necessary to use for supporting intra-cell M-TRP communications, but may not be essential or necessary for support inter-cell M-TRP communications. If the CORESET pool indexing framework is to be used for inter-cell M-TRP communications, for purposes such as convenience (e.g., as a convenient but redundant label for inter-cell M-TRP), the following may be considered:

1-bit CORESET pool indexing is insufficient and multiple bits may be needed.

For up to 4 TRPs per UE, 2 bits may be needed. Each cell and TRP may have a unique CORESET pool index. As discussed in the above example, cell 0 (or TRP 0) has a CORESET pool index 0 (or absent), TRP 1 has a CORESET pool index 1, cell 2 (or TRP2) has a CORESET pool index 2, and TRP 3 has a CORESET pool index 3. Depending on how/when the TRPs are configured, the indexes may be different from the example, but the serving cell may always have CORESET pool index 0 (or absent if no ambiguity arises). For more TRPs, more bits are needed. To limit the complexity in practical scenarios, the maximal TRP number supported by a UE, or equivalently, the bitwidth of the CORESET pool index field, needs to be limited in standards and optionally by UE capability reporting.

Correct association of CORESET pool index to PCI and resources

As discussed above, regardless of whether to adopt CORESET pool indexing for inter-cell M-TRP communications or not, resource associations to PCIs via QCL/TCI relationships need to be correctly established. On top of that, CORESET pool indexes, though in some sense redundant, can be further assigned. For resources separated by different PCIs, the CORESET pool indexes may be the same (if no operations are across the cells or PCIs) or different (needed if there is an operation across the cells or PCIs). For resources linked to the same PCI but belonging to different TRPs, the CORESET pool indexes need to be different.

If CORESET pool indexes are to be used for inter-cell M-TRP communications, more bits may be needed and the indexing needs to be consistent with association of resources to a PCI via QCL/TCI states.

If a PCI is used to support inter-cell M-TRP communications without intra-cell M-TRP communications for that PCI, the resources and the PCI do not need to be associated with a CORESET pool index (or associated with index 0, which is unnecessary); if a PCI is used to support intra-cell M-TRP communications, some of the resources can be associated with CORESET pool index 0 (or absent), but other resources are associated with CORESET pool index 1. So a PCI may be associated with no, one, or more CORESET pool indexes depending on the scenarios, as discussed in the following embodiments:

For a PCI without intra-cell M-TRP resources, no CORESET pool index is assigned;

For a PCI with intra-cell M-TRP resources, one or no (absent) CORESET pool index may be assigned to each of the groups of intra-cell M-TRP resources.

For scheduling related to the additional PCI, multi-DCI (M-DCI) may be utilized, that is, for the resource groups formed by the serving PCI (PCI 0) and an additional PCI (PCI 1), scheduling is within each group and there is no need/advantage for cross-group scheduling, especially if the backhaul connection between the different cells/resource groups is non-ideal. Cross-carrier scheduling by an additional cell with PCI 2 collocated with the cell with PCI 1 may be supported without referring to PCI 1, but may use legacy mechanism of carrier indicator field (CIF) and so on. Only for some higher-layer signaling by RRC/MAC, the PCI 1 needs to be referred to, such as in the RRC configuration of QCL source, the activation of another additional PCI out of several candidates on a carrier. Indication of an additional PCI for same-carrier/cross-carrier scheduling is not needed.

The term "non-serving cell", though widely used in the discussions so far, may not be quite accurate. Though it is understandable that this term is used to differ from the well-defined "serving cell", the so-called non-serving cell actually can serve a UE and transmit/receive with the UE. The term "one additional PCI different from the serving cell PCI" per component carrier (CC) may also be used for now, which seems to be a better term than "non-serving cell PCI" or "non-serving PCI" (though this disclosure uses these terms interchangeably in some places of this disclosure). Although various terms may be used, the key functionalities of different types of network nodes serving a UE need to be made clear. This is also related to some ongoing RAN2 discussions, and RAN2 inputs should be accounted for once available. The following may need to be differentiated according to some embodiments:

1) A serving cell of a UE, configured as a PCell or a SCell for the UE.

The serving cell provides full cell-level functionalities to serve the UE, e.g., handling the common search space (CSS), its PCI $N_{ID}^{cell}$ is used as the default scrambling ID for signals/channels, handover needed if the serving cell of the UE is being changed, etc. The serving cell can serve the UE in a standalone fashion.

2) A cell that is not a PCell or SCell of a UE, but can communicate (e.g., transmit to/receive from) signals/channels with the UE.

This cell may be referred to as a "cooperating cell," or "assisting cell," or a cell with "one additional PCI different from the PCI of the serving cell", or simply an "additional cell" for short. Nevertheless, regardless of how it is called, it does not provide full cell-level functionalities to serve the UE; it may provide only partial cell-level functionalities to serve the UE, such as transmissions of signals/channels necessary to deliver data given the existence of a serving cell of the UE with full cell-level functionalities on that carrier. It may not be associated with a CSS, may not require a handover if the cell is being changed, etc., and may be seen as a lean, lightweight, and data-oriented cell, or as a group of radio resources linked to an additional PCI on a carrier and not linked (at least not directly via QCL/TCI states) to the serving PCI of that carrier. The cell per se is a standalone cell and can serve some other UEs in a standalone fashion, but cannot serve this UE in a standalone fashion due to the reliance on the serving cell of the carrier. In this sense, the "additional cell" may not be seen as a "cell" for the UE.

3) A cell that is not a PCell or SCell of a UE, and cannot transmit/receive signals/channels with the UE, but it is a cell within a coordinated multipoint (CoMP) set for the UE. This cell may be referred to as a "coordinated cell".

4) A cell that is not a PCell or SCell of a UE, cannot transmit/receive signals/channels with the UE, not within a CoMP set of the UE, and may interfere the UE.

Only the cell in 1) above is a serving cell, and the other cells in 2)-4) above are all non-serving cells. A more suitable term may be needed to refer to the other cells, such as a "cooperating cell," or an "assisting cell" or an "additional cell". In the following description, the terms "additional PCI", "additional cell" (the cell with the additional PCI), "additional SSB" (the SSB with the additional PCI), or "non-serving cell" are used interchangeably to refer to the above described non-serving cell, but it should be understood that these terms may mean a "cooperating cell," an "assisting cell," or the like. The terms "M-TRP" and "M-TRP communication" are also used interchangeably in the following, unless otherwise provided.

In a new concept for "horizontal resource aggregation" or non-co-location" (NCL) in M-TRP:

In CA, "vertical" carrier-level resources at the same location are aggregated for a UE.

For the new concept, the same carrier is looked at but with non-co-located M-TRP resources in an embodiment.

Multiple non-co-located "horizontal" resources on the same carrier are aggregated for a UE in the embodiment This is a new category of resource aggregation.

An aggregated TRP may not have a PCID/SSB (e.g., an intra-/inter-cell non-standalone TRP) or may have a PCID/SSB (e.g., a standalone TRP/cell), but in either case the resources provided by them may be differentiated by the UE from its serving cell resources due to the non-co-locality.

This is different from DC. In DC, different frequency resources (i.e., different carriers or cells) on different TRPs are aggregated, i.e., on a same carrier, the UE is connected with only one TRP, whereas in M-TRP, the UE is connected to more than one TRP on a carrier.

In an embodiment, a UE may support carrier aggregation of "vertical" resources, as well as M-TRP resource aggregation of "horizontal" resources from possibly both intra-cell TRP(s) and inter-cell TRPs(s). Cross-carrier scheduling is supported only among vertical resources without crossing NCLed inter-cell resource groups. In this sense, the cells, carriers, and TRPs that are collocated may form an extended RG, which includes multiple RGs, and each RG has a PCI on a different carrier frequency but at the same physical location. SSBs/RSs may be configured with a bi-directional cross-carrier QCL relationship, e.g., SSB1 with PCI1 may be QCLed with SSB2 with PCI2 and vice versa. This may be defined as a new QCL type for carriers/cells that are collocated at the gNB side and use a shared power amplifier (PA) for at least intra-band CA or intra-band contiguous CA. With the new QCL type, resources in an extended RG are QCLed, but resources across different extended RGs are NCLed. Cross-carrier scheduling is only supported within each extended RG, i.e., for QCLed resources.

In an embodiment, UE assumptions/behavior/capability to support multiple NCLed groups of QCL assumptions/resources linking to multiple SSBs on the same carrier/OFDM symbol may include:

1) DL:

All DL signals/channels are QCLed directly/indirectly to a TRS/SSB, and the QCL (including timing) relationship is applied for receiving these signals/channels. R16 uses CORESET pool index, and so the CORESET pool index and its associated signals/channels/resources have to be linked to TRS/SSB in R17, especially for scenarios of larger timing differences that may exist in inter-cell M-TRP.

Support multiple cells (BWPs, SCSs) on one carrier, UE capability for M-TRP DL (with or without specifying multiple tracking loops on one carrier), especially for inter-cell M-TRP.

2) UL

All UL signals/channels shall QCL to DL TRS0/SSB0/PL RS0 and apply TAG0 TA

PL RS should also be QCLed to TRS0/SSB0 (this is useful in SRI based power control configurations for, e.g., PUSCH)

All UL signals/channels shall QCL to TRS1/SSB1/PL RS1 and apply TAG1 TA

PL RS should also be QCLed to TRS1/SSB1 (this is useful in SRI based power control configurations for, e.g., PUSCH)

Support multiple TRPs on one carrier:

Use signal/channel QCL and UE behavior to implicitly specify TRPs or "groups"

A more explicit grouping configuration is also possible, based on CORESET pool index and/or equivalently TAG-id Applies to all UL, SRS, PUSCH, PUCCH, phase tracking reference signal (PTRS), DMRS A DCI carrying TPC command needs to specify for which TRP (e.g., via a CORESET pool ID implicitly, but then no cross-TRP indication or no good support of GC TPC), not just cell-specific Can adopt a design similar to SUL/UL, at least in GC TPC for PUSCH/PUCCH/SRS For TPC in UE-specific DCI, in M-DCI case, can use the DCI/TCI state to indicate the loop Each TRP may have up to 2 closed-loops SRS triggers: cross-TRP triggering and GC triggering More open-loop alpha-Po sets Collision handling and constraints: simultaneous transmission of PUSCH/PUCCH to M-TRPs may not be supported, antenna switching constraints 3) Other related: M-TRP PUCCH/PUSCH/PDCCH repetition for ultra-reliable low latency communication (URLLC) and QCL/TCI, e.g., intra-group repetition, inter-group repetition, cross-group indication In an embodiment for M-TRP UL TA, the following may be considered:

UE behavior for TA may also be defined

Each TA offset may be applied relative to the corresponding DL signal (e.g., the first path, the strongest path, or the orthogonal frequency division multiplexing (OFDM) symbol starting boundary inferred by the UE)

More generally, the TA offset is the time difference between a UL transmission (UL signal starting time, or UL OFDM symbol starting time) and a corresponding DL signal (the first path, the strongest path, or the OFDM symbol starting boundary inferred by the UE)

There may be different ways for the UE to infer the symbol boundary

FIG. 4 illustrates a table 400 showing example groups of IDs configured for different TRPs. The table 400 shows three groups of IDs 410, i.e., a first group of IDs for a first group of signals for a first TRP1 associated with a RG1 (and possibly a first beam), a second group of IDs for a second group of signals for a second TRP2 associated with a RG2 (and possibly a second beam), and a third group of IDs for a third group of signals for a third TRPS associated with a RG3 (and possibly a third beam). Each group of IDs includes ID1-ID7. ID1 420 of these groups is supported in R15/16 for PL CSI-RS. R15/16 generally uses a PCID for ID2-ID7, and requires fast backhaul. Each group of IDs may be pre-configured and re-configured for an associated RG. A UE may transmit or receive with a TRP using a group of IDs associated with a RG of the TRP.

A UE may receive a physical downlink control channel (PDCCH). The PDCCH may be associated with a control resource set (CORESET) with a first CORESET pool index, or has a DMRS that is configured to be QCLed to a SSB or a TRS QCLed to the SSB. The DL RS may be QCLed to the SSB, may be the SSB, or may be a CSI-RS QCLed to the SSB or the TRS, or may be a TRS QCLed to the SSB. If the SSB or TRS is associated with a serving cell of the UE, e.g., the cell 210 in FIG. 2, the UE may transmit/receive with the serving cell, and the signals/channels/IDs for the RG of the serving cell over the carrier are used. In this case, the PDCCH may be transmitted by the serving cell of the UE via a TRP associated with the serving cell, such as the TRP0 212.

Embodiments are provided for a UE to receive DL transmissions in an M-TRP deployment scenario. As can be seen before, many of the UL related operations depend on DL operations. The following deployment scenario related assumptions may be considered. DL timing difference between the M-TRPs (especially inter-cell TRPs) may cause the CP or one FFT insufficient. How well the time/frequency synchronization between the M-TRPs is may depend on the backhaul assumption. If ideal backhaul can be assumed, then likely the timing/frequency differences between the TRPs are negligible; otherwise non-negligible synchronization errors may be considered in the design. Regarding backhaul latency and coordination, generally, at least for inter-cell TRPs, ideal/fast backhaul cannot be assumed. Backhaul latency of a few milliseconds to a couple of tens of milliseconds and semi-static coordination should be considered in the design. Inter-TRP signal delay spread relative to the CP length should also be considered. Depending on the synchronization among the inter-cell TRPs and the relative distances of the TRPs to the UE, possible assumptions may include: 1) The inter-cell signal delay spread is within the CP length but close to the CP length, i.e., even though the inter-TRP signal delay spread is within the CP length, the arrival time difference from the TRPs may still be large. The UE may still need to have the capability of supporting multiple tracking loops and FFT windows in DL in order to improve its signal reception performance. 2) The inter-cell signal delay spread is longer than the CP length, and then multiple tracking loops and FFT windows are needed in this case. An embodiment is that multiple tracking loops and FFT windows are used on the same carrier and on the same OFDM symbol for a UE to receive PDSCH/PDCCH from multi-TRPs. The standards may specify UE assumptions/behavior under multiple QCL/TCI states so that the UE can correctly use the tracking loop and FFT window to receive a PDCCH/PDSCH. The UE may maintain multiple FFT windows (i.e., DL fine timing synchronization), and apply the FFT windows on the same carrier and on the same OFDM symbol based on the multiple TCI states for DL receptions from multiple TRPs, in which a first fine timing/first FFT window is associated with a first TCI state, a first PDCCH/PDSCH and a first TRP, and a second fine timing/second FFT window is associated with a second TCI state, a second PDCCH/PDSCH, and a second TRP. On the other hand, only the minimum UE assumptions may be specified, e.g., "the UE assumes multiple QCL assumptions that respectively link to multiple SSBs (directly or indirectly through one or more RSs) on the same carrier and on the same OFDM symbol based on the multiple TCI states for DL receptions," or "the UE shall have capability to receive simultaneously transmissions associated with more than one RG, wherein each RG may be associated with a DL time and frequency synchronization." At its minimum, as an example, for DL, standards may specify only general UE behaviors such as "the UE shall process the M-TRP DL receptions on a carrier based on their associated TCI states". Exactly how the UE operates may not need to be standardized, and whether the UE should support multiple tracking loops and multiple FFT windows can be left for UE implementation. For example, a UE may apply the same receiving timing to DL signals arriving at different timings, or apply different receiving timings to DL signals arriving at different timings.

Regardless whether the standards specify UE assumptions and/or behaviors, the UE needs to have the capability to receive from inter-cell multi-TRP with delay spread comparable or longer than the CP length if supported in Rel-17, and the capability may be standardized and tested by performance testing, which may be the minimum standard impact for the DL UE assumptions/behavior/capability.

Note that in the prior art, on the same time-frequency resources, the QCL assumptions link to at most one SSB directly/indirectly, but in the embodiments of the present disclosure, the QCL assumptions may link to more than one SSB directly/indirectly to support more general M-TRP operations. The UE can link PDCCH as well as other transmissions/receptions to an inter-cell TRP via a QCL relation linking to a non-serving SSB, and hence the CORE-SET pool indexes may not need to be explicitly configured in this case. A CORESET configured with TCI state(s) including QCL to the serving SSB directly or indirectly is for the TRP associated with the serving SSB, i.e., effectively assigned with CORESETPoolIndex 0, and a CORESET configured with TCI state(s) including QCL to the non-serving SSB directly or indirectly is for the TRP associated with the non-serving SSB, i.e., effectively assigned with CORESETPoolIndex 1. In an embodiment, the CORESET-PoolIndex is used to identify each RG. The UE does not expect a CORESET configured with TCI state(s) including QCL to both the serving SSB and the non-serving SSB, directly or indirectly. To support reception with multiple tracking loops and FFT windows, the UE needs to have the capability to receive from inter-cell TRPs, with delay spread comparable or longer than the CP length, which may require some duplicated hardware. This is in parallel to UL transmissions with the new UE behavior and capability to acquire, maintain, and apply multiple TAs. These capabilities are generally similar to UE CA capability, but the aggregation of additional radio resources are on the same carrier, and can be used jointly with CA capabilities. For example, a UE may support 5 component carriers (CCs), and on each CC it may support 2 TRPs, then the UE needs to have the capability to aggregate 10 PDSCH transmissions simultaneously. All DL signals/channels (PDSCH/PDCCH/DMRS/CSI-RS/CSI-IM/PTRS/etc.) should be QCLed to a TRS/SSB directly or indirectly, and similarly, all UL signals/channels (PUCCH/PUSCH/SRS/DMRS/PTRS/PRACH) should also be QCLed (or via spatial relation, via pathloss RS relation, etc.) to a TRS/SSB and belong to the TAG associated with that TRS/SSB.

In some embodiments, with inter-cell beam management (BM), i.e., cells/RGs may be associated with different beams and a UE needs to form different receive beams (e.g., QCL type D) to receive from the cells/RGs. Each cell/RG has its own TRS and BM RS as source RSs for QCLs. For UE-specific data/control channel(s), only switching is allowed and hence one cell is activated a time if the UE can only receive from one receive beam at a time. However, for other signals, like SSB, CSI-RS and common PDCCH, it is possible that the UE have to receive from two cells (with different timing), either at the same time or right after each other. This creates complexity for the UE to receive/switch from one beam with one timing to another beam with another timing. In an embodiment, since the SSB, CSI-RS and CSS are periodic, the standards can mandate that the beam will be switched to be consistent with periodic transmissions having higher priority before a slot starts. In an embodiment, some SSB, CSI-RS, and CSS can be considered as having lower priority, and so when in collision with other transmissions, they may be dropped not monitored.

Figure 5:
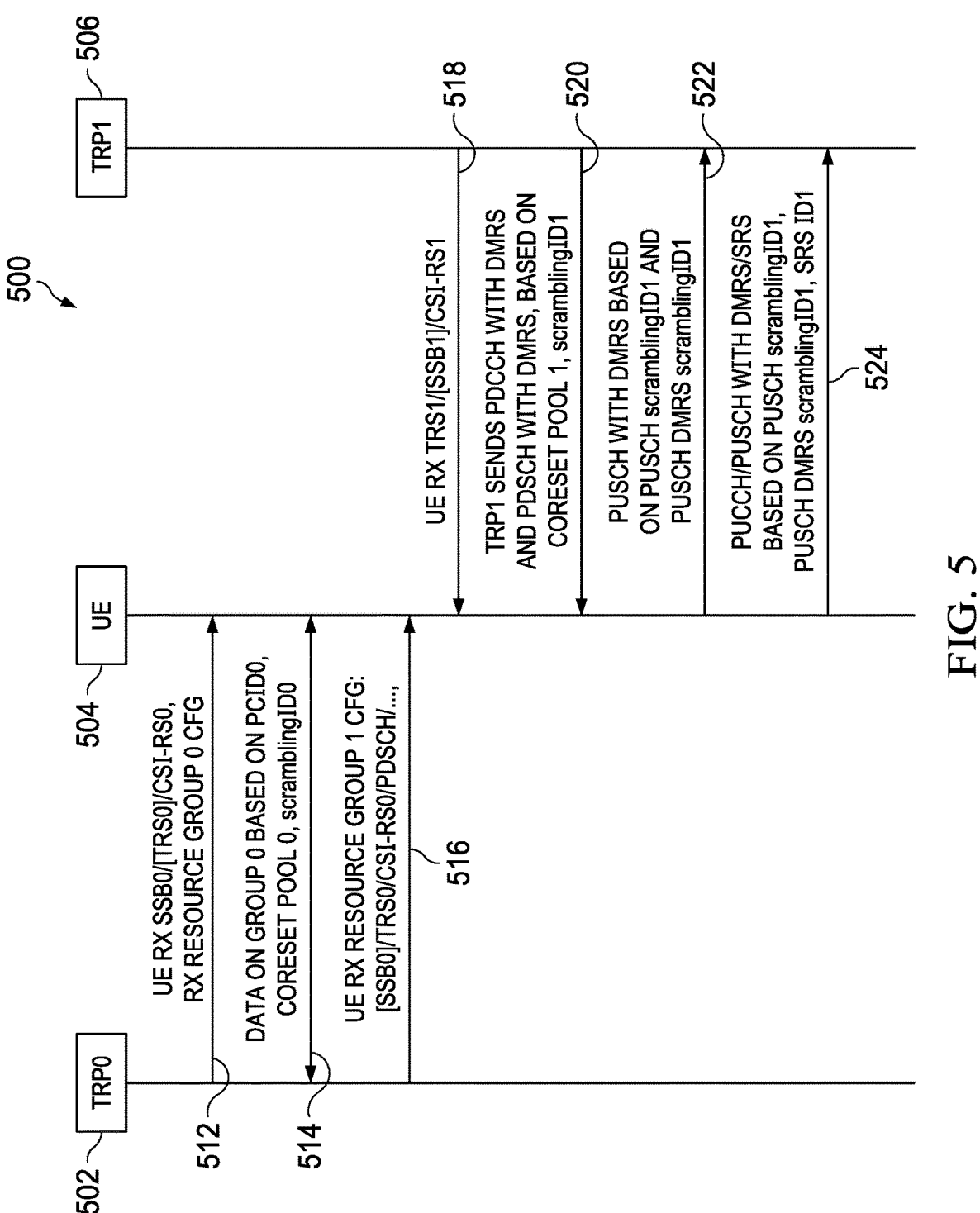
FIG. 5 illustrates a diagram of example messages exchanged and processing performed by devices participating in an M-DCI M-TRP communication on one carrier.

FIG. 5 illustrates a diagram 500 of example messages exchanged and processing performed by devices participating in an M-DCI M-TRP communication on one carrier. Diagram 500 shows messages exchanged and processing performed by a TRP0 502, a UE 504, and a TRP1 506. The signals/channels/operations in brackets in FIG. 5 may be optional. The TRP0 502 is configured as a serving cell (broadcasting SSB0/PCID0 of the serving cell) of the UE 504 over a carrier, and the TRP1 506 is a co-channel serving TRP of the UE 504. Generally, the serving cell broadcasts SSB0/PCID0 of the serving cell, but in some embodiments for intra-band carrier aggregation (CA), a SCell may not transmit a SSB, and the signals/channels for the SCell are QCLed to a SSB of another serving cell on another carrier within the same frequency band of the same TRP. For example, the UE 504 is configured with two (2) carriers (e.g., carriers A and B) within a band, on carrier A, the UE 504 is configured with a cell A with a first SSB, and on carrier B, the UE is configured with a cell B without SSB (e.g., specified by higher layer parameter scellWithoutSSB). The signals/channels for the cells are transmitted/received by the TRP0 502. The UE 504 receives the first SSB on cell A but not on cell B, and the signals/channels for the cell B are QCLed directly/indirectly with the first SSB on the cell A. Likewise, on the TRP1 506, TRS may not be transmitted on the carrier (e.g., first carrier) but may be transmitted on a second (different) carrier that the TRP1 506 is also operating on and configured to the UE 504, and signals/channels to/from the TRP1 506 on the first carrier may be QCLed directly/indirectly with the TRS transmitted on the second carrier.

As shown, the UE 504 may receive, from the TRP0 502, information of SSB0 (associated with a PCID0 of the serving cell), TRS0 and/or CSI-RS0 (e.g., SSB0/TRS0/CSI-RS0) of the serving cell, and configuration information of a resource group 0 including the serving cell (step 512). The SSB0 may be transmitted on the carrier or on a different carrier, and the TRS0 may be transmitted on the carrier or on a different carrier, and other signals/channels may be QCLed to the SSB0 and/or TRS0. The UE 504 may exchange data with the TRP0 502 based on the PCID0, a CORESET pool 0 and a scrambling ID0 (step 514). The UE 504 may not be able to communicate with the TRP1 506 before information about the TRP1 506 is sent to the UE 504, and hence in general the UE 504 may rely on the TRP0 502 to send information about the TRP1 506 to the UE 504. As an example, the UE 504 may receive a configuration information of a resource group 1 configured for the TRP1 506 (step 516), which may be received together with the SS0/TRS0/CSI-RS0 or PDSCH from the TRP0 502 or separately. After this step, the UE 504 is able to receive transmissions from the TRP1 506.

The UE 504 may then receive transmissions of signals from the TRP1 506, e.g., a TRS1, SSB1 and/or CSI-RSI from the TRP1 506, and may also receive additional information about the configuration of the resource group 1 from the TRP0 502, or TRP1 506 or both (step 518). The SSB1 may be transmitted on the carrier or on a different carrier (similar to the above scellWithoutSSB description for the TRP0 502), and the TRS1 may be transmitted on the carrier or on a different carrier (similar to the above description for the TRP1 506 without transmitting a TRS on the carrier), and other signals/channels may be QCLed to the SSB1 and/or TRS1. The UE 504 may monitor CSI-RSs (CSI-RSI) with a CSI-RS ID (CSI-RS ID1) from the TRP1 506 (not shown). The CSI-RSI may be scrambled using the CSI-RS ID1. The UE 504 may also receive a PDCCH order (DCII PDCCH order) associated with a CORESET pool (Coreset pool 1) from the TRP1 506 (not shown). The TRP1 506 may send a PDCCH to the UE 504, which may have an associated DMRS and indicate a PDSCH with an associated DMRS, and the PDCCH and PDSCH with their associated DMRSs may be transmitted based on the Coreset pool 1 and using a scrambling ID1 of the TRP1 506 (scramblingID1) (step 520). The UE may send a PUSCH and a DMRS associated with the PUSCH based on a PUSCH scrambling ID (PUSCH scramblingID1) and a PUSCH DMRS scrambling ID1 (PUSCH DMRS scramblingID1), respectively (step 522). The PUSCH is scrambled using PUSCH scramblingID1, and the DMRS is scrambled using PUSCH DMRS scramblingID1. The UE 504 may transmit to the TRP1 506, one or more PUCCHs (scrambled using a PUCCH scramblingID1), PUSCHs (scrambled using the PUSCH scramblingID1) with associated DMRS (scrambled using the PUSCH DMRS scramblingID1), and/or SRS (scrambled using a SRS ID1) (step 524). In general, the RG0 parameters (e.g., IDs, timings) and RSs (e.g., TRS, CSI-RS, DMRS) and channels (e.g., PDSCH, PUSCH, etc.) are used to communicate with TRP0 502, and the RG1 parameters (e.g., IDs, timings) and RSs (e.g., TRS, CSI-RS, DMRS) and channels (e.g., PDSCH, PUSCH, etc.) are used to communicate with TRP1 506.

The PUSCH scramblingID may be called dataScramblingIdentityPUSCH, and in M-TRP communications, PUSCH scramblingIDs may be called dataScramblingIdentity- PUSCH and dataScramblingIdentityPUSCH2 (or AdditionaldataScramblingIdentityPUSCH). In addition, if a higher layer signaling index per CORESET is configured, e.g., CORESETPoolIndex is configured, dataScramblingIdentityPUSCH is associated with a higher layer signaling index per CORESET, and is applied to a PUSCH scheduled by a DCI that is detected on a CORESET with the same higher layer index, e.g., dataScramblingIdentityPUSCH is associated with CORESETPoolIndex being 0 (or no explicit index), and AdditionaldataScramblingIdentityPUSCH is associated with CORESETPoolIndex being 1. The DMRS for the PUSCH may be done likewise, which generally has another set of scrambling identities and needs to be increased for M-TRP PUSCH DMRSs.

In Rel-16 design, the SSB of an inter-cell TRP cannot be configured/acquired based on existing standardized mechanisms for serving cells (PCell and SCells) in most of the features. The exception is for the UE sounding procedure for positioning purposes, so that the UE can transmit SRS based on the pathloss to a neighboring/non-serving cell. Some related excerpts from TS38.214, "3rd Generation Partnership Project; Technical Specification Group Radio Access Network; NR; Physical layer procedures for data," v16.3.0 (2020-09), and TS38.331, "3rd Generation Partnership Project; Technical Specification Group Radio Access Network; NR; Radio Resource Control (RRC) protocol specification," v16.3.1 (2021-01), which are incorporated herein by reference, are as follows:

602.1.4 UE sounding procedure for positioning purposes

When the SRS is configured by the higher layer parameter SRS-PosResource-r16 and if the higher layer parameter spatialRelationInfoPos-r16 is configured, it contains the ID of the configuration fields of a reference RS according to Clause6.3.2 of [TS 38.331]. The reference RS can be an SRS configured by the higher layer parameter SRS-Resource or SRS-PosResource-r16, CSI-RS, SS/PBCH block, or a DL PRS configured on a serving cell or a SS/PBCH block or a DL PRS configured on a non-serving cell The UE is not expected to transmit multiple SRS resources with different spatial relations in the same OFDM symbol.

If the UE is not configured with the higher layer parameter spatialRelationInfoPos-r16 the UE may use a fixed spatial domain transmission filter for transmissions of the SRS configured bt the higher layer parameter SRS-PosResource-r16 across multiple SRS resources or it may use a different spatial domain transmission filter across multiple SRS resources The UE is only expected to transmit an SRS configured the by the higher layer parameter SRS-PosResource-r16 within the active UL BWP of the UE.

When the configuration of SRS is done by the higher layer parameter SRS-PosResource-r16, the UE can only be provided with a single RS source in spatialRelationInfoPos-r16 per SRS resource for positioning.

For operation on the same carrier, if an SRS configured by the higher parameter SRS-PosResource-r16 collides with a scheduled PUSCH, the SRS is dropped in the symbols where the collision occurs.

The UE does not expect to be configured with SRS-PosResource-r16 on a BWP not configured with PUSCH/PUCCH transmission.

SSB-InfoNCell field descriptions physicalCellId
This field specifies the physical cell ID of the neighbour cell for which SSB configuration is provided.
ssb-IndexNcell
This field specifies the index of the SSB for a neighbour cell. See TS 38.213 [13]. If this field is absent, the UE determines the ssb-IndexNcell of the physicalCellId based on its SSB measurement from the cell.
ssb-Configuration
This field specifies the full configuration of the SSB. If this field is absent, the UE obtains the configuration for the SSB from nr-SSB-Config received as part of DL PRS assistance data in LPP, see TS 37.355 [49], by looking up the corresponding SSB configuration using the field physicalCellId.

pathlossReferenceRS-Pos-r16   CHOICE {
    ssb-IndexServing-r16   SSB-Index,
    ssb-Ncell-r16   SSB-InfoNcell-r16, -continued

--- dl-PRS-r16   DL-PRS-Info-r16
}      OPTIONAL, -- Need M

--- ssb-IndexSevingcell
Indicates SSB index belonging to a serving cell
ssb-NCell
This field indicates a SSB configuration from neighboring cell

---

As a starting point for the enhancements, once the non-serving cell's PCI/SSB/RS are configured for the UE, they may be further configured for QCL/TCI states for the UE. Therefore, the Rel-16 scheme for a non-serving cell's SSB/RS configuration can be reused as much as possible.

As analyzed above, Rel-17 design may reuse the Rel-16 scheme for neighbor cell SSB/RS configuration as much as possible. However, in Rel-16, the neighbor cells may have different parameters, such as different BWP bandwidth, SCS, etc., than the serving cell, and hence those parameters may need to be configured for the UE. In Rel-17 M-TRP, however, those parameters are the same as the serving cell's, and hence the UE may ignore those parameters, or in order to avoid any ambiguity, those parameters may be removed from the configuration. The following provides an example, where some parameters are removed (crossed-out) from the IE SSB-R17:

```
SSB-R17 ::=   SEQUENCE {
   pci   PhysCellId
   periodicity   ENUMERATED {sf5, sf10, sf30, sf40, sf80, spare3,
spare2, spare1}
   ssb-Timingoffset   INTEGER (0..127),
   ssb-Duration   ENUMERATED {sf1, sf2, sf3, sf4, sf5},
   tag-Id   Tag-Id
}
SSB-Configuration-r17 ::=   SEQUENCE {
   carrierFreq-r17          ARFCN-ValueNR,
   halfFrameIndex-r17          ENUMERATED {zero, one},
   ssbSubcarrierSpacing-r17       SubcarrierSpacing,
   ssb-periodicity-r17   ENUMERATED { ms5, ms10, ms30, ms40,
ms80, ms160, spare2, spare1 }   OPTIONAL, -- Need S
   smtc-r17   SSB-MTC   OPTIONAL, -- Need S
      sfn-SSB-Offset-r17          INTEGER (0..maxNrofFFS-r16),
      sfn-Offset-r17          INTEGER (0..15),
   ss-PBCH-BlockPower-r17   INTEGER (-60..50)
OPTIONAL -- Cond Pathloss
      tag-Id   Tag-Id
}
SSB-InfoNcell-r17 ::=   SEQUENCE {
   physicalCellId-r17   PhysCellId,
   ssb-IndexNcell-r17   SSB-Index,
   ssb-Configuration-r17   SSB-Configuration-r17   OPTIONAL
-- Need M
}
```

SSB time domain position, SSB transmission periodicity, and SSB transmission power have to be included in the configuration, where the SSB time domain position and SSB transmission periodicity are needed to search the SSB, and the SSB transmission power are needed for UL power control. Note that UL power control (PC) is based on either the SSB or periodic CSI-RS which relies on SSB transmission power directly or indirectly (e.g., the CSI-RS transmission power is configured using an offset from the SSB transmission power). When configuring the neighbor cell's SSB to the UE, due to the synchronization offset between the serving cell and the neighbor cell, the UE may need to perform a search within a time window for the PSS/SSS. This is similar to LTE DRS design. The SSB search time window may be optionally configured for the UE. That is, the network may configure an optional SSB search time window when configuring a neighbor cell's SSB/PCI to a UE. In an embodiment, a TRS search time window may also be considered.

TRS/CSI-RS/DMRS/SRS of an inter-cell TRP may be QCLed to a SSB, directly or indirectly via other RS. For example, in the case of space division multiplexing (SDM) with overlapping time/frequency resources, multiple PDSCH DMRS ports are QCLed to TRSs/CSI-RSs of the respective TRPs (e.g., QCL Type A), and the TRSs/CSI-RSs are further QCLed to the SSBs of the respective TRPs (e.g., QCL Type C). In this case, the PDSCH DMRS ports are QCLed to the SSBs indirectly, and the TRS/CSI-RS are QCLed to the SSBs directly. For another example, in the case of SDM with overlapping time/frequency resources, the multiple PDSCH DMRS ports may be directly QCLed to the SSBs of the respective TRPs (e.g., QCL Type A). Note that the PDSCH DMRS ports cannot be in one CDM group as they are for inter-cell TRPs, and DMRS ports in one CDM groups should be QCLed to the same source RS directly or indirectly. Likewise, PDCCH DMRS ports also need to have such QCL/TCI states configured, but the PDCCH DMRS ports for one PDCCH are all from one TRP except for single-frequency network (SFN) scenarios. FDM/TDM can also be considered in similar but generally simpler ways. In a single-frequency network, multiple TRPs may send the same contents on the same resources, and a receiver generally sees one transmission with longer delay spread and more multipaths, which can avoid inter-TRP interference, increase transmission signal to interference and noise ratio (SINR), and reduce handover needs, at a price of using more time and/or frequency resources.

In addition, the UL signal relation to some other signals, such as the pathloss RS relation, the spatial relation information, the relation defined by SRS resource indicator (SRI), associated CSI-RS for SRS, DMRS and its associated channel, etc., may be generally viewed as extended QCL relation. Thus, each UL signal, such as SRS and PUCCH/PUSCH DMRS, can be "QCLed" to a SSB directly or indirectly.

Thus, some embodiments may allow all existing QCL types and DL-UL spatial relation information (for the spatial relation between a reference signal and PUCCH, the reference signal may be SSB/CSI-RS/SRS), SRI relation (for the relation between a SRS resource and a PUSCH) and PL RS relation (for the relation between a SSB/CSI-RS and a PUCCH/PUSCH/SRS/PRACH); and allow a source RS to be SSB, TRS, CSI-RS, and SRS, and a target RS to be TRS, CSI-RS, DL DMRS, SRS, and UL DMRS.

Therefore, for the serving cell and for the non-serving cell separately, all existing QCL types and DL-UL spatial relation info and SRI and PL RS relation, and all signals such as SSB, TRS, CSI-RS, SRS, DL DMRS, SRS, and UL DMRS, as well as the associated channels and resources, can be linked directly or indirectly via QCL/TCI-state relation within each cell.

Table 1 below shows numbers of PCID per carrier, for existing 3GPP standards (Releases) and embodiments of the present disclosure. For all existing configurations, at most one PCID/RG/TAG configuration can be allowed for a carrier, even if multiple TRPs may be on the carrier. With the embodiment designs, more than one PCID/RG/TAG configuration may be allowed for a carrier. Note that the #PCIDs/carrier is interpreted as the number of active/activated PCIDs on a carrier. Embodiments may be provided for the number of total, active or inactive, activated or deactivated, additional PCIs. For example, at most one serving PCI may be configured for each carrier, at most n additional PCIs may be configured for each carrier, and hence there are at most n*c additional PCIs for c carriers, and at most m additional PCIs may be configured for c carriers, but there is no restriction for each carrier. It seems that all these can work, but with different degrees of complexity/practicality. In any event, at one time, on one carrier, there should be at most one additional PCI active/activated by the MAC layer. Also at least the per-carrier restriction seems to be more useful for the gNB and UE can be designed and operated with reasonable complexity for each carrier.

TABLE 1

|  | # PCIDs/carrier | # RGs/carrier |
|---|---|---|
| R15 | 1 | 1 |
| R16 intra-cell M-TRP | 1 | 1 |
| CA | 1 | 1 |
| DC | 1 | 1 |
| Embodiment intra-cell M-TRP | 1 | 2 |
| Embodiment inter-cell M-TRP | 2 | 2 |

FIG. 6 illustrates a table 600 showing example M-TRP scenarios for RGs and observation as a result of analysis of the scenarios. In this example, "Cell w/SSB" refers to a standalone cell with a standalone SSB/PCID; a TRP of the cell broadcasts the SSB/PCID. "TRP w/o SSB" refers to a non-standalone TRP without a standalone SSB/PCID, or non-standalone TRP that can share a SSB/PCID with a standalone cell; the TRP itself does not transmit a SSB/PCID. "Tightly synched" refers to two TRPs synchronized with a timing error of at most a few percent of a CP length, i.e., generally negligible. Table 600 shows 8 example scenarios (scenarios 1-8) including situations such as cell and TRPs (cell/TRPs) that are tightly synchronized, cell/TRPs that are not tightly synchronized, cell/TRPs with fast backhaul, cell/TRPs with no fast backhaul, cell/TRPs with single-downlink control information (S-DCI) or multi-DCI (M-DCI). The analysis shows that at least for large cells or not-tightly synched cell/TRPs, separate RGs are desirous. In all the scenarios, separate RGs may be configured for separate TRPs, for better UL/DL transmission quality. RGs may not be cell-based, but TRP-based, e.g., a cell with an associated SSB may be configured as a TRP, not as a serving cell.

Figure 7:
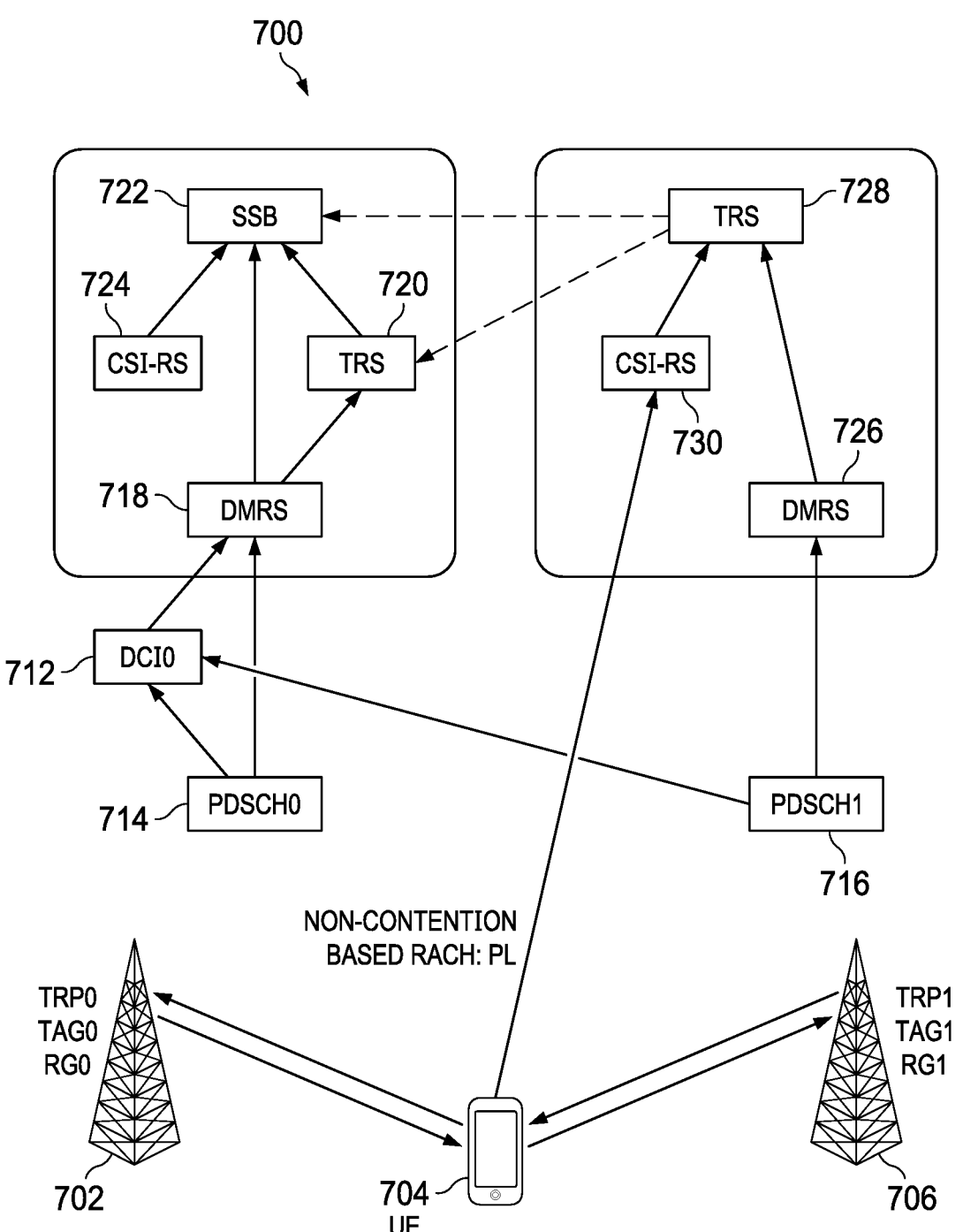
FIG. 7 illustrates a diagram of an embodiment wireless network in an example scenario of FIG. 6.

FIG. 7 illustrates a diagram of an embodiment wireless network 700 in the example scenario 1 as shown in the Table 600 of FIG. 6. The diagram 700 shows a TRP0 702 configured as a serving cell of a UE 704 over a carrier. A TRP1 706 not configured as a serving cell of the UE 704 over the same carrier is non-co-located with the TRP0 702. The TRP0 702 and the TRP1 706 provide M-TRP communication services to UEs in the serving cell. In this example, the TRP0 702 and the TRP1 706 are synchronized with each other and have fast backhaul between the TRP0 702 and the TRP1 706. Separate RGs (i.e., RG0 and RG1) may be configured for the TRP0 702 and the TRP1 706. The resulting benefits include improved UL/DL spectrum efficiency (SE). TA acquisition may be used as an example because it involves almost all signals/channels in UL/DL. The TRP0 702 transmits, to the UE 704, a PDCCH order instructing the UE 704 to initiate a random access procedure, and the PDCCH order may indicate which of the TRP0 702 and the TRP1 706 that the UE 704 is to perform the random access procedure with. For example, the PDCCH order may request the UE 704 to send a RACH preamble to the TRP1 706, or to the TRP0 702. The TRP0 702 also transmits DCI (DCI0 712) to the UE 704 scheduling a PDSCH (PDSCH0 714) from the TRP0 702, or a PDSCH (PDSCH1 716) from the TRP1 706, and the DCI/PDSCH may be the RAR as part of the random access procedure, or may be for other DL data transmissions. In this example, only the TRP0 702 sends DCI to the UE 704 (i.e., single-DCI (S-DCI)). DMRS (DMRS 718) is used for modulation/demodulation of the DCI0 712 and the PDSCH0 714. The DMRS 718 may be QCLed to a TRS 720 of the TRP0 702. The TRS 720 of the TRP0 702 may be QCLed to a SSB 722 associated with the serving cell (the TRP0 702). The TRP0 702 may also transmit CSI-RS 724 to the UE 704 for channel measurement. The CSI-RS 724 may be QCLed to the SSB 722 or QCLed to the TRS 720. DMRS (DMRS 726) is used for modulation/demodulation of the PDSCH1 716 of the TRP1 706. The DMRS 726 may be QCLed to a TRS 728 of the TRP1 706. The TRP1 706 not configured as the serving cell does not have an associated SSB. The TRP1 706 transmits the TRS 728, and the TRS 728 may be QCLed to the SSB 722 or QCLed to the TRS 720 with a weak QCL assumption (such as QCL Type C, or even QCL for average delay only). In general, for TRPs not co-located, they may only share rough/coarse time/frequency synchronization such as slot/OFDM symbol boundaries and subcarrier/PRB alignment, but not Doppler shift, Doppler spread, average gain, delay spread, spatial receive parameters, etc. However, if the TRPs are not too far away from each other and tightly synchronized, QCL Type C to the SSB 722 or TRS 720 may be assumed. The TRP1 706 may send CSI-RS 730 to the UE 704, base on which the UE 704 may estimate PL between the UE 704 and the TRP1 706, and send a RACH preamble (e.g., non-contention based) in a random access procedure to the TRP1 706 based on the estimated PL. The CSI-RS 730 may be QCLed to the TRS 728. In this example, the PL is based on the CSI-RS of the TRP1 706, and the RACH to the TRP1 706 is based on the PL. However, other steps of the random access procedure are performed between the UE 704 and the TRP0 702 based on the TRP0 702 and a PCID associated with the SSB 722 (this is similar to what is specified in R16). An example configuration of the separate TAGs for the TRP0 702 and the TRP1 706 is shown in block 732. In an embodiment, the TRS 728 is not QCLed to SSB 722 or TRS 720, but the UE needs to search the TRS 728 similar to a discovery signal (DS) within a search time window.

Figure 8:
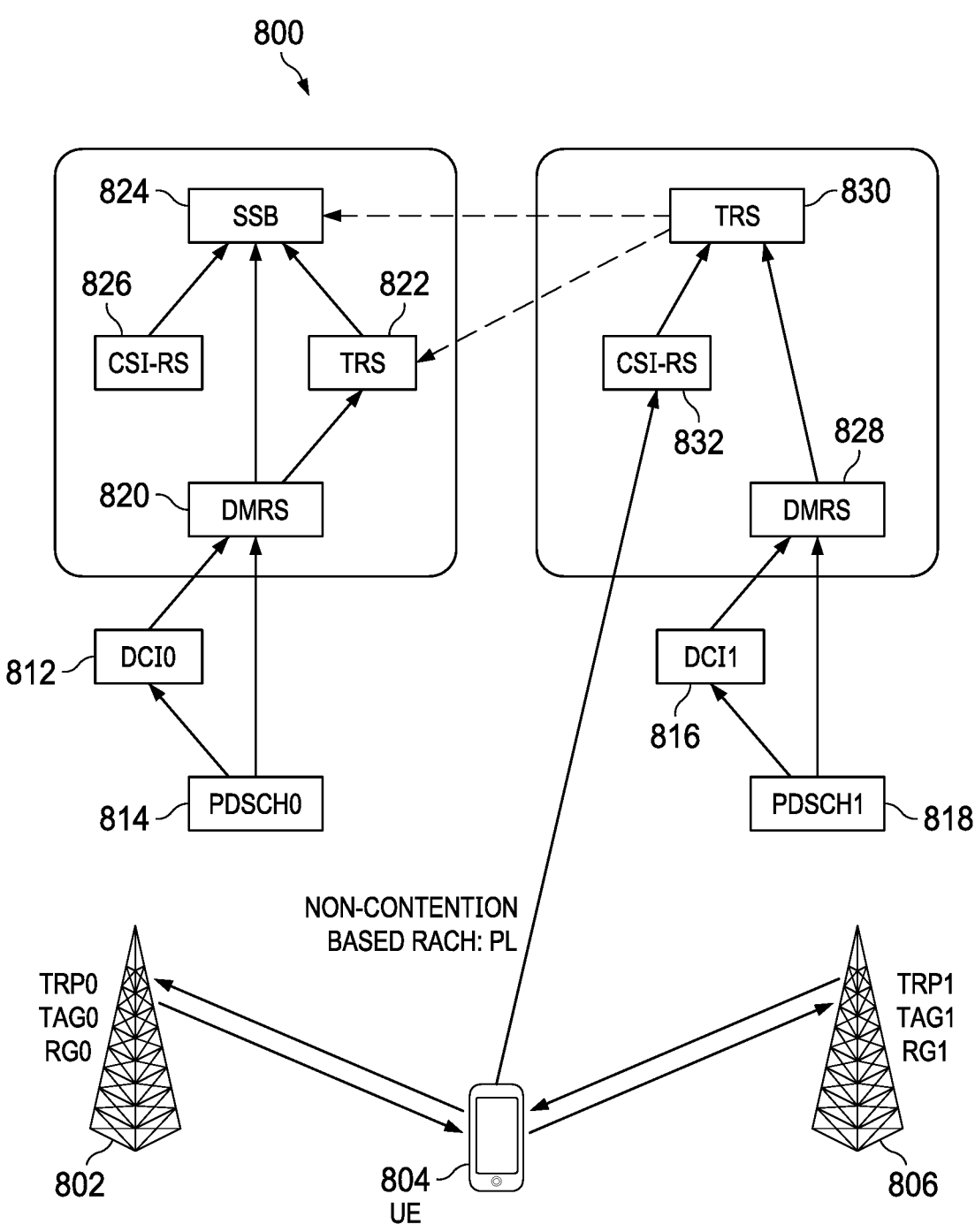
FIG. 8 illustrates a diagram of another embodiment wireless network in an example scenario of FIG. 6.

FIG. 8 illustrates a diagram of an embodiment wireless network 800 in the example scenario 2 as shown in Table 600 of FIG. 6. The diagram 800 shows a TRP0 802 configured as a serving cell of a UE 804 over a carrier. A TRP1 806 not configured as a serving cell of the UE 804 is co-channel with the TRP0 802. The TRP0 802 and the TRP1 806 provide M-TRP communication services to UEs in the serving cell. In this example, the TRP0 802 and the TRP1 806 are synchronized with each other and have fast backhaul between the TRP0 802 and the TRP1 806. Separate RGs (i.e., RG0 and RG1) and TAGs (i.e., TAG0 and TAG1) are configured for the TRP0 802 and the TRP1 806.

Different from the scenario 1 of FIG. 7, in this example, each of the TRP0 802 and the TRP1 806 may send a PDCCH order instructing the UE 804 to initiate a random access procedure with a corresponding TRP, i.e., the TRP0 802 or the TRP1 806. For example, the TRP0 802 may send a PDCCH order requesting the UE 804 to send a RACH preamble to the TRP0 802 or to the TRP1 806. Similarly, the TRP1 806 may send a PDCCH order requesting the UE 804 to send a RACH preamble to the TRP0 802 or to the TRP1 806. In an example, the PDCCH order may include an indication to indicate which of the TRP0 802 or the TRP1 806 that the UE 804 is to send the RACH preamble to. In another example, the PDCCH order does not include such indication, and the UE 804 determines that the TRP who sends the PDCCH order is the one that the UE 804 is to send the RACH preamble to. The TRP0 802 and the TRP1 806 transmit their respective DCI for scheduling their respective PDSCHs. For example, as shown, the TRP0 802 transmits DCI (DCI0 812) to the UE 804 scheduling a PDSCH (PDSCH0 814) from the TRP0 802. The TRP1 806 transmits DCI (DCI0 816) to the UE 804 scheduling a PDSCH (PDSCH1 818) from the TRP1 806. In this example, both the TRP0 802 sends DCI to the UE 804 (i.e., M-DCI). The DCI/PDSCH may be the RAR as part of the random access procedure, or may be for other DL data transmissions.

DMRS (DMRS 820) is used for modulation/demodulation of the DCI0 812 and the PDSCH0 814. The DMRS 820 may be QCLed to a TRS 822 of the TRP0 802. The TRS 822 of the TRP0 802 may be QCLed to a SSB 824 associated with the serving cell (the TRP0 802). A CSI-RS 826 of the TRP0 802 may be QCLed to the SSB 24. DMRS (DMRS 828) is used for modulation/demodulation of the DCI1 816 and the PDSCH1 818 of the TRP1 806. The DMRS 828 may be QCLed to a TRS 830 of the TRP1 806. The TRP1 806 not configured as a serving cell of the UE 804 does not have an associated SSB. The TRP1 806 may send CSI-RS 832 to the UE 804, base on which the UE 804 may estimate PL between the UE 804 and the TRP1 806, and send a RACH preamble (e.g., non-contention based) in a random access procedure to the TRP1 806 based on the estimated PL. The CSI-RS 832 may be QCLed to the TRS 830. In this example, the PL is based on the CSI-RS of the TRP1 806, and the RACH to the TRP1 806 is based on the PL. However, other steps of the random access procedure are performed between the UE 804 and the TRP0 802 based on the TRP0 802 and a PCID associated with the SSB 824 (this is similar to what is specified in R16). In an embodiment, the TRS 830 is not QCLed to SSB 824 or TRS 822, and the UE needs to search the TRS 830 similarly to searching a discovery signal (DS) within a search time window.

Figure 9:
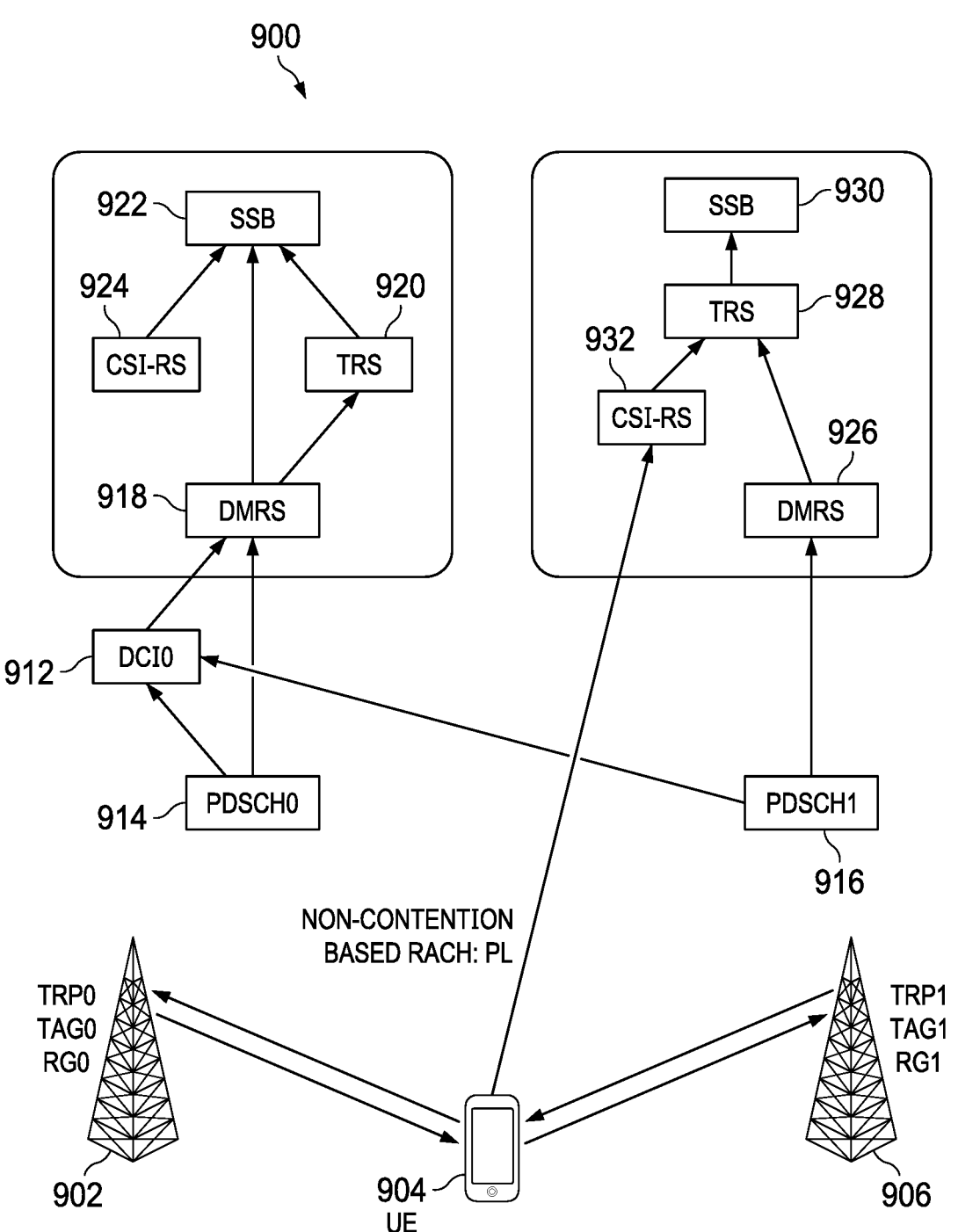
FIG. 9 illustrates a diagram of yet another embodiment wireless network in an example scenario of FIG. 6.

FIG. 9 illustrates a diagram of an embodiment wireless network 900 in the example scenario 5 as shown in Table 600 of FIG. 6. The diagram 900 shows a TRP0 902 configured as a serving cell of a UE 904 over a carrier. The serving cell is associated with a SSB 924. A TRP1 906 is associated with a SSB 930 but not configured as a secondary cell of the UE 904. The TRP0 902 and the TRP1 906 provide M-TRP communication services to UEs over the carrier. In this example, the TRP0 902 and the TRP1 906 are synchronized with each other for communication between the TRP0 902 and the TRP1 906. Separate RGs (i.e., RG0 and RG1) are configured for the TRP0 902 and the TRP1 906. The TRP0 902 may transmit, to the UE 904, a PDCCH order instructing the UE 904 to initiate a random access procedure, and may indicate which of the TRP0 902 and the TRP1 906 that the UE 904 is to send a RACH preamble. For example, the PDCCH order may request the UE 904 to send a RACH preamble to the TRP1 906, or to the TRP0 902. The TRP0 902 transmits DCI (DCI0 912) to the UE 904 for scheduling a PDSCH (PDSCH0 914) from the TRP0 902, or a PDSCH (PDSCH1 916) from the TRP1 906, as part of the random access procedure, or may be for other DL data transmissions. In this example, only the TRP0 902 sends DCI to the UE 904 (i.e., S-DCI). DMRS (DMRS 918) is used for modulation/demodulation of the DCI0 912 and the PDSCH0 914. The DMRS 918 may be QCLed to a TRS 920 of the TRP0 902. The TRS 920 of the TRP0 902 may be QCLed to a SSB 922 associated with the serving cell (the TRP0 902). The TRP0 902 may also transmit CSI-RS 924 to the UE 904 for channel measurement. The CSI-RS 924 may be QCLed to the SSB 922. DMRS (DMRS 926) is used for modulation/demodulation of the PDSCH1 916 of the TRP1 906. The DMRS 926 may be QCLed to a TRS 928 of the TRP1 906. Different from the scenario 1 of FIG. 7, in this example, the TRP1 906 is associated with the SSB 930. The SSB 930 may be configured to associate with the TAG1, but not configured as a secondary cell (SCell) of the UE 904. The TRS 928 may be QCLed to the SSB 930. The TRP1 906 may send a CSI-RS 932 to the UE 904, base on which the UE 904 may estimate PL between the UE 904 and the TRP1 906, and send a RACH preamble (e.g., non-contention based) in a random access procedure to the TRP1 906 based on the estimated PL. The CSI-RS 1532 may be QCLed to the TRS 928. In this example, the PL is based on the CSI-RS of the TRP1 906, and the RACH to the TRP1 906 is based on the PL. However, other steps of the random access procedure are performed between the UE 904 and the TRP0 902 based on the TRP0 902 and a PCID associated with the SSB 922 (this is similar to what is specified in R16). The scrambling IDs used with TRP1 906 may be based on the associated non-serving SSB, or may be configured for one or more of signals/channels for transmissions with the TRP1 906.

Figure 10:
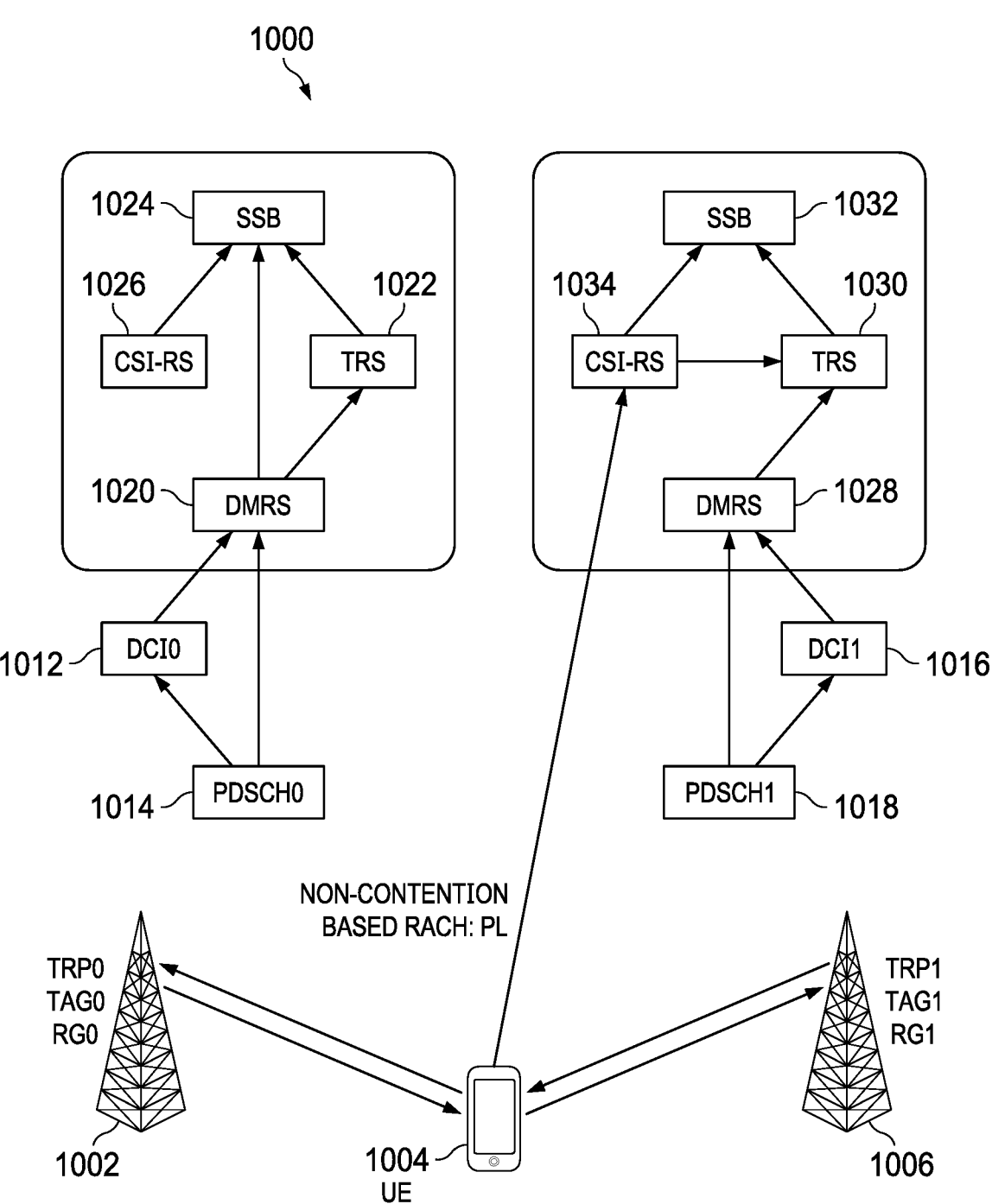
FIG. 10 illustrates a diagram of yet another embodiment wireless network in some example scenarios of FIG. 6.

FIG. 10 illustrates a diagram of an embodiment wireless network 1000 in the example scenarios 6, 7, and 8 as shown in Table 600 of FIG. 6. The diagram 1000 shows a TRP0 1002 configured as a serving cell of a UE 1004 over a carrier. The serving cell is associated with a SSB 1024. A TRP1 1006 is associated with a SSB 1032, and the TRP1 1006 may be or not be configured as a secondary cell of the UE 1004 over the carrier. The TRP0 1002 and the TRP1 1006 provide M-TRP communication services to UEs over the carrier. In this example, the TRP0 1002 and the TRP1 1006 may be or may not be synchronized with each. Separate RGs (i.e., RG0 and RG1) are configured for the TRP0 1002 and the TRP1 1006. TRP0 1002 transmits TRS/CSI-RS/DMRS which can be QCLed to the associated SSB 1024, directly or indirectly via other RS. TRP1 1006 transmits TRS/CSI-RS/DMRS which can be QCLed to the associated SSB 1032, directly or indirectly via other RS. For example, in the case of spatial division multiplex (SDM) with overlapping time/frequency resources, multiple PDSCH DMRS ports are QCLed to TRS/CSI-RS of the respective TRPs (e.g., QCL Type A), and the TRS/CSI-RS are further QCLed to the SSBs of the respective TRPs (e.g., QCL Type A). For another example, in the case of SDM with overlapping time/frequency resources, the multiple PDSCH DMRS ports are directly QCLed to the SSBs of the respective TRPs (e.g., QCL Type A). Note that the PDSCH DMRS ports may not be in one CDM group as they are for different TRPs with non-negligible timing difference or far away from each other. Likewise, PDCCH DMRS ports may also need to have such QCL/TCI states configured, but the PDCCH DMRS ports for one PDCCH are all from one TRP. FDM/TDM may also be considered in similar but generally simpler ways.

Each of the TRP0 1002 and the TRP1 1006 may send a PDCCH order instructing the UE 1004 to initiate a random access procedure. In this example, a PDCCH order is linked to a TRP. That is, The PDCCH order itself implies that the UE 1004 initiate a random access procedure to the TRP linked with the PDCCH order. The TRP0 1002 and the TRP1 1006 transmit their respective DCI scheduling their respective PDSCHs. For example, as shown, the TRP0 1002 transmits DCI (DCI0 1012) to the UE 1004 scheduling a PDSCH (PDSCH0 1014) from the TRP0 1002. The TRP1 1006 transmits DCI (DCI0 1016) to the UE 1004 scheduling a PDSCH (PDSCH1 1018) from the TRP1 1006. In this example, both the TRP0 1002 sends DCI to the UE 1004 (i.e., M-DCI). DMRS (DMRS 1020) is used for modulation/demodulation of the DCI0 1012 and the PDSCH0 1014. The DMRS 1020 may be QCLed to a TRS 1022 of the TRP0 1002. The TRS 1022 of the TRP0 1002 may be QCLed to the SSB 1024 associated with the serving cell (the TRP0 1002). A CSI-RS 1026 may be QCLed to the SSB 1024. DMRS (DMRS 1028) is used for modulation/demodulation of the DCII 1016 and the PDSCH1 1018 of the TRP1 1006. The DMRS 1028 may be QCLed to a TRS 1030 of the TRP1 1006. The TRS 1030 of the TRP1 1006 may be QCLed to the SSB 1032 associated with the TRP1 1006.

The SSB 1032 may be configured to associate with the TAG1, but not configured as a SCell of the UE 1004. The TRS 1030 may be QCLed to the SSB 1032. The TRP1 1006 may send a CSI-RS 1034 to the UE 1004, base on which the UE 1004 may estimate PL between the UE 1004 and the TRP1 1006, and send a RACH preamble (e.g., non-contention based) in a random access procedure to the TRP1 1006 based on the estimated PL. The CSI-RS 1034 may be QCLed to the TRS 1030 or the SSB 1032. In this example, the PL is based on the CSI-RS of the TRP1 1006, and the RACH to the TRP1 1006 is based on the PL. However, other steps of the random access procedure (e.g., RAR) are performed between the UE 1004 and the TRP0 1002 based on the TRP0 1002 and a PCID associated with the SSB 1024 (this is similar to what is specified in R16). The scrambling IDs used with TRP1 1006 may be based on the associated non-serving SSB 1032, or may be configured for one or more of signals/channels for transmissions with the TRP1 1006.

Figure 11:
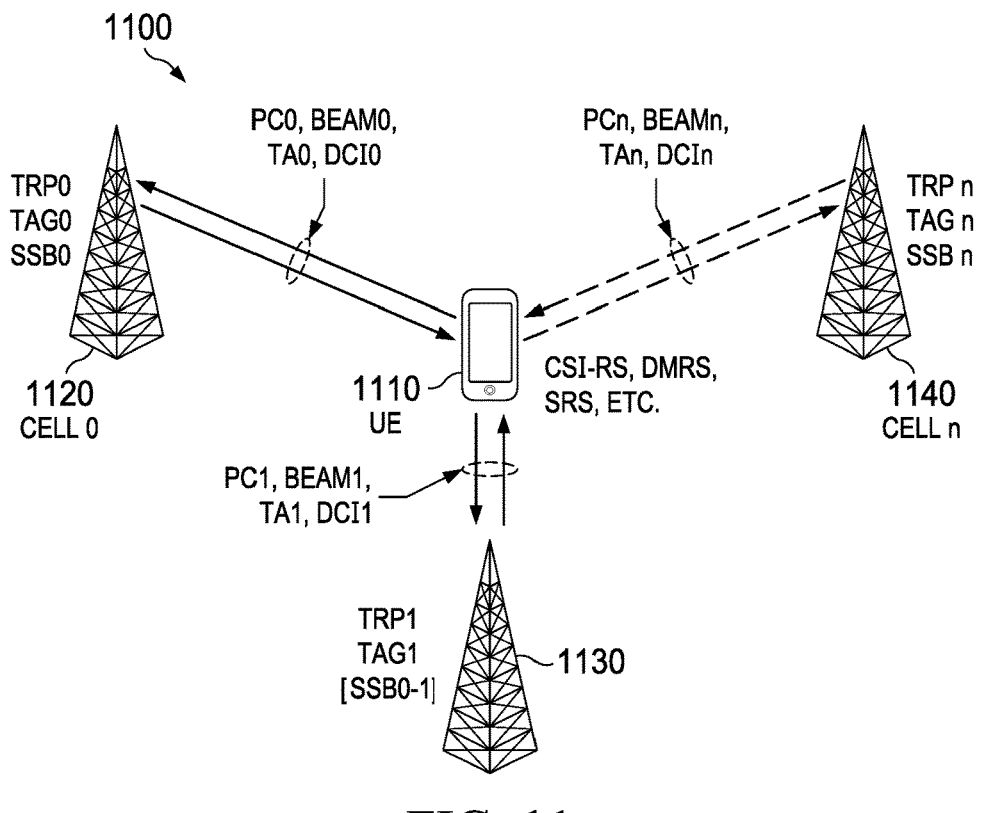
FIG. 11 illustrates a diagram of an embodiment wireless network, highlighting communications between a UE and M-TRP.

FIG. 11 illustrates a diagram of an embodiment wireless network 1100, highlighting communications between a UE 1110 and M-TRP, i.e., TRP0 1120, TRP1 1130 and TRP n 1140. TRP0 1120 is configured as the serving cell (cello) of the UE 1110. TRP0 1120 may broadcast a SSB0 of cello based on the PCID of the cello. TRP1 1130 is an intra-cell TRP of cello. TRP1 1130 may also broadcast the SSB (referred to as SSB0-1) of cello, but on a resource different from that of SSB0. The wireless network 1100 also includes a TRP n 1140 associated with a cell n (SSB n), which may be a neighbor cell of the serving cello, and may be an interfering cell if it is not configured to the UE, but may communicate data with the UE if it is configured as an additional cell to the UE. Each of TRP0 1120, TRP1 1130 and TRP n 1140 may operate over one or more carriers. TRP0 1120, TRP1 1130 and TRP n 1140 are associated with different TAGs, i.e., TAG0, TAG1 and TAG n, respectively.

TRP0 1120, TRP1 1130 and TRP n 1140 may serve the UE 1110 over a same carrier in an M-TRP communication. The UE 1110 may communicate various signals/channels with TRP0 1120, TRP1 1130 and TRP n 1140, e.g., CSI-RSs, DMRSs, SRSs, PDCCH, PUCCH, PDSCH, PUSCH, and so on. As shown, as an example, the UE 1110 may perform uplink transmission with TRP0 1120, e.g., scheduled by DCI 0 from TRP0 1120, over beam 0 according to TA 0 and using PC 0. Similarly, the UE 1110 may perform uplink transmission with TRP1 1130, e.g., scheduled by DCI 1 from TRP1 1130, using beam 1, TA 1 and PC 1; and perform uplink transmission with TRP n 1140, e.g., scheduled by DCI n from TRP n 1130, using beam n, TA n and PC n.

Conventionally, when a UE communicates with one TRP, the RSs/channels are generally associated with only the serving cell. For example, when the UE communicates with TRP0 1120 or TRP1 1130, the RSs/channels are associated with cello, i.e., SSB0. In M-TRP communications, the UE may communicate with a TRP of a neighbor cell, e.g., cell n. It is thus desirable for the UE to be able to differentiate RSs/channels from different cells. The UE thus may be able to apply corresponding parameters, e.g., PC, TA, etc. for perform the communication. In some embodiments, RSs/channels from different cells may be associated with or QCLed to their respective cells. As an example, a RS or channel communicated between the UE 1110 and TRP0 1120 may be associated with SSB0, directly or indirectly. Similarly, a RS or channel communicated between the UE 1110 and TRP1 1130 may be directly or indirectly associated with SSB0-1; and a RS or channel communicated between the UE 1110 and TRP n 1140 may be directly or indirectly associated with SSB n.

Figure 12:
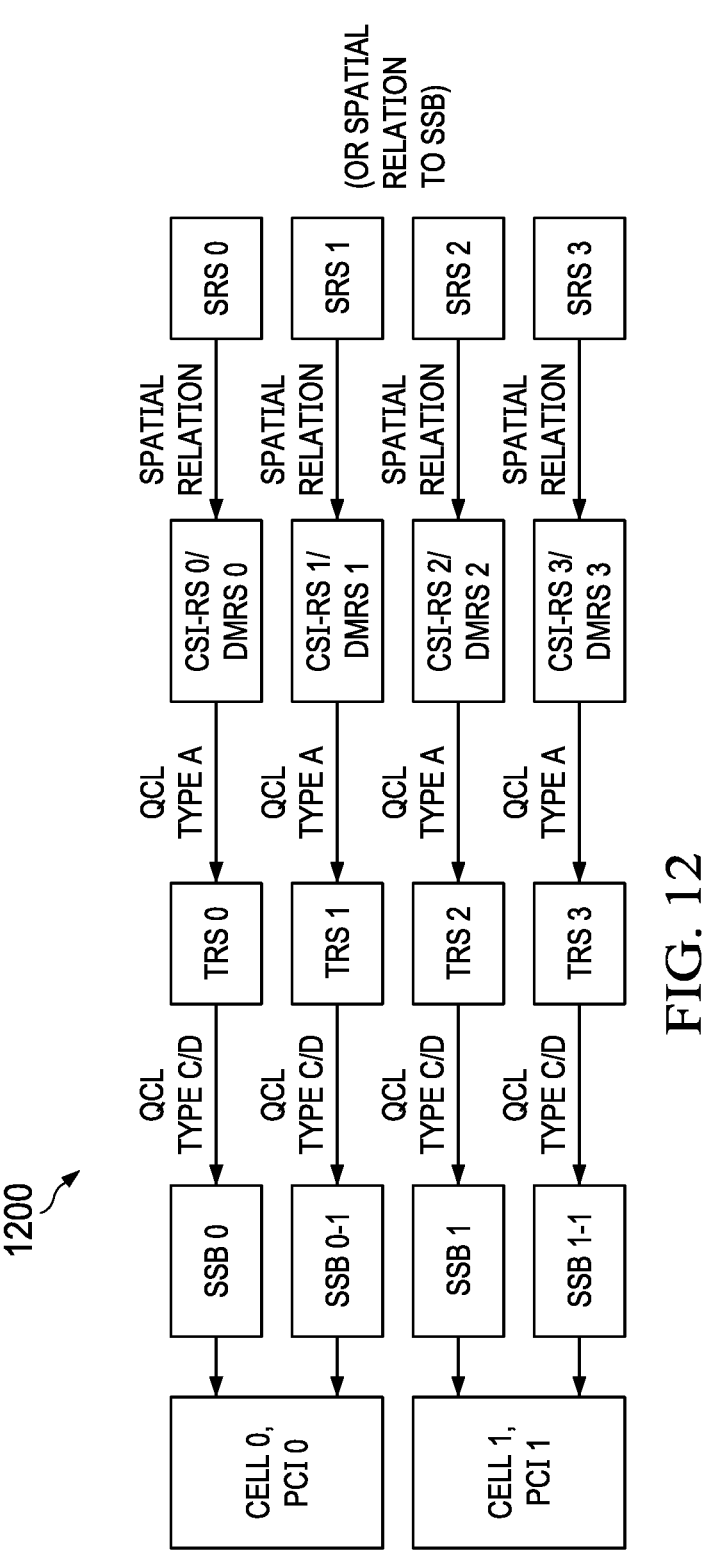
FIG. 12 is a diagram illustrating embodiment associations of reference signals with different cells.

FIG. 12 is a diagram 1200 illustrating embodiment associations of reference signals with different cells. In this example, a UE in a serving cell (cell 0 with PCI 0) may be served by four TRPs (e.g., TRP0, TRP1, TRP2, TRP3) over a carrier for M-TRP communications. TRP0 and TRP1 are associated with cell 0, and TRP2 and RP3 are associated with cell 1 (with PCI 1). TRP0 and TRP1 may broadcast SSB 0 and SSB 0-1, respectively, which are associated with PCI 0 of cell 0. TRP2 and TRP3 may broadcast SSB 1 and SSB 1-1, respectively, which are associated with PCI 1 of cell 1. Each of the four TRPs may transmit a TRS (i.e., TRS0, TRS1, TRS2, TRS 3 by TRP0-TRP3 respectively) and/or a CSI-RS with a DMRS (i.e., CSI-RS 0/DMRS 0, CSI-RS 1/DMRS 1, CSI-RS 2/DMRS 2, CSI-RS 3/DMRS 3 by TRP0-TRP3 respectively) to the UE, and the TRS and/or the CSI-RS/DMRS may be QCLed to a SSB of a corresponding TRP, directly or indirectly. For example, TRS 0 may be QCLed to SSB 0 according to QCL Type C/D. CSI-RS 0/DMRS 0 may be QCLed to TRS 0 according to QCL Type A, and is thus associated with SSB 0 indirectly. Such association applies similarly to TRSs and CSI-RSs/DMRSs of the other TRPs, as shown in FIG. 12. The UE may also transmit SRSs (SRS 0, SRS 1, SRS 2, SRS 3) to the four TRPs, and these SRSs may be associated with CSI-RSs or SSBs of the respective TRPs. As an example, SRS 0 may have a spatial relation with CSI-RS 0/DMRS 0, and is thus associated with SSB 0 indirectly. As another example, SRS 0 may have a spatial relation directly with SSB 0. Similar association may be applied to other SRSs, as shown in FIG. 12. The embodiment associations enable the UE to know which TRP/cell that the UE is communicating a signal with, and to determine what communication parameters are to be used.

Embodiments for M-TRP PUCCH enhancement are provided herein. In URLLC, to meet 1E-5 block error rate (BLER) requirement for data transmission, PUCCH reliability needs to be at least the same or better (i.e., lower) than 1E-5 BLER, preferably an order of magnitude better. In Rel-16, separate and/or joint acknowledgement/negative acknowledgement (A/N) feedback in PUCCH is supported;

for separate A/N, TDMed long and/or short PUCCH is supported, and each PUCCH resource may be associated with a higher layer index per CORESET; whereas for joint A/N, joint semi-static HARQ-ACK codebook can be used and A/N bits are concatenated in a certain order; switching between separate and joint A/N feedback is supported via radio resource control (RRC) configuration. Embodiment may be provided to extend above enhancement of PUCCH with ACK/NACK to PUCCH with CSI, including: 1) Allow separate and/or joint CSI feedback in PUCCH; 2) Distinguish URLLC-oriented CSI reporting vs. non-URLLC-oriented CSI reporting, in terms the contents, format, repetition, collision handling, etc., and an explicit bit may be used to signal a UE that a CSI is associated with a higher priority so that other transmission is dropped when colliding with the PUCCH carrying the CSI with the higher priority; 3) TDM of M-TRP PUCCH, and PUCCH repetition in the time domain (e.g., a UE transmitting the same PUCCH data multiple times to the same TRP) and in the spatial domain (a UE transmitting the same PUCCH multiple times to multiple TRPs, respectively). An embodiment is to allow one PDCCH/PDSCH transmission to be followed by multiple (i.e., repetition) PUCCH A/N feedback; the UE may perform repeated A/N transmissions to one, more or all of the TRPs. This may be useful if the reliability of ACK/NACK feedback cannot reach the target BLER. An embodiment may allow for soft combining/joint reception at the network side; whether it is feasible to perform soft combining/joint reception by multiple TRPs may depend on backhaul assumptions between the TRPs. However, for the same TRP, soft combining of repeated PUCCH transmission is always feasible.

Analysis and proposals are provided below. First, to enable TDMed PUCCH transmission with different beams towards different TRPs, multiple PUCCH spatial relation information (info) needs to be configured/activated. There could be several ways to accomplish this. One is to specify multiple spatial relation info for the same PUCCH resource, and when the PUCCH resource is targeted to TRP1, then spatial relation info 1 is to be used, and when the PUCCH resource is targeted to TRP2, then spatial relation info 2 is to be used. However, it may be questionable why the same PUCCH resource has to be used. The transmissions to different TRPs may differ in many respects, including spatial relation info, pathloss RS, power control parameters, TA, etc., and one transmission may be configured with hopping whereas the other without hopping, or one transmission may be of long format and the other be of short format, and so on. Therefore, a more natural way is to configure/activate separate PUCCH resources for transmissions with different TRPs, each of which has its own parameters including the spatial relation info. If the PUCCH resources are mostly configured/activated/transmitted together (in a TDM fashion), they could be specified together as a PUCCH resource pair with an explicit/implicit association between them, so that the pair is activated/transmitted together, e.g., when one PUCCH resource is activated, the other PUCCH resource is also activated automatically, which may help reduce some signaling overhead in some cases.

The following is an embodiment proposal 1 for time division multiplexed (TDMed) PUCCH transmissions.

Proposal 1: To enable TDMed PUCCH transmissions with different multiple spatial relation info, the following options may be considered:

Option 1: multiple separate PUCCH resources, each associated with one spatial relation info; or Option 2: one PUCCH resource with multiple spatial relation info.

Option 1 may be supported.

In some proposals, one PUCCH resource is suggested to facilitate potential network-side soft combining over multiple PUCCH resources. However, it is possible to configure two PUCCH resources with the same number of REs, so that they encode the same UCI into same coded bits. Thus, soft combining based on two PUCCH resources is also possible. Generally, to enable soft combining, the two PUCCH transmissions need to have the same coding-related parameters, but other parameters may be same or different.

By the same token, multiple separate sets of PUCCH power control parameters may be configured, and each set may associated with a PUCCH resource or a PUCCH resource set if the resource set is specified to be used for a particular TRP. The association to a TRP is generally not explicit in the standards, and can be done via the pathloss RS which is associated with or QCLed to a CSI-RS/SSB of a TRP, and/or via PUCCH spatial relation info which is associated with or QCLed to a CSI-RS/SSB/SRS. For the same signal/channel, the SSB/TRS that it is associated with or QCLed to, directly or indirectly via a pathloss RS, and/or spatial relation info and/or SRI, may be unique. In other words, if the signal/channel is associated with SSB1 using one set of QCL/association, and associated with SSB2 using another set of QCL/association, a UE expects that SSB1 and SSB2 are the same or QCLed with each other. Each set of PUCCH power control parameters may be assigned with an ID (which is not available as of the latest standards), and the ID is associated with a PUCCH resource or resource set. The power control parameters associated with one ID can include TRP-specific open-loop parameters such as Po, closed-loop parameters such as two closed-loop supported or not, transmission power control (TPC) command configuration, spatial relation info and/or pathloss RS, etc. This implies that the UE's capability and maximum numbers of certain parameters may be increased. For example, with one TRP, the UE may support two closed-loop power control, but with two TRPs, the UE may need to support four closed-loop power control. The TPC field in existing DCI formats 1_1/1_2 also needs to be doubled, which is a flexible and clean solution than some alternative solutions. For example, an alternative of one TPC field with one TPC value applied to both PUCCH beams lacks the flexibility needed when the channels to the two TRPs are not highly correlated. An option is a joint design of the TPC field to include two decoupled TPC values, but due to the decoupling, no signaling overhead reduction can be achieved with this design. Thus, according to one embodiment, a second TPC field may be added in DCI formats 1_1/1_2. Furthermore, for GC DCI format 2_2, the same enhancement can be done to support a second TPC field for PUCCH and may also extend to PUSCH. Regarding the closedLoopIndex, in the single-TRP (S-TRP) case, the closedLoopIndex may be i0 or i1 In the M-TRP case, the closedLoopIndex may be i0, i1, i2, or i3 if all the closed-loops are numbered jointly, or may still be i0 or i1 for each TRP if each TRP has its own configuration/indication field. The latter seems to be a more reasonable design. Hence, when the "closedLoopIndex" values associated with the two PUCCH spatial relation info's are for different closed-loops", two TPC fields should be used.

A PUCCH resource group is a group of PUCCH resources that can be updated simultaneously for spatial relations with a medium access control (MAC) control element (CE). In principle, a PUCCH resource group can be associated with a TRP, a beam of a TRP, a set of carriers with the same beam, and so on. Thus, the linking of PUCCH resources to power control parameter sets can be done naturally and efficiently on the PUCCH resource group level.

In current standards, the PUCCH GC DCI format 2_2 is configured as follows:

```
PUCCH-TPC-CommandConfig ::=   SEQUENCE {
    tpc-IndexPCell   INTEGER (1..15)   OPTIONAL, --
Cond PDCCH-OfSpcell
    tpc-IndexPUCCH-SCell   INTEGER (1..15)   OPTIONAL, --
Cond PDCCH-ofSpCellOrPUCCH-Scell
    ...
}
```

If M-TRP PUCCH is to be supported, the GC DCI needs to differentiate which TRP a TPC command is to be applied. However, a TRP is implicit in the standards, and so a potential association to a TRP via the TCI state index or CORESETPoolIndex may be used. A few embodiments are possible. One is to duplicate the existing field with an index added, i.e., there are two fields in RRC configuration; and another is to keep one field in the RRC configuration but add more elements with the indexes. The following provides two embodiments: Embodiment 1 and Embodiment 2, for configuring a TPC command using PUCCH-TPC-Command-Config.

Embodiment 1

```
PUCCH-TPC-CommandConfig ::=   SEQUENCE {
    tpc-IndexPCell   INTEGER (1..15)   OPTIONAL, -- Cond PDCCH-
OfSpcell
    tpc-IndexPUCCH-SCell   INTEGER (1..15)   OPTIONAL, -- Cond
PDCCH-ofSpCellOrPUCCH-Scell
    CORESETPoolIndex   INTEGER (0..1) OPTIONAL, -- Cond M-TRP
    ...
}
```

Embodiment 2

```
PUCCH-TPC-CommandConfig ::=   SEQUENCE {
    tpc-IndexPCell   INTEGER (1..15)   OPTIONAL, -- Cond
PDCCH-OfSpcell
    tpc-IndexPUCCH-SCell   INTEGER (1..15)   OPTIONAL, -- Cond
PDCCH-ofSpCellOrPUCCH-Scell
    tpc-IndexPCellTCI0   INTEGER (1..15)   OPTIONAL, -- Cond
PDCCH-OfSpcell, M-TRP
    tpc-IndexPUCCH-SCell0   INTEGER (1..15)   OPTIONAL, --
Cond PDCCH-ofSpCellOrPUCCH-Scell, M-TRP
    tpc-IndexPCellTCI1   INTEGER (1..15)   OPTIONAL, -- Cond
PDCCH-OfSpcell, M-TRP
    tpc-IndexPUCCH-SCell1   INTEGER (1..15)   OPTIONAL, --
Cond PDCCH-ofSpCellOrPUCCH-Scell, M-TRP ...
}
```

Proposal 2: For M-TRP PUCCH power control, configure multiple separate sets of PUCCH power control parameters, with each set associated with one TRP and including TRP-specific open-loop parameters, closed-loop parameters, and spatial relation info and/or pathloss RS. Regarding the configuration/indication of the number of PUCCH repetitions, in existing standards TS38.213, "3rd Generation Partnership Project; Technical Specification Group Radio Access Network; NR; Physical layer procedures for control," v16.3.0 (2020-09), which is herein incorporated by reference in its entirety, the following is supported:

For PUCCH formats 1, 3, or 4, a UE can be configured a number of slots, $N_{PUCCH}^{repeat}$, for repetitions of a PUCCH transmission by respective nrofSlots.

This framework seems to be general enough and can be readily extended to Rel-17. Therefore, an embodiment alternative 1 (Alt.1) may be: Use Rel-15 like framework should work well. This can also be extended to support intra-slot repetition. The other alternative of dynamic indication of the number of PUCCH repetitions can also work, but it requires more DCI overhead, and it may not be well aligned with the general thinking that most parameters of PUCCH are pre-configured (except for PUCCH resource ID in data scheduling and TPC commands). For periodic PUCCH transmissions, there may not be any DCI except for the TPC command information. In an embodiment, the GC DCI for PUCCH may be enhanced to include repetition information. Note that the DCI may also need to indicate information such as whether the transmissions to both TRPs are to be performed or only to one of the transmission is performed (for TRP selection). The indication information requires additional 2 bits in the DCI; however, adding more bits in DCI for repetition indication may not be preferred.

Proposal 3: For M-TRP PUCCH repetition configuration/indication, reuse Rel-15 like framework and extend to all PUCCH formats.

The number of repetitions given by nrofSlots is 2, 4, or 8. For multi-TRP inter-slot repetition, the number of repetitions can reuse existing nrofSlots of 2, 4, or 8 slots, with 2 options: 1) nrofSlots is for either of the M-TRPs individually or 2) nrofSlots is for both of the M-TRPs jointly. So for each TRP, the numbers of repetitions includes 1 (i.e., no repetition baseline), 2, and 4, or alternatively 1 (i.e., no repetition baseline), 2, 4, and 8. The only difference is to decide whether a UE should perform totally 16 transmissions or not in an M-TRP communication. This requires a lot UE power and capability, but it can provide the network with more choices in extreme cases if needed.

For PUCCH inter-slot/intra-slot repetition, both can be supported. Intra-slot repetition allows the UCI to be received with minimum latency and can be useful for URLLC, and thanks to the multi-TRP diversity, the additional gain offered by inter-slot repetition on top of intra-slot repetition may be quite small. Thus, intra-slot repetition should be supported. The intra-slot beam hopping is naturally needed to support intra-slot transmissions toward different TRPs and should also be supported. Inter-slot repetition can also be supported, as it provides more flexibility (i.e., more OFDM symbols to use) for the UE to transmit the PUCCH in a TDM way.

Proposal 4: For M-TRP PUCCH repetition, support Alt1 for both inter-slot repetition and intra-slot repetition/intra-slot beam hopping.

Embodiments for M-TRP PUSCH enhancement are provided here. In an embodiment, TDM of M-TRP PUSCH is supported; PUSCH repetition in time domain (repeated for the same TRP) and spatial domain (repeated for multiple TRPs) can be supported. The repetition should be for same transport block (TB), but the same or different redundant versions (RVs) may be used for the multiple PUSCHs. In an embodiment, single-DCI and multi-DCI to schedule PUSCH are supported, similar to single-DCI and multi-DCI to schedule PDSCH. In an embodiment, the network and UE distinguish URLLC-oriented PUSCH vs. non-URLLC-oriented PUSCH, in terms the contents, format, repetition, collision handling, etc., and an explicit bit may be used to signal the UE that a PUSCH is associated with higher priority so other transmission is dropped when colliding with the PUSCH with higher priority. The PUSCH may carry URLLC UL data, URLLC related A/N feedback, and/or URLLC related CSI report.

Some further enhancement may be considered for PUSCH. S-DCI based PUSCH transmission/repetition scheme(s) based on Rel-16 PUSCH repetition Type A and Type B. There were discussions on M-DCI. In this disclosure, the M-DCI approach can be applied to more deployment scenarios, such as when the TRPs are not connected with fast backhaul. In addition, M-DCI to schedule M-TRP PDSCH has already been standardized in Rel-16, and for the scenarios where M-DCI is used for PDSCH scheduling, it is natural to schedule PUSCH with M-DCI but unreasonable to restrict to use only S-DCI for PUSCH. Hence, M-DCI approach should be supported, and both Type A and Type B repetitions should be supported.

Proposal 5: For M-TRP PUSCH enhancement, also support M-DCI based PUSCH transmission/repetition scheme(s) based on Rel-16 PUSCH repetition Type A and Type B.

PUSCH repetition schemes are considered to be supported in Rel-17. On the other hand, PUSCH selection schemes should also be considered. There are a few justifications for this. One is that the selection scheme can have performance very similar to repetition schemes if the pathloss difference between the TRPs is not very small. Additionally, selection scheme can help conserve UE power. Supporting both repetition scheme and selection scheme can provide the network and UEs with more ability to optimize the operations. The repetition should be for the same TB, but the same or different RVs may be considered.

Proposal 6: For M-TRP PUSCH enhancement, support TDMed PUSCH repetition scheme(s) and selection scheme(s) to reduce UE transmission power consumption for both M-DCI and S-DCI based schemes.

Similar to the PUCCH transmission discussion above, two separate sets of PUSCH configurations and transmission parameters may be generally the most versatile way. This includes two separate sets of power control parameters, with each set associated with one TRP and including TRP-specific open-loop parameters, closed-loop parameters, and pathloss RS; two separate sets of SRI/TPMI parameters, such as two separate SRI fields and two separate TPMI fields, each of the field corresponds to the one TRP and existing field design should be reused as much as possible; two separate SRS resource sets; two sets of TA parameters and loops; two sets of PDCCH configurations to schedule the two sets of PUSCH transmissions; and so on.

The following provides an embodiment including details on two power control parameter sets using SRI-PUSCH-PowerControl. The embodiment considers M-TRP communication including TRP 1 and TRP 2.

For TRP 1, it supports SRS resource set 1, which includes several SRS resources. For PUSCH 1 sent from a UE to TRP 1, one set of power control parameters, such as PL RS, Po (a parameter used in existing power control (PC) technologies, see TS38.213 and TS38.313 for details), alpha (a parameter used in existing power control (PC) technologies, see TS38.213 and TS38.313 for details), and closed-loop, may be configured for the PUSCH 1 as SRI-PUSCH-PowerControl. When PUSCH 1 is scheduled, the associated SRI-PUSCH-PowerControl parameters are used for PUSCH 1 power control, and one SRS resource may be indicated by DCI for PUSCH 1 beamforming.

For TRP 2, it supports SRS resource set 2, which includes several SRS resources. For PUSCH 2 from the UE sent to TRP 2, one set of power control parameters, such as PL RS, Po, alpha, and closed-loop, are configured for the PUSCH 2 as SRI-PUSCH-PowerControl. When PUSCH 2 is scheduled, the associated SRI-PUSCH-PowerControl parameters are used for PUSCH 2 power control, and one SRS resource may be indicated by the DCI for PUSCH 2 beamforming.

Different SRS resource sets and different SRI-PUSCH-PowerControl configurations may be used for PUSCHs sent to different TRPs. PUSCH 1 cannot use any SRS resource or SRI-PUSCH-PowerControl for PUSCH 2, and vice versa. Hence, it makes more sense to maintain two separate lists of SRS resources and two separate lists of SRI-PUSCH-PowerControl, one for each TRP.

An embodiment is to add second sri-PUSCH-Mapping-ToAddModList, and select two SRI-PUSCH-PowerControl from two sri-PUSCH-MappingToAddModList. The DCI bits for SRI may only refer to the SRS resource and SRI-PUSCH-PowerControl for a particular TRP.

For open-loop power control parameter set indication, similar enhancements may be adopted. That is, 2 separate lists of open-loop power control parameter sets may be maintained, one for each TRP, and the DCI bits for open-loop power control parameter set indication may only refer to those associated with a particular TRP.

For srs-PowerControlAdjustmentStates, a SRS power control may follow the PUSCH power control or use a separate power control. For SRS resources linked to a PUSCH via SRI, the power control adjustment states of the PUSCH and of the linked SRS resources should be identical. Thus, the SRS resource linked to the PUSCH via SRI should have srs-PowerControlAdjustmentStates configured as "sameAsFci2," but not "separateClosedLoop".

For power headroom (PHR) reporting, as M-TRP PUSCH repetition is TDMed, there seems to be no impact of M-TRP PUSCH repetition on PHR reporting.

In legacy PUSCH power control, when SRI indication is absent, SRI-PUSCH-PowerControl will not be used, and power control parameters, such as PUSCH-PathlossReferenceRS-Id value being equal to zero or p0-AlphaSets, may be used. This can be reused for Rel-17 PUSCH power control when SRI indication is absent. The power control configuration can use different sets of parameters associated with different TRPs for PUSCH 1 and PUSCH 2.

Repetitions of PUSCH/PUCCH/PDCCH transmissions in M-TRP and S-TRP communication scenarios are discussed in some embodiments. To enhance transmission reliability, data, e.g., a control data or non-control data, may be repeatedly transmitted with different TRPs (for at least enhanced spatial diversity) or to the same TRP (for time/frequency diversity).

In M-TRP PUSCH repetition, a UE may transmit redundant PUSCHs to two different TRPs. For example, the UE 310 in FIG. 3 may transmit the same data redundantly via different PUSCHs to TRPs 320 and 330. That is, both TRPs receive the same data from the UE. The PUSCHs transmitted in M-TRP PUSCH repetition may be referred to as redundant PUSCHs. This may improve reliability of reception of the data. For M-TRP PUSCH repetition, control signaling may be needed to schedule the two redundant PUSCHs and indicate resources for transmission of the redundant PUSCHs.

Conventionally, for a codebook-based PUSCH transmission with a single TRP, a TPMI may be indicated to a UE for PUSCH layer number and beamforming. The UE may receive control information indicating a layer number and a TPMI. The following shows Table 7.3.1.1.2-4 in TS38.212, "3rd Generation Partnership Project; Technical Specification Group Radio Access Network; NR; Multiplexing and channel coding," v16.3.0 (2020-09), which is herein incorporated by reference. Table 7.3.1.1.2-4 includes bit field values indicating different layer numbers and values of TPMI. There are 6 TPMI entries for 1 layer, 3 TPMI entries for 2 layers, as well as a few reserved entries. As an example, a control message (e.g., a DCI message) may include a field containing an index of the Table 7.3.1.1.2-4, e.g., "2", which corresponds to "2 layers: TPMI=0". The UE may transmit the PUSCH based thereon.

Table 7.3.1.1.2-4 from TS 38.212: Precoding information and number of layers, for 2 antenna ports, if transform precoder is disabled, maxRank=2, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

In some embodiments, for M-TRP PUSCH repetition, two fields may be used. A first field indicates a layer number and TPMI for transmission of a first PUSCH from the UE to a first TRP, and a second field indicate indicates a layer number and TPMI for transmission of a second PUSCH to a second TRP. The layer number for the first PUSCH is the same as that for the second PUSCH, as the UE transmits redundant PUSCHs to the first and second TRPs. Thus, the second field does not need to indicate the layer number. In the following description, the first field and the second field are also referred to as a first TPMI field and a second TPMI field, respectively. The two fields are special cases of bit fields in DCI (which may include other bit fields such as a TPC command field, an SRI field, etc.). The terms of "bit field" and "TPMI field" are used interchangeably when referring to Table 7.3.1.1.2-4 in TS 38.212 or its variations on layer number and TPMI. The first bit field or first TPMI field use the current tables for indication, and the second bit field (or second TPMI field) does not need to indicate the layer number, which has been indicated by the first bit field.

It is desirable to develop techniques to design the second TPMI field with limited changes to the current standard specification. According to TS 38.212, there are various tables for indicating TPMIs, including various combinations of layer number and TPMIs. Not indicating the layer number in the second TPMI field may require redesign of all those tables for the second TPMI field. A general principle for designing the second TPMI field or the like, such as an SRI field, may be needed.

Since the second TPMI field does not need to indicate the layer number (it is always the same as the layer number of the first TPMI field), its design may be simplified based on the current TPMI field design with fewer bits to reduce DCI overhead. For each of the Tables 7.3.1.1.2-2/2A/2B/3/3A/4/4A/5/5A in TS 38.212, the entries in the table are used to indicate 1 layer, 2 layers, 3 layers, or 4 layers. For different layers, the numbers of TPMI entries in the table are different.

For example, in Table 7.3.1.1.2-4, there are 6 TPMI entries for 1 layer (layer number 1), 3 TPMI entries for 2 layers, as well as a few reserved entries. When the layer number indication is not needed for the second field, according to some embodiments, the bitwidth of the second bit field can be determined according to the maximum number of entries for a layer number in an existing table, usually for 1 layer (layer number 1). As an example, the bitwidth of the second bit field may be set according to 6 TPMI entries for layer number 1, i.e., 3 bits. In some embodiments, a new mapping may be designed such that, then layer number 1 is indicated in the first TPMI field, the second bit field mapped to indexes 0-5 corresponds to a TPMI of 1 layer, indexes 0-5 and 6-7 are reserved; when layer number 2 is indicated in the first TPMI field, the second bit field mapped to indexes 0-2 corresponds to a TPMI of 2 layer 0-2, and indexes 3-7 are reserved. There is no need to redesign the tables but just use a simple procedure to map the table entries for the second TPMI field.

Table 2 below shows an example for mapping the second TPMI field using Table 7.3.1.1.2-4 in TS 38.212. Table 2 re-organizes Table 7.3.1.1.2-4. Table 2 includes indexes 0-7 corresponding to 1 layer with 6-7 reserved, and indexes 0-7 corresponding to 2 layers with indexes 3-7 reserved for the case of codebookSubset=fullyAndPartialAndNonCoherent. The first TPMI field is mapped based on Table 7.3.1.1.2-4, and the second TPMI field is mapped based on Table 2. As an example, the first TPMI field contains a value 3, based on Table 7.3.1.1.2-4, it corresponds to 1 layer and TPMI=2; the second TPMI field contains a value 4, based on Table 2 and 1 layer indicated by the first TPMI field, it corresponds to index 4 for 1 layer in Table 2, and thus TPMI=4. In this way, the second TPMI field does not need to indicate the layer number, and no new table needs to be designed to determine the corresponding TPMI value. Table 2 may be added in TS 38.212 as Table 7.3.1.1.2-48: Second precoding information, for 2 antenna ports, if transform precoder is disabled, maxRank=2, and ul-FullPowerTransmission is not configured or configured to fullpowerMode2 or configured to fullpower.

TABLE 2

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | 0 | 2 layers: TPMI = 0 |
| 3 | 1 layer: TPMI = 3 | 1 | 2 layers: reserved |
| 4 | 1 layer: TPMI = 4 | | |
| 5 | 1 layer: TPMI = 5 | | |
| 6-7 | 1 layer: reserved | | |
| 0 | 2 layers: TPMI = 0 | | |
| 1 | 2 layers: TPMI = 1 | | |
| 2 | 2 layers: TPMI = 2 | | |
| 3-7 | 2 layers: reserved | | |

Note that some tables contain only a same layer, such as Table 7.3.1.1.2-3 in TS 38.212, and hence no DCI overhead reduction can be achieved for them. Some other tables also cannot achieve DCI overhead reduction, such as Table 7.3.1.1.2-4A in TS 38.212, which has 3 entries for 1 layer and 1 entry for 3 layers.

When dynamic switching between M-TRP and S-TRP PUSCH repetitions is supported, the configuration of TPMI fields has to be based on the M-TRP case, and the second TPMI field is not used for the S-TRP case, which may be left as blank, all filled with 1's, reserved, or used for other purposes.

The similar technique may be applied to design for a second SRI field. The second SRI field has the same layer number as the first SRI field. This can also reduce the DCI overhead for the second SRI field. For example, for Table 7.3.1.1.2-29 in TS 38.212 (see below), with N_SRS=2, four SRI entries exist: {0}, {1}, {0,1}, and reserved, which requires 2 bits. Then for a second SRI field, for 1 layer, it needs only 1 bit to indicate {0}, {1}, and for 2 layers, no indication is necessary, i.e., the bit can be reserved. Thus 1 bit SRI indication is sufficient for this case. With N_SRS=4, the bitwidth can be determined based on the 2-layer entries, which has 6 entries and hence 3 bits is sufficient. Similar designs can be provided for other tables, i.e., the bitwidth can be obtained according to the maximum number of entries for a layer number, and a simple procedure can map the table entries for each layer number to the bit field indexes for the second SRI field.

Table 7.3.1.1.2-29 and some corresponding description in TS 38.212 are provided as follows:

SRS resource indicator –

$$\left\lceil \log_2 \left( \sum_{k=1}^{min\{L_{max}, N_{SRS}\}} \binom{N_{SRS}}{k} \right) \right\rceil \text{ or } \lceil \log_2(N_{SRS}) \rceil \text{ bits,}$$

where $N_{SRS}$ is the number of configured SRS resources in the SRS resource set indicated by SRS resource set indicator field if present; otherwise $N_{SRS}$ is the number of configured SRS resources in the SRS resource set configured by higher layer parameter srs-ResourceSetToAddModList and associated with the higher layer parameter usage of value 'codeBook' or 'nonCodeBook', $$-\left\lceil \log_2 \left( \sum_{k=1}^{min\{L_{max}, N_{SRS}\}} \binom{N_{SRS}}{k} \right) \right\rceil$$

bits according to Tables 7.3.1.1.2-28/29/30/31 if the higher layer parameter txConfig=nonCodebook, where $N_{SRS}$ is the number of configured SRS resources in the SRS resource set indicated by SRS resource set indicator field if present, otherwise $N_{SRS}$ is the number of configured SRS resources in the SRS resource set configured by higher layer parameter srs-ResourceSetToAddModList and associated with the higher layer parameter usage of value 'nonCodeBook', and
  if UE supports operation with maxMIMO-Layers and the higher layer parameter maxMIMO-Layers of PUSCH-ServingCellConfig of the serving cell is configured, $L_{max}$ is given by that parameter
  otherwise, $L_{max}$ is given by the maximum number of layers for PUSCH supported by the UE for the serving cell for non-codebook based operation.
  $\lceil \log_2(N_{SRS}) \rceil$ bits according to Tables 7.3.1.1.2-32, 7.3.1.1.2-32A and 7.3.1.1.2-32B if the higher layer parameter txConfig=codebook, where $N_{SRS}$ is the number of configured SRS resources in the SRS resource set indicated by SRS resource set indicator field if present, otherwise $N_{SRS}$ is the number of configured SRS resources in the SRS resource set configured by higher layer parameter srs-ResourceSetToAddModList and associated with the higher layer parameter usage of value 'codeBook'.

Table 7.3.1.1.2-29 from TS 38.212: SRI indication for non-codebook based PUSCH transmission, $L_{max}$=2

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6-7 | reserved | 6 | 0, 3 |
| | | | | 7 | 1, 2 |
| | | | | 8 | 1, 3 |
| | | | | 9 | 2, 3 |
| | | | | 10-15 | reserved |

In some embodiments, the second SRI field may be configured and indicated similarly to the above embodiments regarding the TMPI, when the second SRI field has the same layer number as the first SRI field; and when the first field has $$\left\lceil \log_2 \left( \sum_{k=1}^{min\{L_{max}, N_{SRS}\}} \binom{N_{SRS}}{k} \right) \right\rceil$$

bits, the second SRI field may have $$\left\lceil \log_2 \left( \max_{k \in \{1,2,\,...\,,min\{L_{max}, N_{SRS}\}\}} \binom{N_{SRS}}{k} \right) \right\rceil$$

responding to the maximum number of entries in the SRI indication table for a layer number. For each layer number, a part of the table entries may be used for the bit field's index values.

As an example, a UE may receive first information indicating a layer number k and a first SRI to be used for a first PUSCH. The UE may also receive second information indicating a second SRI to be used for a second PUSCH. Both the first SRI and the second SRI correspond to the layer number k. The UE may then transmit data on the first PUSCH over a carrier according to the layer number k and the first SRI, and transmit the data on the second PUSCH over the carrier according to the layer number k and the second SRI. The UE may perform PUSCH repetition transmission of the data according to the lay number k, and the first and the second SRIs. The first information and the second information may be carried in a first bit field and a second bit field, respectively, in a message, e.g., a DCI message. The UE may determine one or more SRI values for the first SRI based on association or mapping between the first bit field and the one or more SRI values for the first SRI, and determine one or more SRI values for the second SRI based on association or mapping between the second bit field and the one or more SRI values for the second SRI. The mapping or association may be in the form of a SRI table, such as a table similar to Table 7.3.1.1.2-29.

An issue worth mentioning is the UL TA issue. For UL TA, detailed analysis is provided as follows as an example.

Note that a TA offset is relative to a certain DL timing, such as DL OFDM symbol starting time (based on the strongest path, or first path, or up to UE implementation) or the like, and the DL timing is referred to as the UL TA reference timing. In M-TRP communications, e.g., communicating with TRP1 and TRP2, a UE may have several options to determine its UL timing. Different TA offset options may be applied under different TRP synchronization settings. As an example, the UE may use only one TA offset, e.g., a TA offset that is based on TRP1 and will be applied to transmissions to both TRP1 and TRP2. An alternative to this is that the UE may adopt TRP-specific TA offsets. As another example, the UE may need to determine a UL TA reference timing, e.g., a TA offset will be applied on top of the reference time such as the DL received time, the DL symbol starting time or the like. The UL TA reference timing may be based on one of the TRPs or be TRP-specific. Four options are listed below as examples. For Options 1-3 with only one UL TA offset and/or only one UL TA reference timing, there may exist some cases that a TRP may experience UL receive timing offset much longer (such as twice as long) than the TRP timing synchronization difference or propagation delay difference. Thus, the UL timing issue may be a more severe issue than DL timing issue.

Option 1: Only one TA offset (based on TRP1), and only one UL TA reference timing (based on TRP1).

Option 2: Only one TA offset (based on TRP1), and multiple UL TA reference timings (based on each TRP).

Option 3: multiple TA offsets (based on multiple TRPs), and one UL TA reference timing (based on TRP1).

Option 4: multiple TA offsets (based on multiple TRPs), and multiple UL TA reference timings (based on each TRP).

Under these options, and under different TRP synchronization settings, the TRP receive timing offset can be computed. Table 3 below shows a few typical cases with some example values. Relative to TRP1's transmit timing and TRP1's propagation delay, there may be a few cases for TRP2's transmit timing and propagation delay, which are listed in the columns of TRP2-A, TRP2-B, and TRP2-C. The key observation is that, for options 1~3, there always exist some cases that a TRP will experience UL receive timing offset much longer (such as twice as long) than TRP timing synchronization difference or propagation delay difference. In other words, even if in DL, M-TRP signals can fit into one CP length, this will not be the case for UL in general. Therefore, UL TA needs to adopt Option 4.

TABLE 3

| | TRP1 | TRP2-A | TRP2-B | TRP2-C |
|---|---|---|---|---|
| UL TA analysis for different TRP synchronization settings and different TA offset options | | | | |
| TRP Tx timing (us) | T | T | T + p | T + p |
| Propagation delay (us) | t | t + d | t | t + d |
| UE Rx timing | T + t | T + t + d | T + t + p | T + t + d + p |
| Option 1: Only 1 TA offset (based on TRP1), and only 1 UL TA reference timing (based on TRP1) | | | | |
| TA offset (based on TRP1) | s | s | s | s |
| UL TA reference timing (based on TRP1) | T + t | T + t | T + t | T + t |
| UE Tx timing | T + t − s | T + t − s | T + t − s | T + t − s |
| TRP Rx timing | T + 2 t − s | T + 2 t − s | T + 2 t − s | T + 2 t − s |
| TRP Rx timing offset | 2 t − s | 2 t − s + d | 2 t − s − p | 2 t − s + d − p |
| TRP Rx timing offset eg1: s = 2 t, d = 2 us, p = 2 us | 0 | 2 | −2 | 0 |
| TRP Rx timing offset eg2: s = 2 t, d = 2 us, p = −2 us | 0 | 2 | 2 | 4 |
| Option 2: Only 1 TA offset (based on TRP1), and multiple UL TA reference timings (based on each TRP) | | | | |
| TA offset (based on TRP1) | s | s | s | s |
| UL TA reference timing (based on each TRP) | T + t | T + t + d | T + t + p | T + t + d + p |
| UE Tx timing | T + t − s | T + t + d − s | T + t + p − s | T + t + d + p − s |
| TRP Rx timing | T + 2 t − s | T + 2 t + 2 d − s | T + 2 t + p − s | T + 2 t + 2 d + p − s |
| TRP Rx timing offset | 2 t − s | 2 t − s + 2 d | 2 t − s | 2 t − s + 2 d |
| TRP Rx timing offset eg1: s = 2 t, d = 2 us, p = 2 us | 0 | 4 | 0 | 4 |
| TRP Rx timing offset eg2: s = 2 t, d = 2 us, p = −2 us | 0 | 4 | 0 | 4 |
| Option 3: multiple TA offsets (based on each TRP), and 1 UL TA reference timing (based on TRP1) | | | | |
| TA offset (based on each TRP) | 2 t | 2 t + 2 d | 2 t | 2 t + 2 d |
| UL TA reference timing (based on each TRP) | T + t | T + t | T + t | T + t |
| UE Tx timing | T − t | T − t − 2 d | T − t | T − t − 2 d |
| TRP Rx timing | T | T − d | T | T − d |
| TRP Rx timing offset | 0 | −d | −p | −d − p |
| TRP Rx timing offset eg1: d = 2 us, p = 2 us | 0 | −2 | −2 | −4 |
| TRP Rx timing offset eg2: d = 2 us, p = −2 us | 0 | −2 | 2 | 0 |

TABLE 3-continued

| UL TA analysis for different TRP synchronization settings and different TA offset options | | | | |
|---|---|---|---|---|
| | TRP1 | TRP2-A | TRP2-B | TRP2-C |
| Option 4: multiple TA offsets (based on each TRP), and multiple UL TA reference timings (based on each TRP) | | | | |
| TA offset (based on each TRP) | 2 t | 2 t + 2 d | 2 t | 2 t + 2 d |
| UL TA reference timing (based on each TRP) | T + t | T + t + d | T + t + p | T + t + d + p |
| UE Tx timing | T − t | T − t − d | T − t + p | T − t − d + p |
| TRP Rx timing | T | T | T + p | T + p |
| TRP Rx timing offset | 0 | 0 | 0 | 0 |

The key observation from the detailed analysis is that, for Options 1~3 with only one UL TA offset and/or only one UL TA reference timing, there always exist some cases that a TRP will experience UL receive timing offset much longer (such as twice as long) than the TRP timing synchronization difference or propagation delay difference. Thus, the UL timing issue is a much more severe issue than DL timing issue. In other words, even if in DL, the M-TRP signals can be fit into one CP length, this will not be the case for UL in general. For example, if the DL timings at the UE side have a difference of 2 us, which may be within the CP length for 15 kHz SCS, the UL timing error seen at the TRP side may become 4 us, which is comparable to the CP length and can degrade the performance. UL TA needs to adopt Option 4, in which multiple TA offsets (i.e., TRP-specific TA offsets) are needed and multiple UL TA reference timings (i.e., TRP-specific reference timings to be used for the respective UL transmissions) are needed.

Proposal 7: For M-TRP PUSCH enhancement, support two separate sets of PUSCH configurations, including:

Two separate set of power control parameters, where each set is associated with one TRP and includes TRP-specific open-loop parameters, closed-loop parameters, TPC command field, closed-loop indexes and closed-loop, and pathloss RS;

Two separate sets of SRI/TPMI parameters;

Two separate TRP-specific TA offsets, where each is associated with a set of PUSCH/PUCCH/SRS/PRACH configurations via QCL/TCI-state/generalized QCL etc. associations. The TA offset is relative to the associated TRP-specific DL reference timing (e.g., the associated DL symbol starting time).

In current standards, the PUSCH GC DCI format 2_2 is configured as follows:

```
PUSCH-TPC-CommandConfig ::=   SEQUENCE {
    tpc-Index   INTEGER (1..15)   OPTIONAL, --
Cond SUL
    tpc-IndexSUL   INTEGER (1..15)   OPTIONAL, --
Cond SUL-Only
    targetCell   ServCellIndex   OPTIONAL, --
Need S
    ...
}
```

If M-TRP PUSCH is to be supported, the GC DCI has to differentiate which TRP a TPC command is to be applied to. However, a TRP is implicit in the standards, so a potential association to a TRP via the TCI state index or CORESET-PoolIndex may be used. A few embodiments are possible. One embodiment is to duplicate the existing field with an index added, i.e., two fields may be included in a RRC configuration. Another embodiment is to keep one field in a RRC configuration but add more elements including the indexes.

The following show Embodiment 1 and Embodiment 2 for indicating a TPC command for a TRP.

Embodiment 1

```
PUSCH-TPC-CommandConfig ::=   SEQUENCE {
    tpc-Index   INTEGER (1..15)   OPTIONAL, -- Cond
SUL
    tpc-IndexSUL   INTEGER (1..15)   OPTIONAL, --
Cond SUL-Only
    CORESETPoolIndex   INTEGER (0..1)   OPTIONAL,
    -- Cond M-TRP
    targetCell   ServCellIndex   OPTIONAL, -- Need S
    ...
}
```

Embodiment 2

```
PUSCH-TPC-CommandConfig ::=   SEQUENCE {
    tpc-Index   INTEGER (1..15)   OPTIONAL, -- Cond
SUL
    tpc-IndexSUL   INTEGER (1..15)   OPTIONAL, --
Cond SUL-Only
    tpc-IndexTCI0   INTEGER (1..15)   OPTIONAL, --
Cond SUL, M-TRP
    tpc-IndexTCI1   INTEGER (1..15)   OPTIONAL, --
Cond SUL, M-TRP
    targetCell   ServCellIndex   OPTIONAL, -- Need S
    ...
}
```

Embodiments for M-TRP PDCCH enhancement are provided in the following. In an embodiment, PDCCH repetition in time domain (repeated by the same TRP) and spatial domain ((repeated by multiple TRPs) are supported. For example, DCI 1 may be sent from TRP 1, and DCI 1 may be a S-DCI scheduling PUSCHs/PDSCHs jointly for TRPs 1 and 2, or one of the M-DCIs to schedule PUSCH/PDSCH only for TRP 1. DCI 1 may be repeated in a later OFDM symbol, sent by TRP 1, TRP 2, or both. The PDCCH repetition can be useful for higher reliability. However, one issue needs to be resolved. When a UE receives multiple PDCCH transmissions, each schedules a PDSCH (or a PUSCH), the UE may not understand that these PDCCH transmissions are actually the repetition and should lead to only one PDSCH (or only one PUSCH). The UE may incorrectly assume that two PDCCH transmissions schedule two PDSCH transmissions (or two PUSCH transmissions) at the same time and decide to drop one or both of the transmissions. This is an example showing that PDCCH repetitions have to be explicitly signalled to the UE, or UE assumptions should be standardized so that the UE assumes PDCCH repetition based on identical resource allocation in the multiple DCIs. The explicit signaling may be a field in the DCI as a flag, and DCIs with the same flag are assumed to schedule the same PDSCH or PUSCH. Embodiments also include cross-TRP scheduling (e.g., TRP1 DCI to schedule TRP2 PDSCH/PUSCH or vice versa), joint DCI (S-DCI to schedule for both TRPs) sent from either TRP, or joint transmission of the same DCI (e.g., for one or separate PDSCH/PUSCH transmissions in one or both TRPs). To support these enhancements, the QCL/TCI states and CORESET pool indexes should be enhanced to ensure that the transmissions are correctly associated with the intended TRP(s).

For PDCCH transmissions, there may be multiple possible resources (time and/or frequency resources) configured, and a PDCCH may be transmitted in one of the resources. Each of the resources that may carry a PDCCH is referred to as a candidate for the PDCCH (or a PDCCH candidate). A search space may be formed by some candidates. The UE may only need to blindly detect (BD) the PDCCH on those candidates, i.e., the UE performs PDCCH monitoring on the search space. The number of BDs is upper limited by the UE capability or the standards.

For a PDCCH transmission with two TCI states, there can be the following alternatives ("Alt"), as examples:

Alt 1: One CORESET with two active TCI states

Alt 2: One SS set associated with two different CORE-SETs

Alt 3: Two SS sets associated with corresponding CORE-SETs

For Alt 1 (one CORESET with two active TCI states), there could further be the following alternatives:

Alt 1-1: One PDCCH candidate (in a given search-space (SS) set) is associated with both TCI states of the CORESET.

Alt 1-2: Two sets of PDCCH candidates (in a given SS set) are associated with the two TCI states of the CORESET, respectively Alt 1-3: Two sets of PDCCH candidates are associated with two corresponding SS sets, where both SS sets are associated with the CORESET and each SS set is associated with only one TCI state of the CORESET.

For non-SFN based M-TRP PDCCH reliability enhancements, there could be the following options, as examples:

Option 1 (no repetition): One encoding/rate matching for a PDCCH with two TCI states;

Option 2 (repetition): Encoding/rate matching is based on one repetition, and the same coded bits are repeated for the other repetition. Each repetition has the same number of CCEs and coded bits, and corresponds to the same DCI payload. This could be intra-slot repetition and inter-slot repetition Option 3 (multi-chance): Separate DCIs that schedule the same PDSCH/PUSCH/RS/TB/etc. or result in the same outcome. The DCIs could be in the same slot or different slots Embodiment combined schemes considering the above discussed Options 1-3 and Alt 1-3 are identified and summarized below:

SFN schemes: Alt1-1, one CORESET, each PDCCH candidate in the CORESET may be for both TRP1 and TRP2 simultaneously, i.e., each PDCCH candidate in the CORESET may be associated with two TCI states at the same time.

Non-SFN schemes: see Table 4 below.

TABLE 4

| | | List of combined non-SFN schemes | |
|---|---|---|---|
| | Option 1: No repetition: a PDCCH with two TCI states | Option 2: Repetition: identical coded bits & #CCEs from 2 TRPs | Option 3: Multi-chance: different coded bits, e.g., new coding design, different #CCEs from 2 TRPs, with a different scrambling sequence, etc. |
| Alt1-1, 1 CORESET, each candidate for both TRP1 and TRP2 simultaneously | 1 CORESET, TRP1 and TRP2 jointly transmit 1 PDCCH on a PDCCH candidate. Seems to be SDM (deprioritize for evaluation and study due to complexity concerns) | 1 CORESET, TRP1 transmits PDCCH1 on a candidate, TRP2 transmits PDCCH2 (same bits) on the same candidate. Seems to be SDM (deprioritize for evaluation and study due to complexity concerns) | 1 CORESET, TRP1 transmits PDCCH1 in on a candidate, TRP2 transmits PDCCH2 (different coded bits) on the same candidate. Seems to be SDM (deprioritize for evaluation and study due to complexity concerns) |
| Alt1-2, 1 CORESET, half candidates for TRP1, half for TRP2 | N/A | 1 CORESET, $1^{st}$ half candidates for TRP1, $2^{nd}$ half for TRP2, and PDCCH1 in $1^{st}$ half, PDCCH2 (same bits) in $2^{nd}$ half. TDM/FDM | 1 CORESET, $1^{st}$ half candidates for TRP1, $2^{nd}$ half for TRP2, and PDCCH1 in $1^{st}$ half, PDCCH2 (different coded bits) in $2^{nd}$ half. TDM/FDM |
| Alt1-3, 1 CORESET and 2 SS sets, SS set 1 for TRP1, SS set 2 for TRP2 | N/A | 1 CORESET and 2 SS sets, SS set 1 for TRP1, SS set 2 for TRP2, and PDCCH1 in SS set 1, PDCCH2 (same bits) in SS set 2. TDM/FDM | 1 CORESET and 2 SS sets, SS set 1 for TRP1, SS set 2 for TRP2, and PDCCH1 in SS set 1, PDCCH2 (different coded bits) in SS set 2. TDM/FDM |
| Alt2, 2 CORESETs and 1 SS set, CORESET1 for TRP1, CORESET2 for | N/A | 2 CORESETs and 1 SS set, CORESET1 for TRP1, CORESET2 for TRP2, and PDCCH1 in CORESET1, PDCCH2 (same bits) in CORESET2. | 2 CORESETs and 1 SS set, CORESET1 forTRP1, CORESET2 for TRP2, and PDCCH1 in CORESET1, PDCCH2 (different coded bits) in CORESET2. |

TABLE 4-continued

| | | | |
|---|---|---|---|
| | | | List of combined non-SFN schemes |
| | Option 1: No repetition: a PDCCH with two TCI states | Option 2: Repetition: identical coded bits & #CCEs from 2 TRPs | Option 3: Multi-chance: different coded bits, e.g., new coding design, different #CCEs from 2 TRPs, with a different scrambling sequence, etc. |
| TRP2 Alt3, 2 CORESETs and 2 SS set2, CORESET1 & SS set1 for TRP1, CORESET2 & SS set 2 for TRP2 | N/A | TDM/FDM 2 CORESETs and 2 SS set2, CORESET1 & SS set1 for TRP1, CORESET2 & SS set 2 for TRP2, and PDCCH1 in CORESET1 & SS set1, PDCCH2 (same bits) in CORESET2 & SS set 2. TDM/FDM | TDM/FDM 2 CORESETs and 2 SS set2, CORESET1 & SS set1 for TRP1, CORESET2 & SS set 2 for TRP2, and PDCCH1 in CORESET1 & SS set1, PDCCH2 (different coded bits) in CORESET2 & SS set 2. TDM/FDM |

As can be seen from above, some combinations are not meaningful (such as SDM with multiple layers) and can be removed or deprioritized, unless further clarifications/justifications are provided. Moreover, Alt1-2/1-3/2/3 are similar to each other in terms of how they operate, and they may lead to the same performance if they are configured to use the same resources. This means that RAM may not need to simulate all these combinations due to their performance similarity. What fundamentally distinguishes them is their configuration complexity/flexibility. Therefore, to select from Alt1-2/1-3/2/3, the key is to analyze their configuration complexity/flexibility.

An initial analysis of 1 CORESET versus 2 CORESETs is given below, as an example. Whether Alt 1-2/1-3/2/3 can achieve the same configured resources depends on how a CORESET can be configured. A CORESET configuration is quite flexible in the frequency domain, e.g., by a bitmap (each bit for 6 RBs), while not so in the time domain (1 to 3 contiguous symbols). Therefore, Alt 2/3 offers more flexibility on time domain resources. In addition, for the case of FR2, PDCCH candidates/SSs for different TRPs on the same symbol (such as FDM) may not be feasible. Though it may be possible to separate candidates/SSs within 1 CORESET to be on different symbols, it will be not possible for some cases (e.g., 1 symbol duration) and difficult for other cases (e.g., 3 symbol duration), and not compatible with the CCE to resource element group (REG) mapping, which is in the time domain first then the frequency domain. Therefore, Alt 1-2/1-3 are less preferred than Alt 2/3. The general observation is similar to those in PUCCH/PUSCH, i.e., it is more natural and flexible to configure two separate sets of parameters/procedures for the two TRPs. This general observation applies to SS sets in a similar way, and thus, Alt 1-2/2 are less preferred than Alt 1-3/3.

Regarding Options 1, 2, and 3, it seems that Option 1 does not combine with Alt 1-0-2/1-3/2/3. If Option 1 is meant to be a selection scheme, then an option of one PDCCH candidate is associated with either TCI state (but not both) should be provided, which does not seem to match agreed alternatives. This could be considered as Alt 1-4: One PDCCH candidate (in a given SS set) is associated with either TCI state of the CORESET. For PDCCH repetition and multi-chance transmissions, the repetition option should be supported. The multi-chance option seems to be not very clear. When two DCIs result in the same outcome, their source bits should be the same, but it is unclear how they can end up with different coded bits if the same DCI format is used. It does not seem justified to provide a different DCI format or a different coding/interleaving/scrambling scheme just for the multi-chance option. Thus, this disclosure suggests to clarify multi-chance before moving forward.

Therefore, at least Alt 3 with Option 2 should be supported.

There were concerns that Alt 3 may require to increase the number of CORESETs supported by a UE on the PCell, since the PCell needs to maintain CORESET0 and BFR CORESET, and thus the PCell is left with one additional CORESET. However, CORESET0 may also be utilized in M-TRP PDCCH transmission. In addition, SCells do not have this issue. Regardless of PCell or SCell, a unified approach may be to increase the number of CORESETs to up to 5. This might slightly increase signaling overhead and complexity, but it is a much cleaner solution than others that require significant changes of the standards. In addition, the most crucial factor for complexity/capability here is not the number of CORESETs but the number of blind detections (BDs); as long as the number of BDs is within a limit, up to 5 CORESETs would not cause any complexity/capability issue.

Proposal 8: To enable a PDCCH transmission with two TCI states, support at least Alt 3 (i.e., two SS sets associated with corresponding CORESETs) and Option 2 (repetition).

As for time-division multiplex (TDM)/frequency-division multiplex (FDM)/SFN for PDCCH, FDM/SFN require two panels to receive PDCCH at the same time for FR2, which adds extra complexity to UE blind detection/blind decoding and may not be desired. Multi-TRP TDM/FDM/SFN can provide much gain compared to TDM/FDM performance gains over single-TRP PDCCH scheme. In addition, if the timing signals from multiple TRPs are not well aligned and arrive at a UE at different times, it may be beneficial for the UE to adopt two FFT windows for best performance, in which one FFT window is associated with one TRP/QCL/TCI state. Thus, this disclosure has the following proposal:

Proposal 9: For M-TRP PDCCH reliability enhancements, support:

At least TDM and/or FDM for FR1, and

TDM for FR2. Each symbol may only be associated with one TCI, one CORESET, and one SS set.

Generally for PDCCH transmission, one candidate out of multiple candidates is selected by the network for the actually PDCCH transmission, and the UE performs BDs over the multiple candidates to identify and decode the actual PDCCH transmission. For PDCCH repetition, two candidates out of multiple candidates are selected by the network for the actually PDCCH transmissions, and the two candidates are "linked" so that when the UE performs BDs over the multiple candidates, it may utilize the linkage information to better identify and decode the actual PDCCH transmission. The case where explicit linkage is supported and signaled to a UE before the PDCCH transmission may be referred to as Case 1, and the case where explicit linkage is not supported and not signaled to a UE before the PDCCH transmission may be referred to as Case 2. If the linkage is supported for PDCCH repetition, the two candidates with the linkage are called "linked candidates" or "paired candidates", on which PDCCH repeated transmission may be supported. Any candidate without the linkage is called an "individual candidate" or "unlinked/unpaired candidate", on which PDCCH repetition cannot be supported (PDCCH transmission without repetition can still be supported). With respect to the linkage of PDCCH candidates, this disclosure first points out that the linkage should be explicitly provided to a UE before decoding. Assume that the UE needs to combine (e.g., using chase combining) two PDCCH candidates to successfully decode the PDCCH, that is, either PDCCH candidate does not have sufficient signal to interference noise ratio (SINR) to be decoded alone. Without a known linkage, the UE has to try to combine any candidate from the first TRP with any candidate from the second TRP. If there are n candidates for either TRP, this leads to n2 combinations that the UE has to try, which is practically feasible only if n is small. However, limiting n to be a small number can degrade the performance. Hence, one embodiment is to consider explicit linkage only, and for the same reason, a PDCCH candidate should be explicitly linked to only a small number (e.g., 4) of the other PDCCH candidates. The explicit linkage may be configured or activated before the UE can attempt the decoding. Examples of the fixed rules may include, e.g., linkage based on the same PDCCH candidate index, based on the same start CCE, based on configuration, etc. However, linkage based on the same PDCCH candidate index or based on the same start CCE has certain restrictions. For instance, they only allow a one-to-one and non-adaptable mapping between the PDCCH candidates, which limits the network's capability of allocating the resources for the actual PDCCH transmissions among the PDCCH candidates in a more flexible way. A more flexible rule may be based on RRC configuration, which can be used to configure one-to-one linkage, one-to-multiple linkage, or multiple-to-multiple linkage, and the linkage can be adapted/modified whenever needed. If further flexibility is needed, MAC activation signaling can also be used. In one embodiment, PDCCH candidate 1 may be transmitted with starting CCE n1, starting CCE n2, . . . , starting CCE nk, and PDCCH candidate 2 may be transmitted with starting CCE m1, starting CCE m2, . . . , starting CCE mk. Each of the starting CCEs n1~nk is configured to be associated with one or more (up to p, where p<k) starting CCEs for PDCCH candidate 2. Each of the starting CCEs m1~mk is configured to be associated with one or more (up to p, where p<k) starting CCEs for PDCCH candidate 1. Then the UE blind detection (BD) may take PDCCH candidate 1 and candidate 2 as the linked/repeated candidate for the same DCI only if their starting CCEs are associated as configured. The total number of the linkages configured/activated for a UE on a serving cell may be limited by a maximum number based on UE capability or standard specification.

Proposal 10: For Alt 1-2/1-3/2/3, support two (or more) PDCCH candidates explicitly linked together (a UE knows the linking before decoding), and support a limited set of configured/activated links between the PDCCH candidates.

Regarding the BD count for Option 2 (for non-SFN based M-TRP PDCCH reliability enhancements as described previously)+Case 1 with up to two PDCCH candidates, this disclosure first clarifies a few transmission schemes. With potentially selection diversity and soft combining for non-SFN PDCCH transmissions, the scenarios/schemes for the Option 2+Case 1 may include, with an example of aggregation level 4 (AL4), the following examples:

i) M-TRPs transmissions of (AL4+AL4), which may further include the following scenarios:

i1) Both transmissions have gone through the over-the-air channels and reached the UE with sufficient SINR (as opposed to being blocked or in outage). This may further include:

i1a) UE soft combining scheme: UE decodes using (AL4+AL4), and i1b) UE selection scheme: UE decodes with one AL4 selected by the UE;

i2) One-outage scenario: Only one transmission has gone through (the other experiences an outage due to, e.g., blockage), and UE decodes with the one succeeded AL4. Which one succeeds is unknown to the UE beforehand i3) One-dropped scenario: Only one of the transmissions is to be monitored by the UE, and the other is dropped/not monitored. The dropped one is known to the UE beforehand ii) Dynamical network selection scheme: one of the TRPs transmits AL4, and UE decodes with the AL4. Which TRP is transmitting is unknown to the UE beforehand iii) Dynamical S-TRP/M-TRP switching scheme: one or both of the TRPs transmit AL4. Which TRP(s) is (are) transmitting is unknown to the UE beforehand (one-outage may also occur for each of the scenarios below but is not listed for brevity). Further including:

iii1) Dynamic switching between S-TRP 1 (AL4+null) and M-TRP (AL4+AL4) Special case: The S-TRP 1 AL4 may overlap with the first AL4 by M-TRP iii2) Dynamic switching between S-TRP 2 (null+AL4) and M-TRP (AL4+AL4) Special case: The S-TRP 2 AL4 may overlap with the second AL4 by M-TRP iii3) Dynamic switching among S-TRP 1 (AL4+null), S-TRP 2 (null, AL4), and M-TRP (AL4+AL4)

Special cases: The S-TRP 1 AL4 may overlap with the first AL4 by M-TRP, and the S-TRP 2 AL4 may overlap with the second AL4 by M-TRP iv) Simultaneous S-TRP/M-TRP transmission scheme: one TRP transmits AL4 and both TRPs transmit (AL4+AL4) in the same slot Therefore, within the framework of Option 2 (for non-SFN based M-TRP PDCCH reliability enhancements as described previously)+Case 1, M-TRP/S-TRP dynamic switching and UE/network selection scheme dynamic switching can be supported. UE/network selection and soft combining can be supported by Option 2+Case 1, and several different outcomes may occur. Other options/cases are not needed. Note that S-TRP transmission may be seen as a special case of network selection.

Note that an S-TRP candidate is also called as an individual (unlinked) candidate, and M-TRP candidates are also called as linked candidates.

We'd like to emphasize the importance of the One-outage scenario. When two TRPs send a PDCCH to a UE, in practice, there is a certain probability that one of the two TRPs experiences an outage, e.g., caused by blockage, channel fading, interference, etc., and hence one transmission may not reach the UE with sufficient SINR. In other words, both of the linked candidates are transmitted, but one of them may not be usable by the UE at all. The one-outage scenario is also quite different from the dynamic network selection, UE selection, or one-dropped scenario. For the one-outage scenario, neither gNB nor the UE knows the missing candidate ahead of time; however, in the other cases, though only one candidate reaches the UE, either the gNB or the UE or both know the missing candidate ahead of time. In this sense, the one-outage may be seen as the worst case for BD. For example, the one-outage is not decided by the gNB as done in the dynamic network selection scenario, and is not decidable by the UE as done in the UE selection scenario; it is just some inevitable but unpredictable event, which can occur rather often (and that is part of the reason why M-TRP is needed). Knowing the inevitability and unpredictability of such events, gNB and UE operations need to take them into consideration. For the BD count, the one-outage scenario, in which only one transmission has gone through for a M-TRP transmission, and exactly which one cannot be known a priori to the gNB or UE, need to be taken into consideration.

For Scenario iv) Simultaneous S-TRP/M-TRP transmission scheme, at least some restrictions are desirable. A UE may not assume or does not expect some or all types of simultaneous transmissions of S-TRP PDCCH and M-TRP PDCCH. For example, simultaneous transmissions of S-TRP PDCCH and M-TRP PDCCH for the same PDSCH may not be expected. For another example, simultaneous transmissions of S-TRP PDCCH and M-TRP PDCCH with the same RNTI and scrambling may not be expected, but simultaneous transmissions of S-TRP PDCCH and M-TRP PDCCH with different RNTIs/scramblings (e.g., one for CSS and the other for USS) may be expected but with high complexity at gNB and UE. To avoid overly complicated design, Scenario 4 may not be supported, i.e., a UE does not assume or expect simultaneous transmissions of S-TRP PDCCH and M-TRP PDCCH on overlapped time-domain resources, but this disclosure is open to clarify this with other companies. If this is to be supported, it has impact on the BD counts and the overlapped CCE ambiguity issues.

Embodiments are provided for the one-dropped scenario in the following. For PDCCH repetition with two linked candidates, due to Rel-15/16 procedures, one of the linked candidates may not be monitored (is dropped). For this scenario, the UE behavior needs to be standardized.

First, the one-dropped scenario should not be limited to dropping due to Rel-15/16 procedures only. The current Rel-17 may also define new procedures to drop one of the linked candidates; for example, depending on the ongoing discussion, the outcome of the overlapped S-TRP/M-TRP candidate ambiguity resolution may drop one of the linked candidates for monitoring. If so, this (or in general new Rel-17 rules) may be added in the applicable case list.

In this case, there may be two options:

Option 1: UE still monitors the linked candidate that is not dropped and interprets the DCI based on Rel. 17 PDCCH rules (w.r.t. reference PDCCH candidate)

Option 2: Even the candidate that is not dropped is not monitored (Both linked candidates are dropped if at least one of them is dropped)

A pro for Option 1 (relative to Option 2) is that the surviving candidate can still be usable, which can provide a bit more flexibility to the gNB if the gNB still wishes/needs to utilize the candidate.

However, the performance of using one candidate may be significantly worse than using both. Example evaluation results below show more than 2 dB performance degradation (or equivalently, significantly worse BLER) in some cases. With this consideration, the gNB may simply choose to find other CCEs so that both candidates can be monitored.

In addition, it should be extremely unlikely that every pair of linked candidates would suffer from one-dropping in the same slot which leads to no transmission of PDCCH in that slot, so it should be unnecessary for the gNB to have to utilize the non-dropped candidate.

Furthermore, Option 1 may have interactions with the overlapped S-TRP/M-TRP candidate issue and make the standards/UE behavior ambiguous, or overly complicated to say the least. For example, M-TRP candidate 1 may overlap with SSB and S-TRP candidate. If the gNB/UE first decide between the S-TRP candidate and the M-TRP candidates, gNB/UE may drop the M-TRP candidates (such as according to Option 2 of S-TRP/M-TRP collision case); but if the gNB/UE first drop the S-TRP candidate and then decide one-drop for the M-TRP candidates (e.g., drop M-TRP candidate 1), they may keep M-TRP candidate 2. That is, with different operational ordering, the gNB/UE may end up with different outcomes. More detailed rules may be specified in the standards, but the standards can get too complicated to ensure consistency among several involved procedures. In this sense, simple operations are preferred.

Thus, Option 2 may be supported. For PDCCH repetition with two linked candidates, if one of the linked candidates is not monitored (is dropped), even the candidate that is not dropped is not monitored (i.e., both the linked candidates are dropped if one of them is dropped). The dropping of one of the linked candidates may be due to Rel-15/16 rules or new Rel-17 rules.

Embodiments are provided for overlapped S-TRP/M-TRP candidates and ambiguity issue in the following. It is possible that one of the linked PDCCH candidates uses the same set of CCEs as an individual (unlinked) PDCCH candidate, and they both are associated with the same DCI size, scrambling, and CORESET. Then for the detected DCI, how to perform the BD counting and interpretation of the DCI needs further study. For example, is the BD counted for M-TRP transmission or S-TRP transmission? Is this DCI interpreted as for M-TRP transmission or S-TRP transmission? This may be needed for subsequent operations, such as receiving PDSCH, sending A/N feedback, etc. Note that there are three SS sets involved, two for the linked candidates and one for the unlinked candidate.

Regarding when the ambiguity may arise, this disclosure points out that it does not occur for Scenario i) or Scenario ii). For Scenario i), a candidate is always for M-TRP, and for Scenario ii), a candidate is always for S-TRP. Ambiguity may arise for Scenario iii) with dynamic switching between S-TRP and M-TRP, and Scenario iv) of simultaneous S-TRP/M-TRP transmissions (if supported). The following provides embodiment options to solve the issue.

Option 1: The individual candidate is not counted for monitoring.

If the linked candidates for M-TRP are for a URLLC transmission, the URLLC transmission should have a higher priority due to its high reliability requirement and/or urgency. In this sense, a user-specific search space (USS) carrying a DCI for the URLLC transmission may be set to have a higher priority than a CSS and other USSs, which can be supported by this option. However, for ebb transmissions with M-TRP, a corresponding USS's priority may not be higher than a CSS, which is not aligned with Option 1. Therefore, Option 1 may not be desirable in this regard.

Option 2: The candidate in a higher SS set ID is not counted for monitoring.

Option 3: The candidate associated with SS set(s) with a lower priority is not counted for monitoring, where for two linked SS sets, the priority is according to one of the two SS sets with a lower SS set ID.

Comparing Option 2 and Option 3, Option 2 may be simpler but it takes into consideration only two of three SS sets involved, and Option 3 takes into consideration all the three SS sets involved. Thus, Option 2 may be less preferred than Option 3.

In addition, the gNB can configure different SS set IDs with different priorities. For example, for URLLC traffic to be sent by M-TRP, one of the SS sets can be configured with a low SS set ID (e.g., lower than CSS set ID so that it may even have a higher priority than CSS), and for eMBB traffic to be sent by M-TRP, the SS set IDs can be high so that CSS will have a higher priority than the M-TRP transmission of the eMBB traffic.

For simplicity as mentioned before, in one embodiment, simpler rules may be defined, e.g., a rule may specify that if one of the candidates is not to be monitored, the other is also not to be monitored.

Option 4: Whether the candidate is a linked or unlinked candidate is distinguished by different radio network temporary identifiers (RNTIs) defined for the linked candidate versus the individual candidate.

This option (Option 4) can resolve the ambiguity issue after the DCI is successfully detected. However, it may not be a complete solution as a candidate has to be counted twice (one for S-TRP and one for M-TRP), i.e., the UE in general has to attempt BD for S-TRP and BD for M-TRP. For Options 1-3, there is no need for the UE to attempt both BDs, which reduces UE complexity.

Option 5: Distinguished by aggregation level restrictions that can be expected by the UE in the case of overlap.

This option (Option 5) can resolve the ambiguity issue and does not require the UE to attempt both BDs. However, AL restrictions may cause scheduling restrictions.

Based on the above analysis, Option 3 may be preferred in an example. Option 3 may be further revised/simplified to: a UE is not expected to monitor a candidate that does not have the lowest SS set ID and that is not linked to a candidate with the lowest SS set ID.

It is also critical to clarify an important UE behavior, that is, for the decoding assumptions, whether a UE always follows a fixed/pre-determined BD order or not. From the discussions so far, it seems that the UE can only follow a pre-determined BD order and cannot adapt its BD behavior. However, if there is other side information provided to the UE, the UE may be able to adapt (such as based on UE outage detection, energy detection, etc.), but so far that does not seem to be the case except for Scenario 1C with pre-determined one-dropping. The BD order is part of UE implementation and not reported/known to the gNB. It is suggested that UE vendors should clarify the BD order. For example, for Assumption (which will be discussed later in the disclosure) 3 UE decoding the first PDCCH candidate and the combined candidate, this disclosure assumes a fixed BD order such as either {candidate 1, candidates 1+2} or {candidate 2, candidates 1+2}, but cannot adaptively switch between these two orders. The rest of the analysis is based on this understanding unless otherwise specified.

It may be useful to further clarify whether the BD order is considered as UE discloses its receiver implementation when UE reports its soft-combining capability or when UE reports a BD count that implicitly suggests the UE supports soft combining. If this information is not available at the gNB, the gNB may need to assume the worst case; that is, for the BD count, the gNB may assume a higher BD count as some UEs may perform soft combining on top of individual decoding, but the gNB may also have to assume a more conservative BD performance as some other UEs cannot perform soft combining.

The following is a question raised:

Question: Is there any reason to consider the restrictions in option 2 (same AL, same DCI payload, same coded bits) in the absence of soft-combining (i.e., for selection diversity)?

For Option 2 (i.e., the candidate in a higher SS set ID is not counted for monitoring) network selection, a restriction of same AL, same DCI payload and same coded bits does not apply. However, for Option 2 UE selection, a restriction of same AL, same DCI payload and same coded bits is needed, since Option 2 UE selection is UE implementation and transparent to the gNB. So the gNB still needs to maintain the transmission scheme intended for Option 2, i.e., if both PDCCH candidates are present, they should still have the same AL/DCI payload.

In the following, four assumptions (according to 3GPP RAN1 103-*e* Meeting (2020/10), which is incorporated by reference) that may be taken by the gNB regarding UE's behavior of decoding are analyzed. These assumptions are also referred to as decoding assumptions in the following description.

Assumption 1: a UE only decodes the combined candidate without decoding individual PDCCH candidates. The combined candidate is a soft-combining of the two linked candidates, so the UE first performs soft combining of two linked candidates and then performs one BD on the combined candidate.

This works well for M-TRP transmissions, soft combining, and UE selection, but may not work for dynamic network selection, because if only one PDCCH candidate is transmitted, the combined candidate is generally not decodable.

Assumption 2: a UE decodes individual PDCCH candidates.

This works well for M-TRP transmissions, UE selection, and dynamic network selection, but may not utilize the benefit of soft combining.

Assumption 3: a UE decodes the first PDCCH candidate and the combined candidate.

This works well for M-TRP transmissions, soft combining, and UE selection, but may not work for dynamic network selection, since if only the second PDCCH candidate is transmitted, decoding only the first PDCCH candidate and the combined candidate will not be successful.

Assumption 4: a UE decodes each PDCCH candidate individually, and also decodes the combined candidate.

This works well for all schemes, but the complexity is the highest among the four assumptions.

For the BD counts, this disclosure suggests to consider two types of bounds as discussed in the following:

The worst case or upper bound BDs, may be related to Assumption 4 and may correspond to a non-optimized, exhaustive search based implementation. However, this could be the "safest" implementation under some cases. For example, if "dynamic network-selection" scheme is supported, e.g., the network may dynamically select only one TRP for a PDCCH transmission in some transmissions, UE has to attempt on candidate 1, candidate 2, and the soft combining of them.

The best case, opportunistic, or lower bound BDs, may rely on a UE who can smartly and opportunistically choose one or two PDCCH candidates to decode (e.g., based on the SINR estimates on the DMRS). For example, if one candidate seems to be blocked, the UE uses only the other to decode; and if no candidate is blocked, both candidates are used to decode. Then one BD is sufficient in most cases except for dynamic network selection.

For typical cases and typical implementations, the BD numbers may be in between, i.e., between 1 and 3. Moreover, it seems that as long as the dynamic network selection is separated from the other schemes (e.g., the network specifies to the UE whether the dynamic network selection is enabled), then the lower bound of 1 BD is typically possible with smart UE implementation, even though this UE implementation is unlikely to be standardized. The UE implementation may be configured to have flexibility to choose between a non-optimized approach which relies on more BDs and an optimized approach with fewer BDs based on side information from SINR. According to our understanding, the maximum number of candidates can be 3.

To summarize, if dynamic network selection is not enabled, then 1 BD per DCI is generally feasible and 2 BDs per DCI is an upper bound; if dynamic network selection is enabled, then 3 BDs per DCI is generally required. Whether the dynamic network selection is enabled or not can be based on network configuration via RRC signaling, network activation/deactivation via MAC signaling, and/or network indication via DCI.

For the BD count for Option 2 (for non-SFN based M-TRP PDCCH reliability enhancements as described previously)+Case 1 with up to two PDCCH candidates, one embodiment is to specify the lower bound as 1 BD per DCI and an upper bound as 3 BDs per DCI. Furthermore, in some embodiments, if dynamic network selection is supported and its status is signalled to the UE, when dynamic network selection is not enabled, the lower bound is 1 BD per DCI and an upper bound is 2 BDs per DCI; otherwise, 3 BDs per DCI is required. That is, the UE BD limits and capabilities may depend on the transmission schemes.

In the following, this disclosure analyzes five (5) options (as proposed in 3GPP RAN1 104-e Meeting, 2021/01, which is incorporated by reference in its entirety) based on above discussions regarding UEs reporting of their abilities.

Option 1: a UE reports one or more numbers as a required number of BDs for the two PDCCH candidates
Candidate values: 2, X.
Where X is a value greater than 2 and equal to or less than 3
For further study (FFS): Whether a value between 1 and 2 should be added to the candidate values
FFS: Other values As analyzed above, a BD count of 2 is insufficient for the most general scenarios. If the UE is not required to report some fundamental assumptions such as soft-combining capability and the gNB does not signal the UE about dynamic selection decisions, there is no use for the UE to report more than one BD number to the gNB.

Option 2: a UE reports whether it supports soft-combining or not
If soft-combining is supported, the UE further reports one or more numbers as required number of BDs for the two PDCCH candidates Candidate values: 2, X.
Where X is a value larger than 2 and equal or less than 3
FFS: Whether a value between 1 and 2 may be added to the candidate values
FFS: Other values Depending on whether soft-combining capability is part of UE implementation or not, this Option may or may not be a valid option.

Assuming soft-combining capability can be reported, this option may be incomplete as it does not cover the case when soft combining is not supported. With the reporting of soft-combining capability, the uncertainty in BD counts is further reduced and no reporting of BD counts is needed.

Option 3: a UE reports one or more decoding assumptions out of decoding Assumptions 1-4
Number of BDs for decoding Assumption 1:
Alt1: 2 BDs
Alt2: A value between 1 and 2 BDs
As analyzed above, Assumption 1 is insufficient with one-outage scenario or dynamic network selection. It is also unclear why Alt 1 and Alt 2 have more than 1 BD for soft combining only.
Number of BDs for decoding Assumption 2: 2
Assumption 2 is optimal in BD performance since it does not allow soft combining.
Number of BDs for decoding Assumption 3: 2
FFS: Other values
Assumption 3 without adaptation of BD order cannot achieve optimal BD performance with one-outage scenario or dynamic network selection.
Number of BDs for decoding Assumption 4: 3
FFS: Other values
Assumption 4 is optimal but it does not need to be reported.

Option 4: Always 2 BDs are assumed irrespective of UE's decoding assumption 2 BDs without adaptation of BD order does not achieve optimal BD performance with one-outage scenario or dynamic network selection.

Option 5: Always 3 BDs are assumed irrespective of UE's decoding assumption
This is the only way to ensure the optimal BD performance in all scenarios with all possible UE implementations.

Regarding the UE reporting of BD counts and its interpretation, the following is considered:
Having the soft combining capability or not will not be reported by the UE.
If a UE reports 2 BDs, in general it does not support soft combining, i.e., the 2 BDs are two separate BDs (in other words, the 2 BDs are not 1 soft combining plus 1 individual BD, which is not a reasonable implementation).
If a UE reports 3 BDs, then it supports 1 soft combining and 2 individual BDs.
The network can further tell the UE (e.g., via RRC, MAC, DCI) that gNB dynamic selection (or dynamic switching between an anchored S-TRP and M-TRP) is not expected or is rare, or tell the UE that suboptimal BD performance is acceptable. Then the UE can fall back to 2 BDs or 1 BD.
If the network does not convey any of the information to the UE, the UE uses 3 (worst case, and full UE capability).
The same value (2 or 3 BDs) may be assumed by the UE and by the gNB.

Reporting 3 BDs is equivalent to reporting that soft combining is supported, and reporting 2 BDs is equivalent to reporting that soft combining is not supported.

However, if the network transmission scheme (e.g., whether the dynamic network selection is enabled or not) or the BD budget for this network transmission scheme (e.g., scenarios i, ii, or iii above), can be signalled to the UE based on a network configuration via RRC signaling, and/or based on network activation/deactivation via MAC/DCI signaling, the actual BD counts at the UE can be lower. Below table summarizes the scenarios and BD counts.

TABLE 3

| Scenarios and BD counts under different assumptions gNB Tx scheme | Soft-combining capable UE | | Soft-combining incapable UE |
| --- | --- | --- | --- |
| | No or ignoring one-outage | With one-outage | |
| Scenario ii Dynamical network selection | 2 (d1 and d2) | | 2 (d1 and d2) |
| Scenario 1 M-TRP | 1 (dsc) | 3 (d1 and d2 and dsc) | |
| Scenario iii1: Dynamic switching between S-TRP 1 and M-TRP | 2 (d1 and dsc) | | |
| Scenario iii2: Dynamic switching between S-TRP 2 and M-TRP | 2 (d2 and dsc) | | |
| Scenario iii3: Dynamic switching between TRP 1, TRP 2, and M-TRP | 3 (d1 and d2 and dsc) | | |

(In Table 5, d1: BD for candidate 1; d2: BD for candidate 2; dsc: soft combining.)

For different scenarios and UEs with different capabilities, the following may be considered:

For UE reporting 2 BDs:
  Always assume up to 2 BDs for all scenarios
For UE reporting 3 BDs:
  Simplified design:
    The design allows the gNB to over-estimate the BD budget needed by a UE, does not need gNB assistance information to the UE, and has best BD performance (which may useful for, e.g., URLLC communication).
    Always assume up to 3 BDs for all scenarios; actual BD counts may depend on UE implementations and scenarios, but may be higher than cases with gNB assistance information.
  More sophisticated design:
    The gNB has a more accurate estimate on BD budget, which may also reduce UE BD counts, but need gNB assistance information to be sent to the UE, and may result in degraded BD performance due to one-outage unforeseeable by the gNB/UE.
    M-TRP transmission only and with no or ignored one-outage: 1 BD
    Dynamic switching between a fixed S-TRP (need to specify which TRP in the gNB assistance information) and M-TRP, or dynamic network selection: 2 BDs
    All others scenarios: 3 BDs.
    However, if after the UE completes the BDs according to the gNB assistance information but finds none decodable, then the UE can finish 3 BDs
Overall the more sophisticated design seems having quite high complexity and overhead but not much performance advantage. Therefore, this disclosure suggests to adopt the simplified design.

For the BD count for Option 2 (for non-SFN based M-TRP PDCCH reliability enhancements as described previously)+Case 1 with up to two PDCCH candidates, the following may be considered:

If a UE reports 2, always 2 BDs are assumed;
  If a UE reports 3, always 3 BDs are assumed;
  Reporting of 3 implies that the UE supports soft combining.

For PUCCH resource determination, there may be two options:
  Option 1 based on the lowest CORESET ID;
  Option 2 based on the lowest SS set ID.

In the typical cases, two PDCCHs from two TRPs are transmitted in two different CORESETs which are one-to-one associated with two different SS sets. There is no essential difference with the two options. However, in some cases, the same CORESET with two different SS sets may also be allowed, which corresponds to the single-TRP PDCCH repetition cases and can lead to PUCCH resource determination ambiguity. Though some argued that the single-TRP cases are not within the scope here, it seems Option 2 may always be applied regardless of single-TRP or M-TRP. Therefore, this disclosure suggests to adopt Option 2, i.e., PUCCH resource determination is made based on the lowest SS set ID.

FFS of Inter-Slot PDCCH Repetition Reference Slot

In inter-slot PDCCH repetition, two CORESETs and two corresponding SS sets are linked across two different slots, and the UE may use either/both PDCCH candidates to decode. There has to be sufficient time offset after the later PDCCH candidate so that there is enough time for the UE to utilize the later PDCCH. That is, the standards should work in the worst case when the earlier PDCCH candidate alone is not decodable. Therefore, this disclosure suggests to confirm this FFS point.

The following discusses PDSCH time domain resources when PDCCH repetition is being used: starting PDSCH symbol and reference symbol.

In Rel-15 and Rel-16, the first symbol of a monitoring occasion is used as the reference for determining the starting PDSCH symbol. For example, it specifies in TS 38.214:

The reference point S0 for starting symbol S is defined as:
    if configured with referenceOfSLIVForDCI-Formats-2-r16, and when receiving PDSCH scheduled by DCI format 1_2 with CRC scrambled by C-RNTI, MCS-C-RNTI, CS-RNTI with K0=0, and PDSCH mapping Type B, the starting symbol S is relative to the starting symbol S0 (S0 is also the reference symbol here) of the PDCCH monitoring occasion where DCI format 1_2 is detected;
    otherwise, the starting symbol S is relative to the start of the slot using S0=0.

The reference symbol S0 is not necessarily the symbol where a PDCCH starts, and it may be the symbol where the monitoring occasion starts. It is expected that UEs have adopted this behavior. It is then preferred that in Rel-17 the same behavior is reused, i.e., a UE assumes the PUSCH starting symbol to be relative to the beginning of the monitoring occasion if a PDCCH may be detected within that monitoring occasion. This also helps reduce the reception latency. Thus, the starting symbol of the earlier monitor occasion can be used as the reference.

The following provides embodiments for PDSCH receive/transmit beam when a TCI field is not present: A number of options are possible, e.g., a default PDSCH beam may be used, the latest PDSCH beam may be used, a common beam may be used, etc. However, according to some embodiments, the best way is to carry a TCI field in a PDCCH. An embodiment is that the TCI field is mandatory unless there is no ambiguity from the UE side and gNB side, e.g., there is a unique TCI state active at a moment. That is, a TCI field needs to be present unless there is no beam ambiguity at the UE/gNB sides.

Embodiments for reference PDCCH for PDSCH with PDCCH repetition are provided in the following: When PDCCH repetitions are associated with different CORESET-PoolIndex values, a reference PDCCH for PDSCH may be used, e.g., for purposes of PDSCH scrambling. The reference PDCCH may be the one with CORESETPoolIndex 0, as an example.

The DL operations under the high speed train-single frequency network (HST-SFN) deployment scenario rely on Rel-16 eMIMO multi-TRP based URLLC Scheme 1c with a single DCI. An agreement from 3GPP RAN1 #96 Meeting (2019/02) (which is incorporated by reference) regarding Scheme 1c is as follows:

To facilitate further down-selection for one or more schemes in 3GPP RAN1 #96bis Meeting (2019/04), schemes for multi-TRP based URLLC, scheduled by single DCI at least, are clarified as following:
M-TRP PDSCH Scheme 1 (SDM): n (n<=N_s) TCI states within the single slot, with overlapped time and frequency resource allocation
§ M-TRP PDSCH Scheme 1c:
a. One transmission occasion is one layer of the same TB with one DMRS port associated with multiple TCI state indices, or one layer of the same TB with multiple DMRS ports associated with multiple TCI state indices one by one.

Based on Scheme 1c, the Rel-17 HST-SFN may operate according to the following manners:

Network configuration

Multiple TRPs are connected with ideal backhaul with the same cell ID to serve UEs on HST.

SSB configuration

In principle, some TRPs may not need to transmit SSB, and transmission of TRP-specific TRS may be sufficient for data transmissions, but since the distances between the TRPs are usually a few hundred meters, it may be desirable to have all TRPs transmit SSBs to cover the entire range. So generally, each TRP can transmit a SSB associated with a common cell ID. The SSB may be the same for some or all TRPs (i.e., SFN for SSB) or TRP-specific SSBs; however, as the SSBs are transmitted directionally along the HST directions, i.e., with different beams, generally the SSBs should be TRP-specific SSBs.

TRS configuration

There may be two options for TRS pre-compensation for Doppler shifts:

Option 1 TRS design: no or little pre-compensation for Doppler shifts, with TRP-specific TRS For this option, the TRPs are synchronized, and they transmit in a synchronized fashion without pre-compensation for Doppler shifts. A UE sees different Doppler shifts for different TRSs, i.e., the TRSs are TRP-specific. Based on the TRSs, the UE can estimate TRP-specific Doppler shifts. Note that different TRPs have significantly different Doppler shifts for HST.

Each TRP-specific TRS can be QCLed (e.g., Type A, and for FR2, also Type D) to the corresponding TRP-specific SSB.

Option 2 TRS design: with pre-compensation for Doppler shifts, and SFN for TRS from different TRPs For this option, the TRPs are synchronized, and they transmit in a synchronized fashion with sufficient pre-compensation for Doppler shifts. A UE sees nearly the same Doppler shifts for different TRSs, and therefore the TRSs can form a SFN. Based on the TRS, a UE can estimate residual Doppler shift if needed.

The TRS can be QCLed to one or more of the SSBs.

PDSCH DMRS configuration

Multiple TRPs transmit the same PDSCH (and possibly PDCCH) on the same time-frequency resources, forming a SFN based on Scheme 1c.

Note that each TRP can transmit all layers (e.g., L layers), for example, all TRPs (e.g., n TRPs) transmit all L layers of the same TB/codeword. This is a straightforward generalization of the one layer in Rel-16 Scheme 1c. Note also that the SFN is possible thanks to the ideal backhaul among the TRPs.

There are two options for the DMRS for PDSCH:

Option A: SFN DMRS port(s) for all TRPs

For this option, a UE receives L DMRS ports, and each DMRS port corresponds to a layer from all TRPs. In other words, each DMRS port is formed by the SFN of all TRPs. The DMRS port needs to be simultaneously QCLed to the TRSs:

Option A-1: SFN DMRS port(s) QCLed to TRP-specific TRS

The SFN DMRS needs to be associated with multiple TCI state indices, each TCI state index specifies a QCL relation to the TRP-specific TRS of a TRP. QCL type A (Doppler shift, Doppler spread, average delay, delay spread) should be specified in the TCI state.

An example of the QCL configuration for the DMRS port(s) is:
TCI state 1: QCL A, TRS 1 (for TRP 1)
TCI state 2: QCL A, TRS 2 (for TRP 2)
TCI state n: QCL A, TRS n (for TRP n)
Option A-2: SFN DMRS port(s) QCLed to SFN TRS The SFN DMRS can be associated with one TCI state index, which specifies a QCL relation to the SFN TRS of TRPs. QCL type A (Doppler shift, Doppler spread, average delay, delay spread) should be specified in the TCI state.

An example of the QCL configuration for the DMRS port(s) is:
TCI state: QCL A, TRS (for all TRPs)
Option B: TRP-specific DMRS ports For this option, the UE receives nxL DMRS ports. The nxL ports can form L sets, each set containing n ports associated with a same layer from the n TRPs. The nxL ports can also form n groups, each group containing L ports associated with a same TRP for the L layers (a group could be a CDM group). Likely the L ports for the same TRP can be a CDM group, but ports for different TRPs should be orthogonalized in time/frequency/sequence domain. This option works only with Option 1 TRS design with TRP-specific TRSs.

Note that though the Work Item Description (WID) in RP-193133, "New WID: Further enhancements on MIMO for NR" approved in 3GPP RAN #86 meeting, does not list Option B as an example, it is not precluded.

An example of the QCL configuration for the DMRS ports is:
$1^{st}$ group of L DMRS ports: TCI state 1: QCL A, TRS 1 (for TRP 1)
$2^{nd}$ group of L DMRS ports: TCI state 2: QCL A, TRS 2 (for TRP 2)
$n^{th}$ group of L DMRS ports: TCI state n: QCL A, TRS n (for TRP n)
From the above description, this disclosure can see that the following issues need to be addressed in Rel-17:

Decision on supporting TRS/DMRS options, e.g., Option A (Option A-1 and Option A-2) and/or Option B.

Option A has a lower DMRS overhead, but the channel estimation on the DMRS with a composite channel from all TRPs may be more complicated and less accurate than Option B. Especially Option A-1 channel estimation may be challenging. The tradeoff should be studied in Rel-17 and an agreement is needed about which one or both should be supported.

Specify UE behavior/assumption

For either options, UE assumption and minimum UE behavior (if any) need to be specified. For example, for Option A, the UE needs to assume that the channel on a DMRS port is a composite channel, or a superposition of individual channels associated with the TRSs. For Option B, the UE needs to assume that the channel for PDSCH is a composite channel, or a superposition of individual channels associated with the corresponding n DMRS ports.

In order for the network to apply Doppler shift pre-compensation value for each TRP before transmitting the SFN PDSCH, the UE may need to transmit SRS to each TRP, and the SRS may be based on the Doppler shift that the UE experiences for that TRP in DL. This may require the UL signal and DL signal to be associated, e.g., with respect to the Doppler shift and possibly spatial filtering (i.e., beams). This can fit into the generic QCL framework, i.e., the UL/DL signals can be defined as QCLed to each other. In addition, defining the UL/DL signal relation as QCL has a significant advantage, as the QCL/TCI information can be signaled to a UE in a dynamic fashion via DCI, which offers much higher flexibility in a dynamic network deployment scenario (such as a HST) than using RRC/MAC based signaling framework. The following provides some schemes for the PDCCH/PDSCH transmission in HST-SFN scenarios:

Scheme 1 with PDxCH, including

Sub-scheme 1a: Scheme 1 with PDCCH

For this sub-scheme, the TRSs are TRP-specific and separate, but the PDCCH DMRS forms SFN. Each PDCCH candidate and its DMRS are associated with two TCI states simultaneously. This is basically similar to the Alt 1-1 SFN scheme (1 CORESET and 2 simultaneous TCI states) under the study of M-TRP non-PDSCH, and can be studied there.

Sub-scheme 1b: Scheme 1 with PDSCH

For this sub-scheme, the TRSs are TRP-specific and separate, but the PDSCH DMRS forms SFN. Each PDSCH and its DMRS ports are associated with two TCI states simultaneously.

Scheme 2 with PDxCH, including

Sub-scheme 2a: Scheme 2 with PDCCH

For this sub-scheme, the TRSs are TRP-specific and separate, and the PDCCH DMRS ports are TRP-specific and separate, but the PDCCH forms SFN. For each PDCCH candidate, two sets of DMRS ports are configured, and each set of DMRS ports is associated with one of the two TCI states which links the set of DMRS ports to the associated TRP-specific TRS. To decode the PDCCH, the UE needs to utilize both sets of DMRS ports.

Sub-scheme 2b: Scheme 2 with PDSCH

For this sub-scheme, the TRSs are TRP-specific and separate, and the PDSCH DMRS ports are TRP-specific and separate, but the PDSCH forms SFN. For each PDSCH, two sets of DMRS ports are configured, and each set of DMRS ports is associated with one of the two TCI states which links the set of DMRS ports to the associated TRP-specific TRS. To decode the PDSCH, the UE needs to utilize both sets of DMRS ports.

decode the PDSCH, the UE needs to utilize both sets of DMRS ports.

The sub-schemes above can be combined based on network/UE implementations. Though it is generally natural to use the same scheme for both PDCCH and PDSCH, the standards may not need to mandate that. Thus, RAM can consider all four sub-schemes if no complexity issues are raised.

More SFN schemes may be possible. Consider a chain of QCL relations: PDxCH→DMRS→(QCL Type A) TRS→(QCL Type C) SSB. Note that the DMRS may be QCLed to SSB directly without TRS. For PDxCH and its DMRS, a layer of the PDxCH may be seen as QCLed to its corresponding DMRS port with all QCL types (i.e., having the same properties). The term "PDxCH" means "PDCCH", "PDSCH" or both.

According to some embodiments, the following 4 different ways/schemes may be used to form a SFN:

1. Standard transparent SFN: SFN formed at SSB and hence TRS/DMRS/PDxCH
2. TRS-SFN: SFN formed at TRS and hence DMRS/PDxCH (separate SSB)
3. Scheme 1: SFN formed at DMRS and hence PDxCH (separate SSB/TRS)
4. Scheme 2: SFN formed at PDxCH (separate SSB/TRS/DMRS)

For the last three of the above SFN schemes, new UE behavior/assumption or enhanced QCL may be needed. For each PDxCH layer or a destination RS port, when it is QCLed to 2 source RS ports of the same type at the same time, a UE shall assume a composite channel for the PDxCH layer or a destination RS port, and derive the composite channel properties from both source RS ports according to the specified QCL type(s).

With regard to Scheme 1 vs. Scheme 2, Scheme 1 has a lower DMRS overhead but the channel estimation on the DMRS with a composite channel from all TRPs may be more complicated and less accurate than Scheme 2. In other words, the schemes can be used to achieve different tradeoffs, and hence may be preferred under different scenarios. To provide sufficient flexibility in standards, both schemes should be supported.

The following provides embodiments regarding the potential design details for HST-SFN:

Whether more than 2 QCL/TCI states may be required

HST-SFN can be very effective in reducing handover and related overhead and help smooth the UE experience in HST. To potentially further enhance the UE experience and always benefit from at least 2 TRPs (rather than entering a temporary single-TRP operation mode when one of the TRPs is out of the coverage), it may be preferred by the network and UE to maintain connections with 3 TRPs or even more, according to some embodiments. On one hand, to enable this, a UE may need to have a capability to support maintaining n QCL/TCI states at the same time, where n>=3. On the other hand, in general, 2 QCL/TCI states may be already sufficient for most scenarios. In any case, the UE capability for maintaining n QCL/TCI states at the same time needs to be reported to the network, and different UEs, n can take value 1, 2, 3, or even more. In addition to UE capability, the standard impact might also be significant, as the new QCL type with 2 TRS sources is already quite complicated and an agreement is yet to be achieved. New QCL type with more than 2 TRS sources is an open issue and embodiments will be provided below, as shown with the following schemes.

Scheme 1: QCL relationship between TRS and DMRS ports

Each TRP can transmit all layers (e.g., L layers), i.e., all TRPs (e.g., n TRPs, n is the number of QCL/TCI states configured/activated for a UE) transmit all L layers of the same TB/codeword. This is a straightforward generalization of the one layer in Rel-16 Scheme 1c. The UE receives L DMRS ports, and each DMRS port corresponds to a layer from all TRPs. In other words, each DMRS port is formed by the SFN of all TRPs. The DMRS port needs to be simultaneously QCLed to the TRSs. The SFN DMRS needs to be associated with multiple TCI state indices, and each TCI state index specifies a QCL relation to the TRP-specific TRS of a TRP. QCL Type A (Doppler shift, Doppler spread, average delay, delay spread) can be specified in the TCI state. UE assumption and minimum UE behavior (if any) need to be specified. For example, the UE needs to assume that the channel on a DMRS port is a composite channel, or a superposition of individual channels associated with the TRSs. This may also be captured as a new QCL assumption to cover the case that each TRS may have significantly different Doppler shifts.

An example of the QCL configuration for the DMRS port(s) is:

TCI state 1: QCL A (with possibly different Doppler), TRS 1 (for TRP 1)

TCI state 2: QCL A (with possibly different Doppler), TRS 2 (for TRP 2)

TCI state n: QCL A (with possibly different Doppler), TRS n (for TRP n)

And each MIMO layer of PDSCH is associated/QCLed to TRS 1 through TRS n simultaneously.

Scheme 2: Association of each MIMO layer of PDSCH to DM-RS antenna ports

For this option, a UE receives nxL DMRS ports. The nxL ports can form L sets, each set containing n ports associated with a same layer from the n TRPs. The nxL ports can also form n groups, each group containing L ports associated with a same TRP for the L layers (a group could be a CDM group). Likely the L ports for the same TRP can be a CDM group, but ports for different TRPs should be orthogonalized in the time/frequency/sequence domain. UE assumption and minimum UE behavior (if any) need to be specified. For example, the UE needs to assume that the channel for PDSCH (or PDCCH) is a composite channel, or a superposition of individual channels associated with the corresponding n DMRS ports. This may also be captured as a new QCL assumption.

An example of the QCL configuration for the DMRS ports is:

1st group of L DMRS ports: TCI state 1: QCL A, TRS 1 (for TRP 1)

2nd group of L DMRS ports: TCI state 2: QCL A, TRS 2 (for TRP 2)

nth group of L DMRS ports: TCI state n: QCL A, TRS n (for TRP n)

The relation between the PDSCH (or PDCCH) and its DMRS ports may need to be redefined, which may be a new QCL type or a new UE assumption/behavior. Previously, a channel and its DMRS ports are always QCLed. With one PDSCH layer linked to more than one DMRS ports at the same time, the existing way may not apply. It is needed to introduce a relation of one PDSCH layer QCLed to several DMRS ports with respect to Doppler shift, Doppler spread, average delay, and/or delay spread, as the UE has to derive these properties from each DMRS port separately first and then combine them into a composite channel.

Scheme differentiation and indication

A HST-capable UE needs to operate under different environments, such as on a HST operating on a SFN scheme (Scheme 1 and/or Scheme 2), or off a HST operating on a single-TRP mode or multi-TRP mode. The schemes need to be differentiated and indicated to the UE to avoid ambiguity and errors. At least the following potential schemes need to be differentiated:

Sub-scheme 1a: Scheme 1 with PDCCH

This requires proper CORESET configuration/activation and can be considered in M-TRP PDCCH enhancement.

Sub-scheme 1b: Scheme 1 with PDSCH

This can be configured to the UE via RRC configuration signaling, or activated for the UE via MAC CE, or by default to be the same as the PDCCH operation scheme (e.g., if the PDCCH is using Scheme 1, then the PDSCH shall also use Scheme 1), or relies on PDCCH indication with PDCCH decoding delay (according to the standardized application delay of the minimum PDSCH scheduling offset restriction). These different approaches have different levels of complexity and flexibility, and can be considered in RAN1.

To tell this scheme apart from other schemes in a signaling to a UE, a PDSCH DMRS port may be configured/activated to be associated with 2 TRSs at the same time, e.g., 2 TCI states. To distinguish Sub-scheme 1b from Sub-scheme 2b, note that Sub-scheme 1b is configured/activated with only one set of DMRS ports (e.g., one antenna port(s) field in DCI, and one group of antenna port(s) indicated by DCI or other signaling), and each port is associated with 2 TCI states (e.g., two TCI fields in DCI, two TCI states in MAC, etc.), whereas Sub-scheme 2b is configured/activated with two sets of DMRS ports (e.g., two antenna port(s) fields in DCI or other signaling, or two groups of antenna port(s) indicated by DCI or other signaling), and each set is associated with only one TCI state (e.g., two TCI fields in DCI, two TCI states in MAC, etc.). That is, at least different DCI/MAC designs with different fields may be provided, or an operation type flag may be signalled in DCI, MAC or RRC signaling. To distinguish Sub-scheme 1b from non-SFN M-TRP schemes, different DCI types may be used, or alternatively a new field for the number of streams/layers (or equivalently, the number of DMRS ports per PDSCH stream/layer) may be added to the DCIs. The number of ports corresponds to the number of layers/streams (i.e., rank) of the transmission. For Sub-scheme 1b, the number of layers is equal to the number of ports in antenna port field 1 (or group 1) and also equal to the number of ports in antenna port field 2 (or group 2), but for non-SFN SDM schemes, the number of layers is equal to the sum of all the numbers of ports.

Sub-scheme 2a: Scheme 2 with PDCCH

To distinguish Sub-scheme 2a from Sub-scheme 1a, Sub-scheme 2a is configured/activated with each PDCCH DMRS port associated with only one of two TRSs, i.e., one QCL/TCI state, whereas Sub-scheme 1a is configured/activated with each PDCCH DMRS port associated with two TRSs, i.e., two QCL/TCI states.

Sub-scheme 2b: Scheme 2 with PDSCH

How to distinguish this from other schemes is already covered in the discussion above. In addition, as described before, the relation/QCL information between the PDSCH and its DMRS ports may use a different assumption/QCL type, which may be used to distinguish this sub-scheme.

Non-scheme 1 and non-scheme 2

This may include Rel-16 non-SFN M-TRP schemes, single TRP schemes, and so on. How to distinguish this from other schemes is already covered above.

Embodiments PDSCH transmission cases are listed below in Table 6 with different parameters, and the parameters for each case may be explicitly or implicitly conveyed to a UE, e.g., via RRC configuration signaling for the PDSCH, MAC CE activation signaling for the PDSCH, and/or DCI signaling for the PDSCH.

TABLE 6

| Case | # TRP(s) | # TRS(s) or SSB(s) | # TCI states/QCL per TRS (1 TRS links to how many SSB) | # TCI states/QCL per DMRS port (1 DMRS port links to how many TRS/SSB) | # DMRS port(s) per PDSCH layer | # total DMRS port(s) | # PDSCH layer(s) | Interpretation |
|---|---|---|---|---|---|---|---|---|
| Case 1 | 1 | 1 | 1 | 1 | 1 | L | L | L layer S-TRP transmission |
| Case 2 | 2 | 1 | 2 (for TRS) or N/A (for SSB) | 1 | 1 | L | L | L layer SFN (SSB/TRS/DMRS/PDSCH SFN) |
| Case 3 | 2 | 2 | 1 | 1 (TRS1 or 2) | 1 | $(L1, L2)$, $L1 = L2$ * | $L1 = L2$ * | M-TRP FDM/TDM |
| Case 4 | 2 | 2 | 1 | 2 (TRS1 & 2) | 1 | L | L | M-TRP SFN Scheme 1 (DMRS/PDSCH SFN) |
| Case 5 | 2 | 2 | 1 | 1 (TRS1 or 2) | 2 ** | 2L ** | L | M-TRP SFN Scheme 2 (PDSCH SFN) |
| Case 6 | 2 | 2 | 1 | 1 (TRS1 or 2) | 1 | L1 or L2, not both * | L1 or L2 * | M-TRP gNB selection scheme |
| Case 7 | 2 | 2 | 1 | 1 (TRS1 or 2) | 1 | $(L1, L2)$ * | $L1 + L2$ * | M-TRP SDM |

* L1: # of DMRS port(s) QCLed to TRS1 (or SSB1)
* L2: # of DMRS port(s) QCLed to TRS2 (or SSB2)
** 2 or 2L: half of it is QCLed to TRS1 and the other half TRS2

Case 2 in Table 6 includes the standard-transparent SFN scheme and TRS-SFN scheme described above.

In order to differentiate these cases, the network may signal #DMRS port(s) per PDSCH layer, or #PDSCH layer(s) or #TCI states per PDSCH layer to UE. The signaling of these parameters may be in RRC configuration signaling, a MAC command, or a DCI indication.

Case 3 and Case 5 have many similarities, but Case 3 is associated with parameters such as FDMSchemeA, FDMSchemeB, TDMSchemeA, etc. Its PDSCH contains two identical PRB sets, and a layer for each set is associated with only 1 DMRS port. In case 5, the PDSCH contains only one PRB set, and each layer is associated with 2 DMRS ports at the same time.

For PDCCH, according to the current standards, only 1 layer is expected by the UE, but one or two PDCCHs (or two PDCCH candidates) may be possible. Embodiment PDCCH transmission schemes are summarized below in Table 7, and the parameters for each case may need to be explicitly or implicitly conveyed to a UE, e.g., via RRC configuration signaling for the PDCCH, MAC CE activation signaling for the PDCCH, and/or the UE's determination based on BD outcome for the PDCCH.

TABLE 7

| Case | # TRP(s) | # TRS(s) or SSB(s) | # TCI states/QCL per TRS (1 TRS links to how many SSB) | # TCI states/QCL per DMRS port (1 DMRS port links to how many TRS/SSB) | # DMRS port(s) per PDCCH | # total PDCCH | Interpretation |
|---|---|---|---|---|---|---|---|
| Case 1 | 1 | 1 | 1 | 1 | 1 | 1 | S-TRP transmission |
| Case 2 | 2 | 1 | 2 (for TRS) or N/A (for SSB) | 1 | 1 | 1 | SFN (SSB/TRS/DMRS/ PDCCH SFN) |
| Case 3 | 2 | 2 | 1 | 1 (TRS1 or 2) | 1 | 2 * | M-TRP FDM/TDM |
| Case 4 | 2 | 2 | 1 | 2 (TRS1 & 2) | 1 | 1 | M-TRP SFN Scheme 1 (DMRS/PDCCH SFN) |
| Case 5 | 2 | 2 | 1 | 1 (TRS1 or 2) | 2 | 1 | M-TRP SFN Scheme 2 (PDCCH SFN) |
| Case 6 | 2 | 2 | 1 | 1 (TRS1 or 2) | 1 | 1 | M-TRP gNB selection scheme |

* 2: one is QCLed to TRS1 and the other TRS2

Case 2 includes the standard-transparent SFN scheme and TRS-SFN scheme described above.

To differentiate the cases, the network may signal #TCI states/QCL per DMRS port (e.g., 1 DMRS port links to how many TRS/SSB), and #DMRS port(s) per PDCCH or #TCI states/QCL per PDCCH to a UE. The signaling of these parameters may be in RRC configuration signaling or a MAC command. In addition, the number of PDCCH(s) is also useful for the UE to determine the cases and may also be signaled to the UE via RRC or MAC signaling. Alternatively, the number of PDCCH(s) for a transmission may be determined by the UE via blind detection. If the UE could only find one PDCCH in a FDM/TDM scheme, then it is similar to UE selection scheme which is similar to gNB selection scheme.

As seen from above tables and analysis, the cases/ schemes can be distinguished by parameters signaled to the UE. This is an implicit way to inform the UE. An explicit way may also be considered, such as for each of the cases/schemes, a scheme label parameter is standardized and signaled to UE in RRC, MAC, or DCI (for PDSCH schemes only).

When the same DMRS port(s) are associated with two TCI states containing a TRS as a source reference signal, embodiments of some variants are possible as described below:

Variant A: One of the TCI states is associated with {average delay, delay spread} and the other TCI state is associated with {average delay, delay spread, Doppler shift, Doppler spread} (i.e., QCL-TypeA)

Variant B: One of the TCI states is associated with {average delay, delay spread} and the other TCI state is associated with {Doppler shift, Doppler spread} (i.e., QCL-TypeB)

Variant C: One of the TCI states is associated with {delay spread} and the other TCI state is associated with {average delay, delay spread, Doppler shift, Doppler spread} (i.e., QCL-TypeA)

Variant E: Both TCI states are associated with {average delay, delay spread, Doppler shift, Doppler spread} (i.e., QCL-TypeA)

Indication method to apply QCL, e.g., via a new QCL-type, or reuse an existing QCL-type, while indicating the UE to ignore certain QCL properties Each TCI state in the above variants may be additionally associated with {Spatial Rx parameter} (i.e., QCL-TypeD), for FR2.

The variants are applicable to scheme 1 and/or TRP based pre-compensation as a reference for evaluation.

The following provide some further discussion and embodiments regarding the new QCL type in connection with SFN.

TCI/QCL for Scheme 1 for PDCCH/PDSCH transmission in HST-SFN scenarios (referred to as SFN Scheme 1 in the following)

The SFN DMRS needs to be associated with multiple TCI state indices, and each TCI state index specifies a QCL relation to one of the two TRSs. Based on our understanding, for DMRS SFN (or PDCCH/PDSCH/TRS SFN) formed by two TRPs, the Doppler shifts for the transmissions from the two TRPs should be sufficiently close. Thus, UE assumption and minimum UE behavior (if any) need to be specified. For example, a UE needs to assume that the channel on a DMRS port is a composite channel, or a superposition of individual channels associated with the TRSs. This may also be captured as a new QCL assumption to cover the case that each TRS may have significantly different Doppler shifts and Doppler spreads.

For the SFN Scheme 1 with PDCCH, the TRSs may be TRP-specific/non-SFN and separate, but the PDCCH DMRS forms a SFN. Each PDCCH candidate and its DMRS may be associated with two TCI states simultaneously.

For the SFN Scheme 1 with PDSCH, the TRSs are TRP-specific/non-SFN and separate, but the PDSCH DMRS forms a SFN. Each PDSCH and its DMRS ports may be associated with two TCI states simultaneously. A PDSCH DMRS port may be configured/activated to be associated with 2 TRSs at the same time.

With gNB pre-compensation, the SFN DMRSs are pre-compensated, which may be QCLed to an optionally transmitted second set of TRSs with gNB pre-compensation (the first set of TRSs is without pre-compensation), or QCLed to the TRP-specific TRSs.

Figure 13:
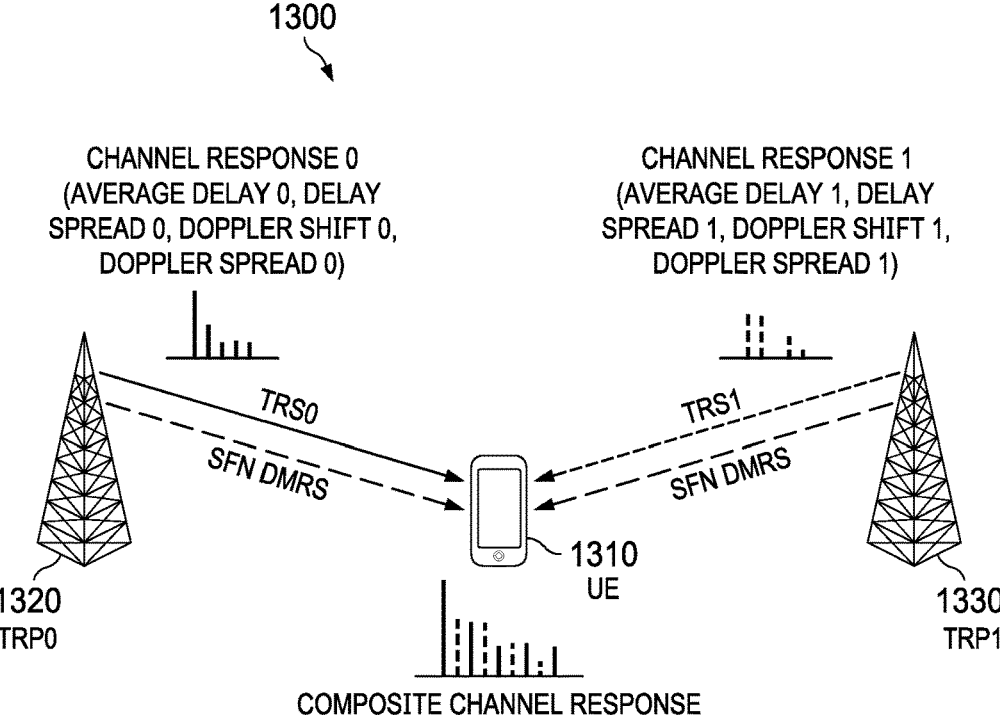
FIG. 13 illustrates a diagram of an embodiment wireless network, highlighting SFN channel responses between a UE and two TRPs.

FIG. 13 illustrates a diagram of an embodiment wireless network 1300, highlighting SFN channel responses between a UE 1310 and two TRPs, i.e., TRP0 1320 and TRP 1 1330. FIG. 13 may be used as an illustration example to study the QCL relationship for the SFN Scheme 1.

As shown in FIG. 13, the TRPs 1320 and 1330 transmit, to the UE 1310, two TRSs, i.e., TRS0 and TRS1, respectively, on a channel 0 between the UE 1310 and TRP0 1320 and a channel 1 between the UE 1310 and TRP0 1330. The UE 1310 may acquire the individual channel responses of the channel 0 and channel 1 using respective TRSs received.

TRS0 is on the channel 0, where channel 0 has cluster(s) 0 with an average delay 0, a delay spread 0, a Doppler spread 0, and a Doppler shift 0.

TRS1 is on the channel 1, where channel 1 has cluster(s) 1 with an average delay 1, a delay spread 1, a Doppler spread 1, and a Doppler shift 1.

The UE 1310 may derive the properties for an SFN channel, e.g., the channel 0 or 1, for a SFNed PDCCH/ PDSCH DMRS. In the composite channel formed by channel 0 and channel 1, both the clusters (or taps/paths/multipath components) are present, and the SFNed DMRS experiences a composite channel with a superposition of the average delay 0, the delay spread 0, the average delay 1, and the delay spread 1.

Depending on the relation between the two TRSs (TRS 0 and TRS 1) and the two TRPs (TRP 0 and TRP 1), there could be at least the following embodiment options for TRS/DMRS design:

Option 1 TRS/DMRS design no pre-compensation for TRS Doppler shifts or DMRS Doppler shifts, with TRP-specific TRS (TRP 0 transmits TRS 0, and TRP 1 transmits TRS 1, no pre-compensation) and SFN DMRS using different Doppler shifts (TRP 0 transmits DMRS 0, and TRP 1 transmits DMRS 1, no pre-compensation)

For this option, the TRPs are synchronized, and they transmit in a synchronized fashion without pre-compensation for Doppler shifts for all of their signals/channels, including the TRP-specific TRSs, SFN DMRS, and PDCCH/PDSCH. The UE sees different average delays, delay spreads, Doppler spreads, and Doppler shifts for different TRSs, i.e., the TRSs are TRP-specific. Based on the TRSs, the UE can estimate TRP-specific average delays, delay spreads, Doppler spreads, and Doppler shifts. The SFN DMRS is from both TRPs without pre-compensation and hence has different Doppler shifts, and so the UE uses the channel properties estimated from the TRSs to adjust the Doppler shifts and then processes the DMRS.

Each TRP-specific TRS may be QCLed (e.g., Type C, and for FR2, also Type D) to a corresponding TRP-specific SSB. This TRS is a set of TRSs without network pre-compensation.

For the QCL of the SFN DMRS to the TRSs:

Delay profile

The average delay and delay spread of the DMRS come from the superposition from the two TRPs, i.e., from both TRSs.

Doppler profile

The Doppler properties are different for the TRSs and the DMRS. The UE estimates the Doppler shifts from the TRSs and then uses the estimates to process the DMRS. The UE complexity would be high.

Variant E describe above may be adopted for this option. Different from Variant E for other options below, Variant E for this option requires the UE to know that the DMRS is not pre-compensated, which needs to be signaled to the UE from the gNB if more than one Variant E option is supported.

This option does not require the second set of TRSs or UE sounding based on the first set of TRS, but the UE DMRS processing complexity may be high.

Option 2 TRS/DMRS design

With TRP-specific TRSs (TRP 0 transmits TRS 0, and optionally TRP 1 transmits TRS 1, no pre-compensation) which may be referred to as the first set of TRSs, the second set of TRSs which is pre-compensated for Doppler shift(s), and SFN DMRS (same pre-compensation as TRS)

For this option, the TRPs are synchronized, and they transmit in a synchronized fashion, without pre-compensation for Doppler shifts for the first set of TRP-specific TRSs, and with sufficient pre-compensation for Doppler shift(s) for the second set of TRSs and SFN DMRS. The pre-compensation may be based on UE signals sent in the UL, and the network may adjust the frequency for one or both of the second set of TRSs so that the UE will experience the same Doppler shift on the TRSs. The TRSs may form a SFN if the network chooses to send the TRSs on the same REs, but the network can alternatively choose to send the TRSs on different REs, i.e., this may still be Scheme 1.

The first set of TRSs can be QCLed (Type C) to one or more of SSBs, and the UE's UL sounding may be "QCLed" to the TRS 0 of the first set of TRSs, and this QCL-like relation is discussed later in the disclosure. Note that TRS 1 of the first set of TRSs is not necessary (or TRS 1 is sent but TRS 0 is optional).

The second set of TRSs can be QCLed (Type C) to one or more of SSBs. The UE does not need to know the relation between the second set of TRSs and the first set of TRSs. The pre-compensation of the second set of TRSs may be done based on any of the following, and can be transparent to the UE:

The Doppler shift may be adjusted based on TRS 0, i.e., the network pre-compensates TRP 1 to match TRP 0; OR The Doppler shift may be adjusted based on TRS 1, i.e., the network pre-compensates TRP 0 to match TRP 1; OR The Doppler shift may be adjusted based on both TRSs, i.e., the network pre-compensates both TRPs to the average of the TRPs' frequencies; OR The Doppler shift may be adjusted based on a gNB preference, i.e., the network pre-compensates both TRPs to a frequency determined by the gNB.

For the QCL of SFN DMRS to the TRSs, only the second set of TRSs is useful and the first set is not used:

Delay profile

The channels for the TRSs have different average delays and delay spreads, so both TRSs may be used for acquiring DMRS average delay and delay spread. That is, DMRS delay profile is from both TRSs.

Doppler profile

The TRS channels and the DMRS channels have the same Doppler (due to pre-compensation). Doppler profile may be derived from both TRSs or only one of them. But to specify only one of them for Doppler requires more signaling and may not lead to any performance benefit. Therefore, both TRSs may be used, and Variant E may be used.

Therefore, this option can be supported by Variant E if the second set of TRSs are on different resources, or supported by QCL Type A if the second set of TRSs form the SFN, which can be implemented as a standard transparent SFN for TRSs, DMRSs, and PDCCH/PDSCH. The corresponding UE behavior for processing the second set of TRSs and the SFN DMRS is simple. The only standard impact is to support the QCL-like relation between TRS 0 (or TRS 1) and SRS.

Option 3 TRS/DMRS design

With only the first set of TRSs: TRS 0 transmitted by both TRP 0 (without pre-compensation) and TRP 1 (with pre-compensation), and optionally TRS 1 transmitted by TRP 1 (without pre-compensation). SFN DMRS uses the same transmission scheme as TRS 0.

For this option, the TRPs are synchronized, and they transmit in a synchronized fashion. TRS 0 is sent by both TRP 0 and TRP 1, without pre-compensation by TRP 0 and with sufficient pre-compensation for Doppler shift by TRP 1, so that TRS 0 forms a SFN by TRP 0 and TRP 1. TRS 1 is an optional TRS, which may be sent only by TRP 1 without pre-compensation. In other words, after the network receives the UE UL signals based on only TRS 0 or only TRS 1, it adjusts TRP 1's frequency to align with TRP 0's frequency, and hence the UE sees one Doppler shift for TRS 0, and another Doppler shift for TRS 1.

The TRSs can be QCLed to one or more of the SSBs. TRS 0 is part of the first set of TRSs, but can also be directly used by the UE as the second set of TRSs since TRS 0 forms the SFN and the DMRS is transmitted in the same way as TRS 0.

For the QCL of SFN DMRS to the TRSs:

Doppler profile

The Doppler properties come from TRS 0. If both TRS 0 and TRS 1 are transmitted, it requires the network to indicate TRS 0 to the UE for obtaining the Doppler properties.

Delay profile

For the average delay and delay spread of the DMRS, they are the same as those of TRS 0, but the cluster(s) of TRS 1 is also included in TRS 0. The following cases may be possible:

The average delay and delay spread may be from TRS 0, which can be supported by legacy QCL Type A to TRS 0; OR The average delay and delay spread may be from the superposition of both TRSs, which can be supported by Variant A.

Therefore, this option can be supported by legacy QCL Type A or Variant A, though the use of Variant A is not strongly motivated. This disclosure focuses on supporting this option with QCL Type A to TRS 0, which simplifies UE behavior. Also, since TRS 1 without pre-compensation is optional, the RS overhead can be reduced. Overall, this option has low RS overhead and low UE complexity, and the only standard impact is to support the QCL-like relation between TRS 0 and SRS.

Option 4 TRS/DMRS design
  no pre-compensation for TRS Doppler shifts, with TRP-specific TRS (TRP 0 transmits TRS 0, and TRP 1 transmits TRS 1); with SFN DMRS with pre-compensation. No second set TRSs.

For this option, the TRPs are synchronized, and they transmit in a synchronized fashion, without pre-compensation for Doppler shifts for the first set of TRP-specific TRSs. A UE sees different average delays, delay spreads, Doppler spreads, and Doppler shifts for different TRSs, i.e., the TRSs are TRP-specific. Based on the TRSs, the UE can estimate TRP-specific average delays, delay spreads, Doppler spreads, and Doppler shifts. The UE sends signals in the UL, and the network may adjust the frequency for one or both of the DMRSs so that the UE will experience the same Doppler shift on the DMRSs, i.e., the DMRSs from the TRPs form a SFN with the same Doppler shift.

The TRSs can be QCLed to one or more of the SSBs. No second set of TRSs is transmitted. This is similar to Option 2 except that Option 2 has the second set of TRSs. There are several alternatives for the gNB to transmit the DMRSs:
  Alt. 1: The Doppler shift may be adjusted based on TRS 0, i.e., the network pre-compensates TRP 1's DMRS transmission to match TRP 0; OR
  Alt. 2: The Doppler shift may be adjusted based on TRS 1 i.e., the network pre-compensates TRP 0's DMRS transmission to match TRP 1; OR
  Alt. 3: The Doppler shift may be adjusted based on both TRSs, i.e., the network pre-compensates both TRPs' DMRSs to the average of the TRPs' frequencies.
For the QCL of SFN DMRS to the TRSs:
  Doppler profile
  For Alt. 1, the Doppler properties come from TRS 0 and this requires the network to indicate TRS 0.
  For Alt. 2, the Doppler properties come from TRS 1 and this requires the network to indicate TRS 1.
  For Alt. 3, the Doppler properties have to come from TRS 0 and TRS 1 and this requires the network to indicate both TRSs.
  Delay profile
  The channels for the TRSs have different average delays and delay spreads, so both TRSs are used for acquiring DMRS average delay and delay spread. That is, DMRS delay profile is from both TRSs.

Since Variant E is supported but Variant A is not, Alt. 1 or Alt. 2 cannot be supported. Therefore, this option with Alt. 3 can be supported by Variant E. However, this Variant E is different from Variant E for Option 1, as Option 1 DMRSs are not pre-compensated, but Option 4 DMRSs are pre-compensated to the average Doppler shift of TRS 0 and TRS 1. gNB signaling to UE to differentiate the options is needed if both Option 1 and Option 4 are supported.

This option does not require the second set of TRSs, but the UE needs to perform sounding based on the first set of TRS. The UE DMRS processing complexity is lower than Option 1 but higher than Option 2 or Option 3.

A variation of this option is that a SFN TRS is also transmitted by both TRPs, and this SFN TRS can be used for delay profile estimation. The Doppler profile estimation may be either from TRS 0 or TRS 1, and Variant B can be adopted. The motivation for this variation may be that the dynamic switching of the anchoring frequency between TRS 0 and TRS 1 can be performed more easily, especially when the UE passes the middle point of the two TRPs. However, the UE needs to track all 3 TRSs at the same time and some companies have concerns on this. Since the dynamic switching can be supported by other options, it seems this variation is not needed.

Yet another variation of this option is that the first set of TRSs are not on orthogonal resources but on overlapping resources so that a legacy SFN with different Doppler frequencies is formed for the first set. This SFN cannot be used for Doppler estimation but can be used for delay profile estimation. For Doppler estimation, a second TRS by TRP 0 may also be transmitted. For this implementation, Variant A or Variant B may be adopted. However, as Variant A is already agreed to be supported, it is unclear why Variant B needs to be further considered. Also this scheme requires 2 sets of TRSs and UL signals, though it has similar UE complexity as Option 2 and Option 3. Therefore, it seems this scheme may not be useful and Variant B is not necessary.

Based on the analysis above, different QCL Types and Variants may be needed for different options. Even with the same QCL Variant E, the UE behaviors may still be different depending on the options adopted, which also requires gNB signaling to the UE. In an embodiment, for Variant E, gNB signaling to UE may be defined to indicate whether DMRS pre-compensation is performed, and different UE behaviors may be defined accordingly.

The options discussed above are summarized in Table 7 below, where Df stands for Doppler shift and Pc stands for pre-compensation of Df.

TABLE 7

| | 1st set of TRSs | | | 2nd set of TRSs | | DMRSs | | QCL of | RS | UE |
|---|---|---|---|---|---|---|---|---|---|---|
| | TRS 0 | TRS 1 | SRS | TRS 0 | TRS 1 | DMRS 0 | DMRS 1 | DMRS to TRS | over head | complex-ity |
| Option 1: no Pc to TRS/DMRS, no SRS | Df 0 | Df 1 | | | | Df 0 | Df 1 | Variant E of 2 Df | Low | High |
| Option 2: 2nd set SFN TRS w/ Pc, need SRS | Df 0 | | Df 0 | Df 0 | Df 0 | Df 0 | Df 0 | Type A | Medium | Low |
| Option 3: SFN TRS w/ Pc, reduced 1st and 2nd sets of TRS, need SRS | Df 0 | | Df 0 | | Df 0 | Df 0 | Df 0 | Type A | Low | Low |

TABLE 7-continued

| 1st set of TRSs | | | 2nd set of TRSs | | DMRSs | | QCL of | RS | UE |
|---|---|---|---|---|---|---|---|---|---|
| TRS 0 | TRS 1 | SRS | TRS 0 | TRS 1 | DMRS 0 | DMRS 1 | DMRS to TRS | over head | complex- ity |
| Option 4: no Pc to TRS, Pc to DMRS, need SRS, no 2nd set TRS — Df 0 | Df 1 | Df 0 | | | Df 0 | Df 0 | Variant E of 1 Df | Low | Medium |

The following provides embodiments regarding UE behavior and UE assumptions.

RAN1 has decided to signal the existing QCL types to a UE, and the UE may drop certain QCL parameters from the indicated QCL type to support some QCL variants. First, this disclosure notes that Variant E does not require such additional behavior/rule/signaling, which can be part of the advantage of Variant E. For the agreed Variant A, the Doppler parameters need to be dropped from QCL type A (e.g., the network indicates QCL type A, but the Doppler parameters are not used by the UE). One way to do so is to have a one-bit flag, which tells the UE whether the Doppler parameters are to be dropped or not. This flag may be jointly indicated with the indication of the anchor TRP/TRS, e.g., when indicating the anchor TRS, the dropped parameter is also indicated. It may be possible to interpret that a non-anchor (non-pre-compensated) TRS or a non-pre-compensated SFN TRS needs to apply the dropping of Doppler parameters. The detail depends on which SFN schemes are to be supported and whether other QCL variants are supported.

Now this disclosure analyzes whether a UE can assume that only the same SFN scheme is allowed. For example, PDCCH on one carrier may use SFN Scheme 1 but PDSCH on the same carrier may use SFN scheme with network pre-compensation. For another example, PDSCH on one carrier may use SFN Scheme 1 but PDSCH on another carrier may use SFN scheme with network pre-compensation. To avoid high complexity, the UE may assume only that the same SFN scheme is allowed for each carrier. Furthermore, for the UE assumption on no different SFN schemes per carrier versus per UE, though more flexibility can be allowed by restriction only on the carrier level, it is unclear whether there is any performance advantage with the additional flexibility. To reduce UE/gNB complexity, it may be more desirable to have the restriction per UE and not per carrier.

Proposal 11: For UE behavior/assumption:

Revisit the rule/signaling to determine dropped QCL parameters after deciding potentially supported schemes and QCL variants;

UE does not expect to be configured with different SFN schemes (scheme 1 or TRP pre-compensation) for both PDCCH and PDSCH, and the restriction applies per UE;

UE does not expect to be configured with different SFN schemes (scheme 1 or TRP pre-compensation) for different CORESETs, and the restriction applies per UE.

FIG. 14 illustrates a flow diagram of an embodiment method 1400 for wireless communication. The method 1400 may be indicative of operations of a user equipment (UE). As shown, at step 1402, the UE receives first information and second information, where the first information indicates a first layer number and a first transmit precoding matrix index (TPMI) to be used for a first physical uplink shared channel (PUSCH), and the second information indicates a second TPMI to be used for a second PUSCH. The first TPMI and the second TPMI correspond to the first layer number. At step 1404, the UE transmits data on the first PUSCH over a carrier according to the first layer number and the first TPMI. At step 1406, the UE transmits the data on the second PUSCH over the carrier according to the first layer number and the second TPMI. The method 1400 may also be applied for transmitting two SRIs corresponding to the same layer number for uplink repetition transmission of the UE, where, as an example, the first TPMI and the second TPMI may be replaced by a first SRI and a second SRI in steps 1402, 1404 and 1406 of FIG. 14.

FIG. 15 illustrates a flow diagram of an embodiment method 1500 for wireless communication. The method 1500 may be indicative of operations of a network controller. As shown, at step 1502, the network control determines a first layer number and a first transmit precoding matrix index (TPMI) to be used for a first physical uplink shared channel (PUSCH) of a user equipment (UE), and a second TPMI to be used for a second PUSCH of the UE. The first TPMI and the second TPMI correspond to the first layer number. At step 1504, the network controller sends, to the UE, first information indicating the first layer number and the first TPMI, and second information indicating the second TPMI. At step 1506, the network controller receives data on the first PUSCH according to the first layer number and the first TPMI, or receives the data on the second PUSCH according to the first layer number and the second TPMI.

Figure 16:
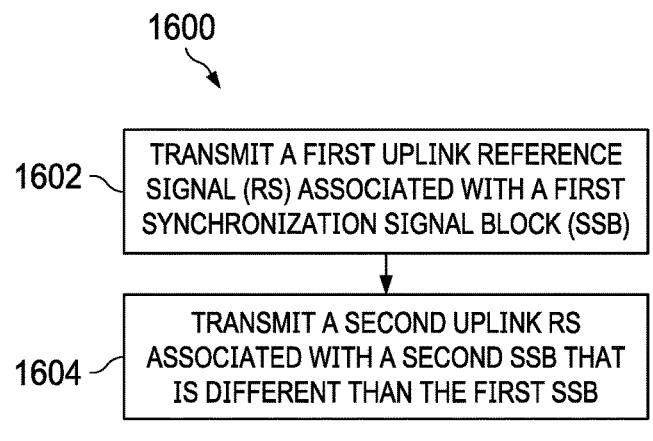
FIG. 16 illustrates a flow diagram of another embodiment method for wireless communication.

FIG. 16 illustrates a flow diagram of an embodiment method 1600 for wireless communication. The method 1600 may be indicative of operations of a user equipment (UE). As shown, at step 1602, the UE transmits a first uplink reference signal (RS) associated with a first synchronization signal block (SSB). At step 1604, the UE transmits a second uplink RS associated with a second SSB that is different than the first SSB. The first SSB is associated with a first physical cell ID (PCI), and the second SSB is associated with a second PCI different than the first PCI.

Figure 17:
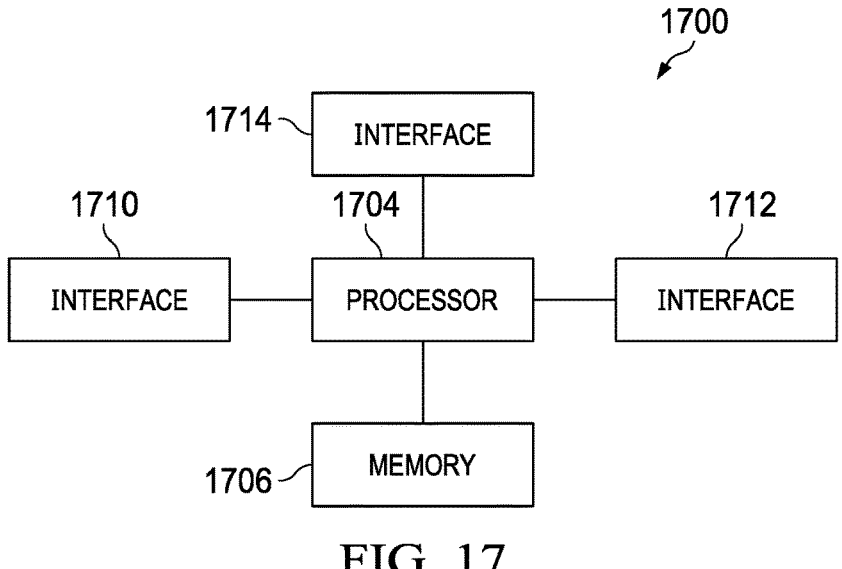
FIG. 17 illustrates a block diagram of an embodiment processing system.

FIG. 17 illustrates a block diagram of an embodiment processing system 1700 that may be used to implement the embodiments described herein, which may be installed in a host device. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 1704. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 1704 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 17, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network. In some embodiments, one or more of the interfaces 1710, 1712, 1714 connects the processing system 1700 to a transceiver adapted to transmit and receive signaling over the telecommunications network.

Figure 18:
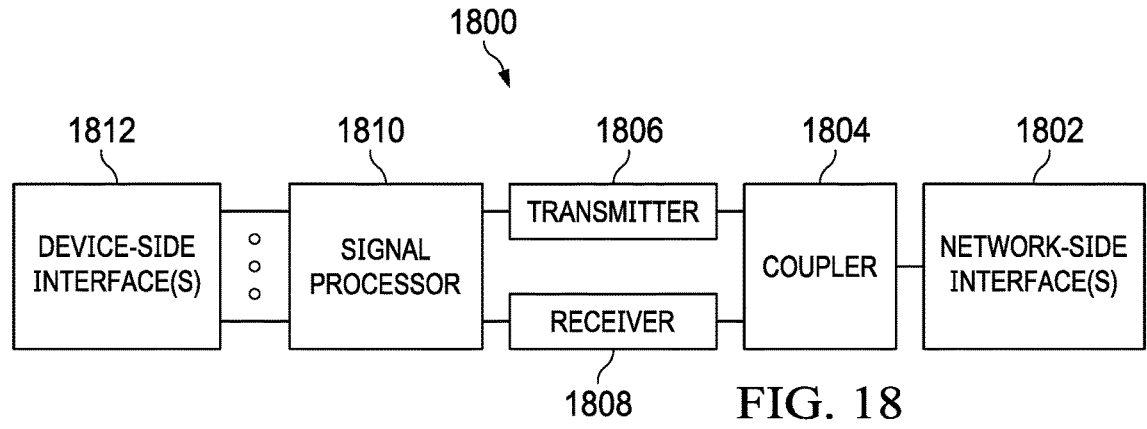
FIG. 18 illustrates a block diagram of a transceiver adapted to transmit and receive signaling over a telecommunications network.

FIG. 18 illustrates a block diagram of a transceiver 1800 adapted to transmit and receive signaling over a telecommunications network. The transceiver 1800 may be installed in a host device. As shown, the transceiver 1800 comprises a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface(s) 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 comprises one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an indicating unit/module, an associating unit/module, a signal generating unit/module, a determining unit/module, and/or a table searching unit/module. The respective units/modules may be hardware, software, or a combination thereof. For instance, one or more of the units/modules may be an integrated circuit, such as field programmable gate arrays (FPGAs) or application-specific integrated circuits (ASICs).

According to some embodiments, a method for wireless communications may include: receiving, by a user equipment (UE), first configuration information of a carrier of a serving cell, the first configuration information comprising a first group of uplink (UL) and downlink (DL) signals and channels on the carrier in the serving cell and a first group of parameters; receiving, by the UE, second configuration information of the carrier, the second configuration information comprising a second group of UL and DL signals and channels on the carrier in the serving cell and a second group of parameters; and transmitting and/or receiving, by the UE, a UL/DL signal or a UL/DL channel in the first group of UL/DL signals and channels according to the first group of parameters, and transmitting and/or receiving, by the UE, a UL/DL signal or a UL/DL channel in the second group of UL/DL signals and channels according to the second group of parameters.

In some embodiments, the serving cell may be associated with a first physical cell identifier (PCID) and a first synchronization signal block (SSB) transmitted on the carrier or a different carrier, and a first UL/DL signal or channel in the first group of UL/DL signals and channels is quasi-co-located (QCLed) to the first SSB, or is QCLed to a downlink/uplink reference signal that is QCLed to the first SSB, or the first UL/DL signal or channel in the first group of UL signals and channels is configured with pathloss/spatial-relation RS that is QCLed to the first SSB.

In some embodiments, a second UL/DL signal or channel in the second group of UL/DL signals and channels is QCLed to a second CSI-RS for tracking (TRS) transmitted on the carrier or a different carrier, to a second SSB transmitted on the carrier or a different carrier associated with a neighbor cell that has a second PCID different than the first PCID or a PCID of any one of the UE's serving cells, or to a downlink/uplink reference signal that is QCLed to the second TRS or the second SSB, or the second UL/DL signal or channel in the second group of UL/DL signals and channels is configured with a pathloss/spatial-relation RS that is QCLed to the second TRS or the second SSB.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
receiving, by a user equipment (UE), first information and second information, the first information indicating a first layer number and a first transmit precoding matrix index (TPMI) to be used for a first physical uplink shared channel (PUSCH), the second information indicating a second TPMI to be used for a second PUSCH, and the first TPMI and the second TPMI corresponding to the first layer number;
transmitting, by the UE, data on the first PUSCH over a carrier according to the first layer number and the first TPMI; and
transmitting, by the UE, the data on the second PUSCH over the carrier according to the first layer number and the second TPMI.

2. The method of claim 1, wherein the first information and the second information are received in a serving cell of the UE.

3. The method of claim 1, wherein receiving the first information and the second information comprises:
receiving, by the UE, the first information and the second information from a first bit field and a second bit field in a message, respectively, a value i comprised in the second bit field indicating a TPMI value i of the second TPMI corresponding to the first layer number, the first information associated with a precoding information and number of layers table.

4. The method of claim 3, wherein a bit width of the second bit field is based on a maximum number of TPMI entries corresponding to a layer number in the precoding information and number of layers table.

5. The method of claim 3, wherein the message is a downlink control information (DCI) message.

6. The method of claim 1, wherein the data is a transport block (TB).

7. The method of claim 1, wherein the first PUSCH and the second PUSCH are for PUSCH repetition transmission.

8. The method of claim 1, wherein,
transmitting the data in the first PUSCH comprises:
transmitting, by the UE, the data in the first PUSCH according to a first timing advance; and
transmitting the data in the second PUSCH comprises:
transmitting, by the UE, the data in the second PUSCH according to a second timing advance different than the first timing advance.

9. The method of claim 1, wherein the first PUSCH is associated with a first cell having a first physical cell ID (PCI), and the second PUSCH is associated with a second cell having a second PCI different from the first PCI.

10. The method of claim 1, wherein the first PUSCH is associated with a first synchronization signal block (SSB), and the second PUSCH is associated with a second SSB different than the first SSB, the first SSB associated with a first physical cell ID (PCI) and the second SSB associated with a second PCI.

11. The method of claim 10, further comprising:
transmitting, by the UE, a first sounding reference signal (SRS) associated with the first SSB; and
transmitting, by the UE, a second SRS associated with the second SSB.

12. The method of claim 10, further comprising:
transmitting, by the UE, a first sounding reference signal (SRS) having a first spatial relation with a first channel state information-reference signal (CSI-RS) or the first SSB, the first CSI-RS having a quasi co-location (QCL) relationship with the first SSB; and transmitting, by the UE, a second SRS having a second spatial relation with a second CSI-RS or the second SSB, the second CSI-RS having a QCL relationship with the second SSB.

13. The method of claim 1, further comprising:
determining, by the UE, the first layer number and the first TPMI in a first table according to the first information; and
determining, by the UE, the second TPMI in a second table according to the second information and the first layer number.

14. A method comprising:
determining, by a network controller, a first layer number and a first transmit precoding matrix index (TPMI) to be used for a first physical uplink shared channel (PUSCH) of a user equipment (UE), and a second TPMI to be used for a second PUSCH of the UE, the first TPMI and the second TPMI corresponding to the first layer number;
sending, by the network controller to the UE, first information indicating the first layer number and the first TPMI, and second information indicating the second TPMI; and
receiving, by the network controller, data on the first PUSCH according to the first layer number and the first TPMI, or receiving, by the network controller, the data on the second PUSCH according to the first layer number and the second TPMI.

15. The method of claim 14, wherein the first information and the second information are sent to the UE in a serving cell of the UE.

16. The method of claim 14, wherein sending the first information and the second information comprises:
sending, by the network controller, the first information and the second information in a first bit field and a second bit field of a message, respectively, a value i comprised in the second bit field indicates a TPMI value i of the second TPMI corresponding to the first layer number, the first information associated with a precoding information and number of layers table.

17. The method of claim 16, further comprising:
determining, by the network controller, a bit width of the second bit field based on a maximum number of TPMI entries corresponding to a layer number in the precoding information and number of layers table.

18. The method of claim 16, wherein the message is a downlink control information (DCI) message.

19. The method of claim 14, wherein the data is a transport block (TB).

20. The method of claim 14, wherein the first PUSCH and the second PUSCH are configured for PUSCH repetition transmission.

21. The method of claim 14, wherein the first PUSCH is associated with a first timing advance, and the second PUSCH is associated with a second timing advance different than the first timing advance.

22. The method of claim 14, wherein the first PUSCH is associated with a first cell and the second PUSCH is associated with a second cell different than the first cell.

23. The method of claim 14, wherein the first PUSCH is associated with a first synchronization signal block (SSB) and the second PUSCH is associated with a second SSB different than the first SSB.

24. The method of claim 23, further comprising:

receiving, by the network controller from the UE, a first sounding reference signal (SRS) associated with the first SSB; or receiving, by the network controller from the UE, a second SRS associated with the second SSB.

25. The method of claim 23, further comprising:

receiving, by the network controller from the UE, a first sounding reference signal (SRS) having a first spatial relation with a first channel state information-reference signal (CSI-RS) or the first SSB, the first CSI-RS having a quasi co-location (QCL) relationship with the first SSB; or receiving, by the network controller from the UE, a second SRS having a second spatial relation with a second CSI-RS or the second SSB, the second CSI-RS having a QCL relationship with the second SSB.

26. The method of claim 14, further comprising:

determining, by the network controller, the first information in a first table according to the first layer number and the first TPMI; and determining, by the network controller, the second information in a second table according to the second TPMI and the first layer number.

27. A user equipment (UE) comprising:

at least one processor; and a non-transitory computer readable storage medium storing instructions that, when executed by the at least one processor, cause the UE to perform operations including:

receiving first information and second information, the first information indicating a first layer number and a first transmit precoding matrix index (TPMI) to be used for a first physical uplink shared channel (PUSCH), the second information indicating a second TPMI to be used for a second PUSCH, and the first TPMI and the second TPMI corresponding to the first layer number;

transmitting data on the first PUSCH over a carrier according to the first layer number and the first TPMI; and transmitting the data on the second PUSCH over the carrier according to the first layer number and the second TPMI.

28. A network controller comprising:

at least one processor; and a non-transitory computer readable storage medium storing instructions that, when executed by the at least one processor, cause the network controller to perform operations including:

determining a first layer number and a first transmit precoding matrix index (TPMI) to be used for a first physical uplink shared channel (PUSCH) of a user equipment (UE), and a second TPMI to be used for a second PUSCH of the UE, the first TPMI and the second TPMI corresponding to the first layer number;

sending, to the UE, first information indicating the first layer number and the first TPMI, and second information indicating the second TPMI; and receiving data on the first PUSCH according to the first layer number and the first TPMI, or receiving the data on the second PUSCH according to the first layer number and the second TPMI.

* * * * *